United States Patent
Takeuchi

(10) Patent No.: US 8,458,255 B2
(45) Date of Patent: Jun. 4, 2013

(54) DATA OUTPUT DEVICE, DATA PROVIDING DEVICE, DATA OUTPUT SYSTEM, DATA OUTPUT DEVICE CONTROL METHOD, AND DATA PROVIDING DEVICE CONTROL METHOD

(75) Inventor: Masaki Takeuchi, Osaka (JP)

(73) Assignee: Sharp Kabushiki Kaisha, Osaka-Shi (JP)

( * ) Notice: Subject to any disclaimer, the term of this patent is extended or adjusted under 35 U.S.C. 154(b) by 356 days.

(21) Appl. No.: 12/999,569

(22) PCT Filed: Jun. 19, 2009

(86) PCT No.: PCT/JP2009/061182
§ 371 (c)(1),
(2), (4) Date: Dec. 16, 2010

(87) PCT Pub. No.: WO2009/154267
PCT Pub. Date: Dec. 23, 2009

(65) Prior Publication Data
US 2011/0113097 A1    May 12, 2011

(30) Foreign Application Priority Data

Jun. 20, 2008 (JP) ................................ 2008-162459
Jun. 20, 2008 (JP) ................................ 2008-162460
Jun. 20, 2008 (JP) ................................ 2008-162461

(51) Int. Cl.
*G06F 15/16* (2006.01)

(52) U.S. Cl.
USPC ........................................................ 709/204

(58) Field of Classification Search
USPC ........................................................ 709/204
See application file for complete search history.

(56) References Cited

U.S. PATENT DOCUMENTS 7,710,349 B2 * 5/2010 De Leon ..................... 345/1.1
2004/0131282 A1 * 7/2004 Yoshida et al. ............. 382/312
(Continued)

FOREIGN PATENT DOCUMENTS

EP    1746518 A1    1/2007
JP    2002-251293 A  9/2002
(Continued)

OTHER PUBLICATIONS

Allegro Software Development Corporation: "Networked Digital Media Standards. A UPnP/DLNA Overview" Internet Citation, Oct. 26, 2006, p. 25pp, XP007906876.
(Continued)

Primary Examiner — Larry Donaghue
(74) Attorney, Agent, or Firm — Birch, Stewart, Kolasch & Birch, LLP

(57) ABSTRACT

An operation target device (200) includes: a reproducable data information transmitting section (2) for transmitting, to a remote operation device (300), reproducable data information indicative of a file format that the operation target device (200) can output; a data sharing process section (3) on the operated side for requesting the remote operation device (300) to transmit data identification information of data that the operation target device (200) can output, the data being selected according to the reproducable data information, from among data that the remote operation device (300) can provide; and a slide-show executing section (6) for outputting the data received from the remote operation device (300). With this configuration, it is possible to avoid such a case where data that the operation target device (200) cannot output is transmitted to the operation target device (200) from the remote operation device (300).

12 Claims, 25 Drawing Sheets

U.S. PATENT DOCUMENTS

| | | | |
|---|---|---|---|
| 2005/0165795 A1* | 7/2005 | Myka et al. | 707/100 |
| 2006/0090122 A1* | 4/2006 | Pyhalammi et al. | 715/500.1 |
| 2008/0120369 A1* | 5/2008 | Gustavsson | 709/204 |
| 2009/0003731 A1 | 1/2009 | Nitta et al. | |
| 2009/0202222 A1 | 8/2009 | Kageyama et al. | |
| 2009/0276531 A1* | 11/2009 | Myka et al. | 709/227 |

FOREIGN PATENT DOCUMENTS

| | | |
|---|---|---|
| JP | 2004-295569 A | 10/2004 |
| JP | 2006-5788 A | 1/2006 |
| JP | 2007-5985 A | 1/2007 |
| JP | 2007-13704 A | 1/2007 |
| JP | 2007-110659 A | 4/2007 |
| JP | 2007-241817 A | 9/2007 |
| JP | 2008-5254 A | 1/2008 |
| JP | 2008-33280 A | 2/2008 |
| JP | 2009-194453 A | 8/2009 |

OTHER PUBLICATIONS

European Search Report for corresponding European Patent Application No. 09766715.8, dated Jul. 13, 2011.

Pering T. et al.: "Face-to-Face Media Sharing Using Wireless Mobile Devices", Seventh IEEE International Symposium on Multimedia, Irvine, CA, USA, Dec. 12-14, 2005, pp. 269-276.

\* cited by examiner

DATA OUTPUT DEVICE, DATA PROVIDING DEVICE, DATA OUTPUT SYSTEM, DATA OUTPUT DEVICE CONTROL METHOD, AND DATA PROVIDING DEVICE CONTROL METHOD

TECHNICAL FIELD

The present invention relates to (i) a data providing device for transmitting data to a data output device and causing the data output device to output the data, the data output device receiving data from a plurality of external devices and outputting the data, and (ii) others related to this.

BACKGROUND ART

There have been conventionally used techniques by which a plurality of electric devices are connected to a network and data stored in the electric devices are shared between the electric devices connected to the network. For example, Patent Literature 1 shown below discloses a technique for causing, in a network constituted by a plurality of mobile terminals, the mobile terminals to simultaneously and in the same order reproduce still image data retained by the mobile terminals.

Specifically, in the simultaneous reproduction system described in Patent Literature 1, a plurality of mobile terminals connected to a network are divided into (i) a controller terminal for giving an instruction to other mobile terminals and (ii) player terminals for reproducing a file according to the instruction given by the controller terminal.

In a case where the above simultaneous reproduction system performs simultaneous reproduction of still image data, the controller terminal requests each of the player terminals connected to the same network to transmit a list of still image data satisfying a predetermined condition. Upon receiving the request for the list, each player terminal transmits, to the controller terminal, a list of still image data satisfying the predetermined condition.

Upon receiving the lists from the player terminals, the controller terminal adds to the lists still image data stored in the controller terminal, and generates a simultaneous reproduction data order list that determines the order of reproduction of the still image data included in these lists.

Then, based on the simultaneous reproduction data order list, the controller terminal performs control so that the still image data, which are included in the generated simultaneous reproduction data order list and are to be reproduced simultaneously, are copied into the controller terminal and the player terminals.

Specifically, the controller terminal instructs a terminal (any of the player terminals or the controller terminal) capable of providing the still image data which are to be reproduced simultaneously to transmit the still image data to other terminal(s) not storing the still image data.

Consequently, the still image data which are to be reproduced simultaneously are stored in all of the player terminals and the controller terminal. In this state, the controller terminal transmits, to all of the player terminals, a request to start simultaneous reproduction, in order that the player terminals start reproducing the still image data. Further, the controller terminal itself also starts reproducing the still image data. This allows the controller terminal and the player terminals to simultaneously reproduce the same still image file.

CITATION LIST

Patent Literature

[Patent Literature 1]
Japanese Patent Application Publication, Tokukai, No. 2007-13704 A (Publication Date: Jan. 18, 2007)
[Patent Literature 2]
Japanese Patent Application Publication, Tokukai, No. 2007-110659 A (Publication Date: Apr. 26, 2007)

SUMMARY OF INVENTION

Technical Problem

However, the configuration of Patent Literature 1 involves the problem that this configuration does not give any consideration to whether or not each of the mobile terminals can actually reproduce the data to be reproduced simultaneously. Specifically, even if the data are of the same kind (e.g., image data), the image data may be in various different file formats. Further, there may be cases where a mobile terminal can display image data in one file format, but cannot display image data in another file format.

Namely, in the simultaneous reproduction system described in Patent Literature 1, if one of the player terminals that receives an instruction to reproduce still image data is a device that cannot reproduce the still image data, the one player terminal cannot perform the simultaneous reproduction.

Furthermore, in this case, the one player terminal receives the data that the one player terminal cannot reproduce, which is unnecessary; therefore, a storage capacity of the one player terminal is reduced by the unnecessary data. In addition, in this case, the one player terminal also receives the instruction to reproduce the data that the one player terminal cannot reproduce. This may lead to a case where the one player terminal cannot display an image normally.

The present invention was made in view of the foregoing problems, and an object of the present invention is to provide (i) a data output device which performs data reproduction, etc. and is capable of avoiding such a case where data that the data output device cannot output is transmitted to the data output device from a data providing device, the data providing device providing data to be reproduced by the data output device, and (ii) others related to this.

Solution to Problem

In order to solve the foregoing problems, a data output device of the present invention is a data output device for receiving and outputting data transmitted from a data providing device, including: output possibility information transmitting means for transmitting, to the data providing device, output possibility information indicative of (i) a file format of data that the data output device is able to output or (ii) a file format of data that the data output device is unable to output; data sharing means for requesting the data providing device to transmit, to the data output device, data that the data output device is able to output, the data being selected according to the output possibility information, from among data that the data providing device is able to provide; and data output means for outputting the data received from the data providing device.

Further, in order to solve the foregoing problems, a method of the present invention for controlling a data output device is a method for controlling a data output device, the data output device receiving and outputting data transmitted from a data providing device, said method including: an output possibility information transmitting step for transmitting, to the data providing device, output possibility information indicative of (i) a file format of data that the data output device is able to output or (ii) a file format of data that the data output device is unable to output; a data sharing step for requesting the data providing device to transmit, to the data output device, data that the data output device is able to output, the data being selected according to the output possibility information, from among data that the data providing device is able to provide; and a data outputting step for outputting the data received from the data providing device.

According to the above configuration, the output possibility information is transmitted to the data providing device. Therefore, based on the received output possibility information, the data providing device can transmit, to the data output device, only data that the data output device can output. This makes it possible to avoid such a case where data that the data output device cannot output is transmitted to the data output device.

Note that connection between the data providing device and the data output device only needs to allow the data providing device and the data output device to bi-directionally communicate with each other. The data providing device and the data output device may be connected to each other either by a wire or by wireless communication. Further, the communication between the data providing device and the data output device may be performed via a relay device such as a router.

Further, it is preferable that: the data sharing means requests the data providing device to transmit, to the data output device, a list of data that the data output device is able to output, the data being selected according to the output possibility information, from among the data that the data providing device is able to provide; and the data output device includes data transmission request means for requesting the data providing device to transmit, to the data output device, the data included in the received list.

In a case where data to be transmitted from the data providing device to the data output device has a relatively small volume (e.g., in a case of text data or the like), transmitting the data from the data providing device to the data output device does not cause any problem. However, in a case where data to be transmitted from the data providing device to the data output device has a large volume, transmission of the data would take time, and the data output device should be provided with a large-capacity storage section for storing the received data.

In order to deal with this, according to the above configuration, the data output device receives data by (i) causing the data providing device to transmit a list of data to the data output device and (ii) requesting, based on the list, the data providing device to transmit data. With this configuration, it is possible to avoid such a case where a large amount of data is transmitted from the data providing device to the data output device at once.

Further, it is preferable that: the data providing device comprises a plurality of data providing devices; and in a case where the data output device receives, from one of the plurality of data providing devices, a data selection condition, which is a condition used to select data to be included in the list, the data sharing means (i) transmits the received data selection condition to, among the plurality of data providing devices, any data providing device other than the one data providing device, and (ii) requests said any data providing device other than the one data providing device to transmit, to the data output device, a list of data selected according to the data selection condition.

As in the above configuration, it is preferable that a plurality of data providing devices are provided. This is because that, as the number of data providing devices increases, a wider variety of data can be outputted from the data output device. Furthermore, according to the above configuration, upon receipt of a data selection condition from one of the data providing devices, the data selection condition is transferred to, among the plurality of data providing devices, any data providing device other than the one data providing device, and said any data providing device other than the one data providing device is requested to transmit a list of data selected according to the data selection condition.

Namely, according to the above configuration, based on the data selection condition transmitted by the one data providing device, said any data providing device other than the one data providing device also generates a list and transmits the list to the data output device. Thus, the data output device can collectively grasp, among the data that the data providing devices can provide, data satisfying the data selection condition, and can output the data satisfying the data selection condition.

Further, it is preferable that: the data transmission request means determines an order in which the data included in the received list(s) are to be outputted, and requests the data to be transmitted to the data output device in the determined order; and the data output means outputs the data in an order in which the data have been received.

According to the above configuration, the data output device sequentially outputs the data provided by the data providing devices. Therefore, for example, with a configuration in which (i) the data providing devices are caused to transmit images and (ii) the data output device has a function of image display, the data output device can perform a slide show by displaying the images transmitted by the data providing devices.

Further, it is preferable that: in a case where the data transmission request means determines, at a time point which is a predetermined time period before output of data from the data output means, that a data providing device storing the data is unable to provide the data, the data transmission request means changes a candidate for data which is requested to be transmitted, from the data to next data, which is to be outputted following the data.

Here, according to the above configuration involving transmission of the list, there is a time lag between (i) the data providing device transmitting the list and (ii) the data providing device receiving the request for transmission of the data. Therefore, during the time lag, the data providing device may become impossible to transmit the data to the data output device.

For example, in a case where the data providing device and the data output device are configured to communicate with each other wirelessly, the data providing device may be brought to outside of the communication range with the data output device. For another example, in a case where the data output device is configured to be driven by a battery, the battery may run out after the data output device transmits the list. For further another example, the user of the data providing device may reject transmission of the data which is requested by the data output device. For still further another example, it may become physically difficult for the data providing device to transmit the data, since the data providing device is executing other function such as transmission/reception of an e-mail, a television-phone call, etc.

In such the cases, the requested data is not transmitted to the data output device, so that the data output is interrupted. In order to avoid this, the above configuration checks in advance whether or not supply of data is possible. If it is determined that the supply of the data is impossible, a candidate for data which is requested to be transmitted is changed from the data to next data, which is to be outputted following the data.

With this configuration, even in a case where there exists a data providing device which has become impossible to transmit data to the data output device, it is possible to perform the data output without interruption.

Further, according to a data output system including: the above data output device; and the above data providing device, the data providing device including: list transmitting means for transmitting, in a case where the data providing device receives from the data output device (i) the output possibility information and (ii) a request for transmission of the list, the list to the data output device; and data transmitting means for transmitting, in a case where the data providing device receives from the data output device a request for transmission of data, the requested data to the data output device, it is possible to avoid such a case where data that the data output device cannot output is transmitted to the data output device.

Here, if the configuration of Patent Literature 1 allowed simultaneous reproduction of a still image file and a music tune, the user would be able to view the still image file with BGM. However, Patent Literature 1 merely describes causing the player terminals to reproduce still image files, audio files, or the like in the same reproduction order, and neither discloses nor suggests a configuration for viewing a still image file with BGM.

Patent Literature 2 may be given as an example of a technique for viewing an image with BGM. Patent Literature 2 reproduces images in a slide show, and, at the same time, outputs pre-stored music data according to a display period for the images reproduced in the slide show. This configuration allows viewing of an image with BGM.

Here, if a data output device for outputting data is capable of outputting data transmitted from a data providing device for providing data, in such a manner that (i) reproduction of data such as audio data or moving image and (ii) display of image data are performed simultaneously, the user of the data output device can enjoy, at once, the reproduced data and the displayed data.

However, with the techniques of Patent Literature 1 or 2, if a data output device for outputting data is caused to output data transmitted from a data providing device for providing data, in such a manner that (i) reproduction of BGM and (ii) display of images are performed simultaneously, the following problems occur:

The configuration of Patent Literature 1 involves a problem that a file to be simultaneously reproduced by the plurality of player terminals should be copied into each of the player terminals. This becomes a problem especially when the file to be reproduced is a music file or the like.

Namely, in a case where a music file is reproduced with the configuration of Patent Literature 1, the music file is copied into each of the player terminals. This may be regarded as an act of reproducing a copyrighted work exceeding the scope of private use, i.e., an act of copyright infringement.

Further, some music files are protected from being copied, for the purpose of copyright protection. In such a case, with the technique of Patent Literature 1, the plurality of player terminals cannot simultaneously reproduce a music file.

Moreover, even for data which is free from the problem of copyright, it is a problem if the data is copied frivolously. For example, it is a problem if data of a photo or the like including a person, the person's friend and/or acquaintance is copied and the copies thus generated fall into the hands of a large indefinite number of people. This is not a problem only with Patent Literature 1, but also with other generally-used data sharing systems. Namely, the generally-used data sharing systems involve a problem that data stored in a certain terminal is copied by one terminal after another, i.e., a problem that data stored in a certain terminal is copied by a plurality of terminals, and the copies stored in the plurality of terminals are further copied by other terminals (secondary copy), so that the copies of the data fall into the hands of a large indefinite number of people, against the intention of the owner of the original data.

Meanwhile, according to the configuration of Patent Literature 2, it is possible to enjoy a slide show with BGM. However, for this purpose, it is necessary to store in advance (i) a image to be reproduced in the slide show and (ii) a music tune used as BGM for the slide show. Namely, in order to reproduce, with the technique of Patent Literature 2, a slide show with BGM by collecting images and music tunes stored in a plurality of terminals, the images and the music tunes stored in the terminals should be stored in advance in a personal computer and/or the like. This operation is very troublesome, and still has the problem of copyright, because this operation involves copying, into the personal computer and/or the like, data such as the music tunes stored in the terminals.

The present invention was made in view of the foregoing problems, and an object of the present invention is to provide (i) a data output device for simultaneously performing (a) reproduction of data provided by a data providing device storing the data, the reproduction being performed without copying the data, and (b) display of another data provided by the data providing device, and (ii) others related to this.

In order to solve the foregoing problems, a data output device of the present invention is a data output device for receiving and outputting data transmitted from a data providing device, including: streaming reproduction means for reproducing data through streaming, the data being distributed through streaming from the data providing device; data display means for (i) receiving, from the data providing device, another data which is not the data to be reproduced by the streaming reproduction means, and (ii) displaying said another data; and output control means for controlling the streaming reproduction means and the data display means so as to simultaneously perform (i) the streaming reproduction of the data and (ii) the display of said another data.

In order to solve the foregoing problems, a method of the present invention for controlling a data output device is a method for controlling a data output device, the data output device receiving and outputting data transmitted from a data providing device, said method including: a streaming reproduction step for reproducing data through streaming, the data being distributed through streaming from the data providing device; a data display step for (i) receiving, from the data providing device, another data which is not the data to be reproduced through streaming, and (ii) displaying said another data; and an output control step for simultaneously performing the streaming reproduction step and the data display step.

According to the above configuration, the data output device simultaneously performs (i) streaming reproduction of data which is distributed by the data providing device through streaming and (ii) display of another data which is not the above data and is transmitted by the data providing device.

Namely, the above data output device obtains, by different methods, data to be reproduced simultaneously. This is a special technical feature which has never been achieved by any conventional art. This feature makes it possible to simultaneously perform (i) streaming reproduction of data and (ii) display output of data. In addition, this feature makes it possible to output data according to the method by which the data has been obtained.

According to the above configuration, the data output device performs streaming reproduction; therefore, a copy of data stored in the data providing device is not left in the data output device. Thus, the above configuration prevents frivolous copying of the data stored in the data providing device, thereby avoiding copyright infringement. Furthermore, even in a case of copy-protected data, such the data can be distributed through streaming; therefore, with the above configuration, all the people around the data output device can enjoy copy-protected data.

Furthermore, according to the above configuration, data which is transmitted from the data providing device to the data output device so as to be displayed by the data output device (i.e., data which is not streamed) is copied into the data output device. Therefore, in a case where there exist a plurality of pieces of data to be displayed, the above configuration makes it possible to (i) display, in a list, the pieces of data to be displayed, (ii) skip one piece of data in order to display a next piece of data, (iii) display again a piece of data which has been already displayed, and (iv) change a display switching speed at which a piece of data to be displayed is switched from one to another among the pieces of data which are to be displayed in succession.

In addition, according to the above configuration, although data which is transmitted from the data providing device to the data output device so as to be displayed by the data output device (i.e., data which is not streamed) is copied into the data output device, the data is copied into basically only the data output device. Thus, the above configuration does not cause such a situation where the data is copied by one terminal after another, so that the copies of the data fall into the hands of a large indefinite number of people, against the intention of the owner of the original data. Note that, in order to reliably prevent the data from being copied by one terminal after another, the data output device may be configured to delete data after outputting the data.

Furthermore, according to the above configuration, data stored in the data providing device (i.e., data to be streamed and data to be displayed) are transmitted to the data output device and outputted by the data output device. Namely, the data output device is used as a place for outputting the data stored in the data providing device. Therefore, with the above configuration, it is easy to deal with even the following cases: (i) a case where there exist a plurality of data providing devices; (ii) a case where the number of data transmitted from the data providing device is large; and (iii) a case where a volume of data transmitted from the data providing device is large.

Namely, regardless of the number of data providing devices, the destination of the data is only the data output device. Therefore, as long as the data output device secures a capacity necessary for data output, all the people around the data output device can watch and listen to the data stored in the data providing device(s).

On the other hand, according to the technique of Patent Literature 1, data to be simultaneously reproduced is copied into the plurality of terminals, and the data is outputted by each of the terminals. Namely, according to the technique of Patent Literature 1, the terminal storing the data also outputs the data. Therefore, as the number of terminals increases, a volume of data transmitted between the terminals and the number of copies to be generated increase significantly.

Thus, the technique of Patent Literature 1 has the problem of copyright infringement, since this technique involves copying of data. Not only this, the technique of Patent Literature 1 also has the following problems: in a case where (i) a large number of data are to be reproduced simultaneously or (ii) data having a large volume is to be reproduced simultaneously, a volume of data to be transmitted becomes huge and/or a large amount of data is stored in each terminal.

For example, in a case where data having a relatively large volume (e.g., a moving image) is to be reproduced simultaneously, a terminal which cannot secure a capacity for such the data cannot participate in the simultaneous reproduction. Further, even in a case where data having a relatively small volume (e.g., a still image) is to be reproduced simultaneously, if the number of data to be reproduced simultaneously is large, it is troublesome for the user to delete or manage the data copied into his/her terminal.

Furthermore, the above data output device of the present invention, which receives data from the data providing device and outputs the data, is suitable particularly for such a situation where people bring their respective data providing devices and enjoy watching and listening to data. Note that the data (i.e., data to be streamed and data to be displayed) may be transmitted by the data providing device by its own judgment or may be transmitted by the data providing device in response to a request from the data output device. In a case where there exist a plurality of data providing devices, a single data providing device or different data providing devices may perform (i) streaming distribution and (ii) transmission of data to be displayed by the data output device.

For example, assume a case where the above data output device of the present invention is applied to a television, and the above data providing device of the present invention is applied to a mobile phone. In this case, with a television in a living room, every family member can watch photos taken by the family members with their mobile phones in a family trip, while listening to music tunes stored in the mobile phones as BGM. For another example, in the above case, brothers and sisters come together in their father's house, and all of them can view photos of brothers' children and sisters' children.

Further, for example, assume a case where the above data output device of the present invention is applied to a device (e.g., a car navigation system or a street display) located in a place where a plurality of people come together. In this case, all the people being in the place where the device is located can enjoy photos, music tunes, moving images, and/or the like owned by the people.

Thus, if the data providing device which can communicate with the above data output device is changed one from another, data to be outputted by the data output device also changes accordingly. Therefore, as compared with the technique of Patent Literature 2 which simultaneously reproduces/outputs pre-stored image data and pre-stored music data, the above data output device can display and reproduce through streaming data including a wider variety of content, depending on the situation.

Note that connection between the above data providing device and the above data output device only needs to allow the data providing device and the data output device to bi-directionally communicate with each other. The data providing device and the data output device may be connected to each other either by a wire or by wireless communication. Further, the number of data providing devices for providing data to the data output device may be two or more. Furthermore, the communication between the data providing device and the data output device may be performed via a relay device such as a router.

Examples of the data to be reproduced by the data output device through streaming include audio data, moving image data, and program data for television games. Examples of the data to be displayed by the data output device include text data, still image data, and moving image data.

Further, it is preferable that: the streaming reproduction means reproduces audio data through streaming; and the data display means displays image data.

According to the above configuration, the data output device can output audio data distributed from the data providing device through streaming, while displaying image data received from the data providing device. This allows the user of the data output device to enjoy viewing images with BGM.

Note that the image data to be displayed by the data display means may be still image data or moving image data. Namely, according to the above configuration, it is possible to enjoy still image data with BGM or moving image data with BGM.

Furthermore, the data output device preferably includes: data sharing means for requesting the data providing device to transmit, to the data output device, a list of image data or audio data that the data providing device is able to provide; and data transmission request means for requesting the data providing device to (i) transmit, to the data output device, the image data included in the received list or (ii) distribute through streaming, to the data output device, the audio data included in the received list.

In a case where the data to be transmitted from the data providing device to the data output device has a relatively small volume (e.g., in a case of text data), transmitting the data from the data providing device to the data output device does not cause any problem. However, in a case where the data to be transmitted from the data providing device to the data output device has a large volume, transmission of the data would take time, and the data output device should be provided with a large-capacity storage section for storing the data received.

In order to deal with this, according to the above configuration, the data output device receives data by (i) causing the data providing device to transmit a list of data to the data output device and (ii) requesting, based on the list, the data providing device to transmit data. With this configuration, it is possible to avoid such a case where a large amount of data is transmitted from the data providing device to the data output device at once.

Further, it is preferable that: the data sharing means requests the data providing device to transmit, to the data output device, a list of image data and audio data that the data providing device is able to provide; the data transmission request means determines (i) an order in which the image data included in the received list are to be outputted and (ii) an order in which the audio data included in the received list are to be outputted, and requests the image data to be transmitted to the data output device in the determined order and the audio data to be distributed to the data output device through streaming in the determined order; and the output control means controls the streaming reproduction means and the data display means so as to simultaneously perform (i) streaming reproduction of the audio data in an order in which the audio data have been received and (ii) display of the image data in an order in which the image data have been received.

According to the above configuration, the data output device simultaneously performs (i) sequential display of the data provided by the data providing device and (ii) sequential streaming reproduction of the data provided by the data providing device. Thus, according to the above configuration, it is possible to reproduce a slide show with BGM by using the image data and the audio data stored in the data providing device.

Furthermore, it is preferable that: in a case where the data transmission request means determines that the data providing device is unable to provide data, which is to be outputted next by the streaming reproduction means or the data display means, the data transmission request means changes a candidate for data which is requested to be transmitted, from the data to next data, which is to be outputted following the data.

Here, according to the above configuration involving transmission of the list, there is a time lag between (i) the data providing device transmitting the list and (ii) the data providing device receiving the request for transmission of the data. Therefore, during the time lag, the data providing device may become impossible to transmit the data to the data output device.

For example, in a case where the data providing device and the data output device are configured to communicate with each other wirelessly, the data providing device may be brought to outside of the communication range with the data output device. For another example, in a case where the data output device is configured to be driven by a battery, the battery may run out after the data output device transmits the list. For further another example, the user of the data providing device may reject transmission of the data which is requested by the data output device. For still further another example, it may become physically difficult for the data providing device to transmit the data, since the data providing device is executing other function such as transmission/reception of an e-mail, a television-phone call, etc.

In such the cases, the requested data is not transmitted to the data output device, so that the data output is interrupted. In order to avoid this, the above configuration checks in advance whether or not supply of data is possible. If it is determined that the supply of the data is impossible, a candidate for data which is requested to be transmitted is changed from the data to next data, which is to be outputted following the data.

With this configuration, even in a case where there exists a data providing device which has become impossible to transmit data to the data output device or in a case where the user of the data providing device rejects transmission of the data requested by the data output device, it is possible to perform the data output without interruption.

Moreover, it is preferable that: the data providing device comprises a plurality of data providing devices; and the data transmission request means requests at least one of the plurality of data providing devices to (i) transmit the image data included in the list received from said at least one data providing device or (ii) distribute through streaming the audio data included in the list received from said at least one data providing device.

The above configuration includes a plurality of data providing devices. This increases a variety of data which can be outputted from the data output device. Accordingly, images and/or music tunes that the users of the respective data providing devices have collected and stored in the data providing devices can be outputted from the data providing devices, so that everyone can enjoy the images and/or the music tunes.

Furthermore, it is preferable that: in a case where the data output device receives, from one of the plurality of data providing devices, a data selection condition, which is a condition used to select image data or audio data to be included in the list, the data sharing means (i) transmits the received data selection condition to, among the plurality of data providing devices, any data providing device other than the one data providing device, and (ii) requests said any data providing device other than the one data providing device to transmit, to the data output device, a list of image data or audio data selected according to the data selection condition.

According to the above configuration, upon receipt of a data selection condition from one of the data providing device, the data selection condition is transferred to, among the plurality of data providing devices, any data providing device other than the one data providing device, and said any data providing device other than the one data providing device is requested to transmit a list of data selected according to the data selection condition.

Namely, according to the above configuration, based on the data selection condition transmitted by the one data providing device, said any data providing device other than the one data providing device also generates a list and transmits the list to the data output device. Thus, the data output device can collectively grasp, among the data that the data providing devices can provide, data satisfying the data selection condition, and can output the data satisfying the data selection condition.

Further, the data output device preferably includes: a storage section for storing (i) an audio data selection condition, which is a condition used to select audio data to be included in the list, and (ii) an image data selection condition, which is a condition used to select image data to be included in the list, in such a manner that the audio data selection condition is associated with the image data selection condition, wherein: in a case where the data output device receives the audio data selection condition from one of the plurality of data providing devices, the data sharing means transmits, to the plurality of data providing devices, (i) the received audio data selection condition and (ii) the image data selection condition corresponding to the received audio data selection condition, which image data selection condition is identified by referring to the storing section, and the data sharing means requests each of the plurality of data providing devices to transmit, to the data output device, a list of (i) audio data selected according to the audio data selection condition and (ii) image data selected according to the image data selection condition; and in a case where the data output device receives the image data selection condition from one of the plurality of data providing devices, the data sharing means transmitting, to the plurality of data providing devices, (i) the received image data selection condition and (ii) the audio data selection condition corresponding to the received image data selection condition, which audio data selection condition is identified by referring to the storing section, and the data sharing means requests each of the plurality of data providing devices to transmit, to the data output device, a list of (i) audio data selected according to the audio data selection condition and (ii) image data selected according to the image data selection condition.

According to the above configuration, if an image data selection condition is received from the data providing device, an audio data selection condition corresponding to the received image data selection condition is determined; whereas, if an audio data selection condition is received from the data providing device, an image data selection condition corresponding to the received audio data selection condition is determined. Namely, according to the above configuration, based on the image data selection condition or the audio data selection condition transmitted from the data providing device, a pair of data selection conditions including the image data selection condition and the audio data selection condition are identified.

Thereafter, the pair of the data selection conditions thus identified are transmitted to the plurality of data providing devices. Then, each of the plurality of data providing devices transmits, to the data output device, a list of audio data and image data selected according to the pair of the data selection conditions.

Namely, according to the above configuration, based on an image data selection condition or an audio data selection condition transmitted from one data providing device, all the data providing devices each generate a list of audio data and image data, and the lists thus generated are transmitted to the data output device.

Consequently, the data output device can collectively grasp, among the data that the data providing devices can provide, audio data and image data each of which satisfies the data selection condition, and can output the audio data and the image data. Thus, merely by a single data providing device transmitting an image data selection condition or an audio data selection condition to the data output device, it is possible to simultaneously perform (i) reproduction of a slide show showing image data selected according to the image data selection condition and (ii) output of audio data as BGM of the slide show, the audio data being selected according to the audio data selection condition.

Furthermore, according to a data output system including: the above data output device; and a data providing device, the data providing device transmitting, upon receiving from the data output device a request for transmission of data, the requested data to the data output device, and the data providing device distributing, upon receiving from the data output device a request for streaming distribution of data, the requested data to the data output device through streaming, the data output device can simultaneously perform (i) reproduction of data provided by a data providing device storing the data, the reproduction being performed without copying the data, and (ii) display of another data provided by the data providing device.

Here, the technique disclosed in Patent Literature 1 involves a problem that the users of the respective player terminals cannot confirm in advance the content of still image data to be reproduced simultaneously, i.e., the content of data shared in the entire system.

Namely, according to the configuration of Patent Literature 1, after each player terminal transmits a list of data that the player terminal provides, the player terminal cannot show the images until the player terminal displays the images in order according to the simultaneous reproduction data order list. Therefore, the user of the player terminal cannot confirm the content of data which are shared, until the images are displayed. Further, the controller terminal does not also display the simultaneous reproduction data order list. Therefore, the user of the controller terminal also cannot confirm the content of data which are shared, until the images are displayed.

Thus, with the configuration of Patent Literature 1, the user of each terminal cannot view desired data by selecting the desired data from among the data shared in the entire system, or cannot copy desired data into the user's terminal by selecting the desired data from among the data shared in the entire system.

The present invention was made in view of the foregoing problems, and an object of the present invention is to provide (i) a data output device with which shard data can be confirmed at each terminal and (ii) others related to this.

In order to solve the foregoing problems, a data output device of the present invention is a data output device for receiving and outputting data transmitted from a plurality of data providing devices, including: list receiving means for receiving, from each data providing device, a list of data that the data providing device is able to transmit to the data output device; receivable data list generating means for generating, based on the lists that the list receiving means receives, a receivable data list indicative of data that the data output device is able to receive; and receivable data list transmitting means for transmitting, to the plurality of data providing devices, the receivable data list generated by the receivable data list generating means.

Further, in order to solve the foregoing problems, a method of the present invention for controlling the data output device is a method for controlling a data output device, the data output device receiving and outputting data transmitted from a plurality of data providing devices, said method including: a list receiving step for receiving, from each data providing device, a list of data that the data providing device is able to transmit to the data output device; a receivable data list generating step for generating, based on the lists received in the list receiving step, a receivable data list indicative of data that the data output device is able to receive; and a receivable data list transmitting step for transmitting, to the plurality of data providing devices, the receivable data list generated in the receivable data list generating step.

According to the above configuration, each of the plurality of data providing devices transmits the list of data that the data providing device can transmit to the data output device. Based on the received lists, the data output device generates the receivable data list indicative of data that the data output device can receive. That is, the receivable data list indicates all data that the data output device can receive from the data providing devices.

Further, the data output device can identify a data providing device which is a transmission source of each list. Therefore, the data output device can identify, for each data included in the receivable data list, a data providing device storing the data. Furthermore, the data output device can request the identified data providing device to transmit the data. In this way, the data output device can receive the requested data. Namely, the data output device is used as a place for sharing the data stored in the respective data providing devices.

In addition, according to the above configuration, the data output device transmits the generated receivable data list to the plurality of data providing devices. Namely, according to the above configuration, it is possible to confirm, at each of the data providing devices, the data that the data output device can receive. This makes it possible to output desired data by selecting the desired data from among the data that the data output device can receive, or to copy desired data into the data providing device by selecting the desired data from among the data that the data output device can receive.

Here, an object of the technique of Patent Literature 1 is to cause the same data to be simultaneously reproduced by all the terminals connected to the network. Therefore, with the technique of Patent Literature 1, the data to be reproduced simultaneously are copied into all the terminals.

This does not cause a problem in a case where data to be transmitted from the data providing device to the data output device has a relatively small volume (e.g., in a case of image data, text data, etc.). However, if data to be reproduced has a relatively large volume (e.g., moving image data), transmission of the data would take time, and each terminal should be provided with a large-capacity storage section for storing the data received.

In order to deal with this, according to the above configuration, data transmitted between the data providing device and the data output device is only (i) a list of data that the data providing device can transmit and (ii) a receivable data list, and the entity of the data is transmitted from the data providing device to the data output device when data output is performed. With this configuration, it is possible to prevent such a case where a large amount of data is transmitted between the data providing device and the data output device at once.

Note that connection between the above data providing device and the above data output device only needs to allow the data providing device and the data output device to bi-directionally communicate with each other. The data providing device and the data output device may be connected to each other either by a wire or wireless communication. Further, the communication between the data providing device and the data output device may be performed via a relay device such as a router.

Further, data to be transmitted from the data providing device to the data output device is not particularly limited, examples of which encompass audio data, image data (moving image data and still image data), text data, and program data for television games. Note that the data providing device preferably transmits data that the data output device can output.

Further, in order to solve the foregoing problems, a data providing device of the present invention is a data providing device for transmitting data to a data output device, the data output device receiving the data from an external device and outputting the data, said data providing device including: receivable data list receiving means for receiving a receivable data list indicative of (i) data that the data output device is able to receive from the external device and (ii) data that the data output device is able to receive from the data providing device; and receivable data list display means for displaying the receivable data list that the receivable data list receiving means receives.

Further, in order to solve the foregoing problems, a method of the present invention for controlling a data providing device is a method for controlling a data providing device, the data providing device transmitting data to a data output device, the data output device receiving the data from an external device and outputting the data, said method including: a receivable data list receiving step for receiving a receivable data list indicative of (i) data that the data output device is able to receive from the external device and (ii) data that the data output device is able to receive from the data providing device; and a receivable data list display step for displaying the receivable data list received in the receivable data list receiving step.

According to the above configuration, the data providing device receives the receivable data list indicative of (i) data that the data output device can receive from the external device and (ii) data that the data output device can receive from the data providing device.

Each of the data included in the receivable data list is data that the data output device can receive from the external device or the data providing device. Therefore, the data providing device can cause the data output device to receive any data included in the receivable data list and to output the data if necessary, by giving an instruction to the data output device.

According to the above configuration, the receivable data list is displayed by the data providing device. This allows the user of the data providing device to easily confirm the data that the data output device can receive. Furthermore, with the above configuration, the user can output desired data by selecting the desired data from among the data that the data output device can receive, or copy desired data into the user's data providing device by selecting the desired data from among the data that the data output device can receive.

Note that the number of the external devices may be one, or may be two or more. Further, the external device only needs to be capable of transmitting data to the data output device. For example, the external device may be a data providing device of the present invention.

Further, the data output device preferably includes: currently-outputted data information transmitting means for transmitting, to the plurality of data providing devices, currently-outputted data information indicative of data which is currently outputted by the data output device.

According to the above configuration, it is possible to identify, at each of the data providing devices, the data that is currently outputted by the data output device. Therefore, for example, the data providing device can distinguishably display (i) data that is currently outputted by the data output device and (ii) the other data, so as to allow the user of each data providing device to easily identify which of the data in the receivable data list is the data currently outputted by the data output device.

Furthermore, the data output device preferably includes: data request transferring means for requesting, in a case where the data output device receives a request for data from one of the plurality of data providing devices, another one of the plurality of data providing devices which stores the requested data to transmit the requested data to the one data providing device.

As described above, since the data output device transmits the receivable data list to the data providing devices, each data providing device can identify the data that the data output device can receive.

Here, such a case is assumed where the user of the data providing device wishes to copy, into his/her data providing device, data among the data included in the received receivable data list. The above configuration allows the user of the data providing device to copy, into his/her data providing device, the data among the data included in the receivable data list.

Specifically, according to the above configuration, the data providing device transmits, to the data output device, a request for the data. Note that the data to be requested is selected according to the receivable data list.

As described above, the data output device has received the lists from the respective data providing devices, and has generated the receivable data list. Therefore, the data output device can identify, for each data included in the receivable data list, a data providing device storing the data.

Accordingly, upon receiving the request for the data, the data output device can request that the requested data be transmitted to the data providing device which is the transmission source of the request. In response to this, the data providing device storing the requested data transmits the data to the data providing device which is the transmission source of the request. Consequently, the data providing device which is the transmission source of the request can receive the requested data.

Further, the data providing device preferably includes: selecting means for selecting data from the receivable data list displayed by the receivable data list display means; and output instructing means for requesting the data output device to output the data selected by the selecting means.

Here, note that the receivable data list indicates the data that the data output device can receive. Thus, the data output device can receive and output any data, as long as the data is included in the receivable data list.

In view of this, the above configuration includes the selecting means, which makes it possible to select data from the receivable data list. Further, the above configuration requests the data output device to output the data thus selected by the selecting means.

Namely, according to the above configuration, the user of the data providing device can cause the data output device to output data, merely by selecting the data from the receivable data list displayed by his/her data providing device.

Furthermore, the data providing device preferably includes: currently-outputted data information receiving means for receiving currently-outputted data information indicative of data which is currently outputted by the data output device, wherein: according to the currently-outputted data information that the currently-outputted data information receiving means receives, the receivable data list display means displays the receivable data list in such a manner that (i) the data which is currently outputted by the data output device is distinguishable from (ii) data which is not currently outputted by the data output device.

According to the above configuration, the receivable data list is displayed in such a manner that (i) data that is currently outputted by the data output device is distinguishable from (ii) data that is not currently outputted by the data output device. This allows the user of the data providing device to easily identify which of the data that the data output device can receive is currently outputted.

Further, it is preferable that the receivable data list display means (i) identifies, from among the data included in the receivable data list, data stored in the data providing device, and (ii) displays the receivable data list in such a manner that the identified data is distinguishable from data other than the identified data.

According to the above configuration, (i) the data stored in the data providing device and (ii) the other data are displayed distinguishably. This allows the user of the data providing device to identify, from among the data that the data output device can receive, the data stored in the data providing device.

As described above, the data output device receives data from the data providing device and outputs the data. Therefore, among data to be outputted by the data output device, data stored in the data providing device is data to be transmitted from the data providing device to the data output device.

Namely, according to the above configuration, the user of the data providing device can confirm the content of data to be transmitted from his/her data providing device, among data each of which is a candidate for data outputted by the data output device. With this, for example, if the receivable data list includes data that the user of the data providing device does not want to transmit to the data output device, the user can prohibit transmission of the data.

Furthermore, any data output system can provide the same effects as above, as long as the data output system includes the above data output device and the above data providing device. This is because that such the data output system makes it possible to confirm, at the data providing device, data that the data output device can receive.

Note that the above data output device and the above data providing device may be realized by a computer. In this case, the present invention encompass (i) a control program for causing a computer to realize the above data output device and the above data providing, by causing the computer to serve as each means of the data output device and the data providing device and (ii) a computer-readable storage medium storing the control program.

Advantageous Effects of Invention

As described above, a data output device of the present invention includes: output possibility information transmitting means for transmitting, to the data providing device, output possibility information indicative of (i) a file format of data that the data output device is able to output or (ii) a file format of data that the data output device is unable to output; data sharing means for requesting the data providing device to transmit, to the data output device, data that the data output device is able to output, the data being selected according to the output possibility information, from among data that the data providing device is able to provide; and data output means for outputting the data received from the data providing device.

Further, as described above, a method of the present invention for controlling a data output device includes: an output possibility information transmitting step for transmitting, to the data providing device, output possibility information indicative of (i) a file format of data that the data output device is able to output or (ii) a file format of data that the data output device is unable to output; a data sharing step for requesting the data providing device to transmit, to the data output device, data that the data output device is able to output, the data being selected according to the output possibility information, from among data that the data providing device is able to provide; and a data outputting step for outputting the data received from the data providing device.

Thus, according to the received output possibility information, the data providing device can transmit, to the data output device, only data that the data output device can output. This makes is possible to avoid such a case where data that the data output device cannot output is transmitted to the data output device.

For a fuller understanding of the nature and advantages of the invention, reference should be made to the ensuing detailed description taken in conjunction with the accompanying drawings.

DESCRIPTION OF EMBODIMENTS

The following will describe one embodiment of the present invention with reference to FIGS. 1 through 26. First, an outline of a remote operation system of the present invention will be described with reference to FIG. 2.

[Outline of Remote Operation System 100]

Figure 2:
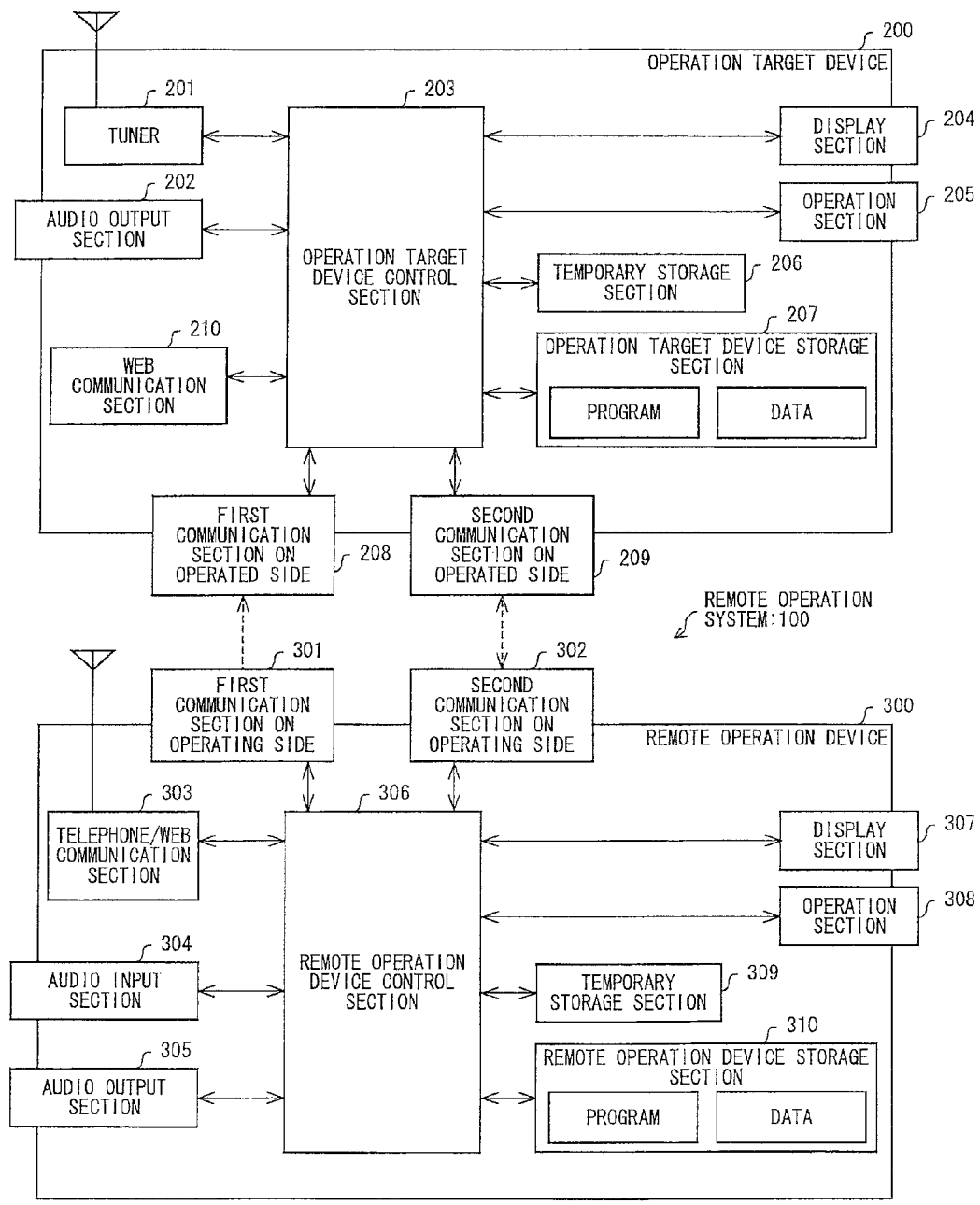
FIG. 2 is a block diagram illustrating a configuration of a main part of a remote operation system including the operation target device and the remote operation device.

FIG. 2 is a block diagram illustrating a configuration of a main part of a remote operation system (data output system) 100 of the present invention. As shown in FIG. 2, the remote operation system 100 includes an operation target device (data output device) 200 and a remote operation device (data providing device) 300. The remote operation system 100 is a system for operating the operation target device 200 via the remote operation device 300. It is assumed herein that the remote operation device 300 is a mobile phone, and the operation target device 200 is a television receiver.

Note that the remote operation system 100 is not limited to this example, and only needs to be such a system in which data provided by the remote operation device 300 is outputted by the operation target device 200. Namely, the remote operation device 300 only needs to be capable of transmitting data to the operation target device 200. For example, the remote operation device 300 may be a PDA, a smartphone, a PHS (Personal handy Phone System), a laptop personal computer, a portable game player, or the like. Alternatively, the remote operation device 300 may be a remote controller provided with a display screen used to operate the operation target device 200. Further alternatively, the remote operation device 300 may be a storage device storing data to be provided to the operation target device 200.

The operation target device 200 only needs to be capable of receiving and outputting data provided by the remote operation device 300. For example, the operation target device 200 may be a personal computer, a music player, a car navigation system, or the like. Alternatively, the operation target device 200 may be (i) a display device such as a LCD (Liquid Crystal Display) device, a PDP (Plasma Display Panel) device, an EL (Electro Luminescence) display device, or a CRT (Cathode Ray Tube)-based display device or (ii) a speaker for outputting audio.

Note that the operation target device 200 and the remote operation device 300 may be of the same kind. For example, both of the remote operation device 300 and the operation target device 200 may be mobile phones. Note also that "data output" herein means "audio output" in a case where the data is audio data; whereas it means "display output" in a case where the data is an image, characters, or the like.

[Configuration of Operation Target Device 200]

As shown in FIG. 2, the operation target device 200 includes a tuner 201, an audio output section 202, an operation target device control section 203, a display section 204, an operation section 205, a temporary storage section 206, an operation target device storage section 207, a first communication section 208 on the operated side, a second communication section 209 on the operated side, and a web communication section 210.

The tuner 201 selects and receives a broadcast wave of a channel designated by the operation target device control section 203. Then, the tuner 201 converts the received broadcast wave into a predetermined signal, and outputs the predetermined signal. The operation target device 200 performs a process (e.g., decoding) on this signal, so as to output a video and/or audio of the received channel. Note that the tuner 201 only needs to be provided with a function of receiving a broadcast wave and converting the received broadcast wave into a predetermined signal. For example, the tuner 201 may be conventional, generally-used one such as a digital terrestrial television tuner, a BS tuner, or a CS tuner, as needed Based on the output from the tuner 201 and an instruction from the operation target device control section 203, the audio output section 202 outputs the audio to the outside of the operation target device 200. The audio output section 202 can be constituted by, e.g., a speaker.

The operation target device control section 203 controls operation of the operation target device 200 comprehensively. The operation target device control section 203 can be constituted by, e.g., a CPU (Central Processing Unit). The operation target device control section 203 operates while using the temporary storage section 206 as a work area, which temporary storage section 206 is constituted by, e.g., a RAM (Random Access Memory). The operation performed by the operation target device control section 203 will be described in detail later.

The display section 204 is a display device that displays a video based on the output from the tuner 201 and an instruction from the operation target device control section 203. For example, the display section 204 can be an LCD device, an EL display device, a PDP device, or a CRT-based display device.

The operation section 205 allows the user to input an instruction to the operation target device 200. The operation section 205 only needs to allow the user to input a desired instruction, and is not limited to any specific type. It is assumed herein that provided as the operation section 205 include operation keys corresponding to various instructions which are to be inputted. Specifically, it is assumed that provided as the operation section 205 include operation keys corresponding to various instructions which are to be inputted, e.g., an instruction to switch a channel, an instruction to turn up/down audio volume, and an instruction to turn on/off of a power supply to the operation target device 200.

As shown in FIG. 2, the operation target device storage section 207 stores a program and data. In the operation target device 200, the operation target device control section 203 loads, to the temporary storage section 206, the program stored in the operation target device storage section 207, and executes the program. In this manner, the operation target device 200 performs predetermined operation.

The first communication section 208 on the operated side and the second communication section 209 on the operated side allow the operation target device 200 to communicate with an external device. The first communication section 208 on the operated side is configured to be capable of communicating with a first communication section 301 on the operating side, and the second communication section 209 on the operated side is configured to be capable of communicating with a second communication section 302 on the operating side. The first communication section 208 on the operated side and the second communication section 209 on the operated side will be described in detail later.

The web communication section 210 performs communication through connection with a network. It is assumed herein that the web communication section 210 is provided with, e.g., (i) a function of web browsing through connection with the Internet, (ii) a function of receiving IP broadcast through streaming, (iii) a function of executing TCP/IP communication. It is assumed herein that the web communication section 210 performs communication through connection with the Internet. Alternatively, however, the web communication section 210 may be the one performing communication through connection with an intranet, extranet, LAN, ISDN, VAN, CATV communications network, virtual dedicated network (virtual private network), telephone line network, or the like.

[Configuration of Remote Operation Device 300]

As shown in FIG. 2, the remote operation device 300 includes the first communication section 301 on the operating side, the second communication section 302 on the operating side, a telephone/web communication section 303, an audio input section 304, an audio output section 305, a remote operation device control section 306, a display section 307, an operation section 308, a temporary storage section 309, and a remote operation device storage section 310.

The first communication section 301 on the operating side and the second communication section 302 on the operating side allow the remote operation device 300 to communicate with an external device. The first communication section 301 on the operating side is configured to be capable of communicating with the first communication section 208 on the operated side, and the second communication section 302 on the operating side is configured to be capable of communicating with the second communication section 209 on the operated side. The first communication section 301 on the operating side and the second communication section 302 on the operating side will be described in detail later.

The telephone/web communication section 303 enables a telephone call with another mobile phone or a fixed-line telephone through a mobile phone network, or performs communication through connection with the Internet. These functions are realized by a telephone network communication section (not illustrated) and a mobile phone network communication section (not illustrated). The telephone/web communication section 303 only needs to be provided with at least a function of enabling a telephone call, and can be the one used in a conventional mobile phone or the like.

The audio input section 304 is for inputting an audio signal to the remote operation device 300, e.g., during a telephone call. The audio output section 305 is for outputting audio based on the audio signal and/or the like that the telephone/web communication section 303 receives, e.g., during a telephone call. The audio output section 305 also outputs audio such as the one notifying reception of a phone call, an e-mail, etc. The audio input section 304 only needs to be capable of audio input, and the audio output section 305 only needs to be capable of audio output. Each of the audio input section 304 and the audio output section 305 can be the one used in a conventional mobile phone or the like.

The remote operation device control section 306 controls operation of the remote operation device 300 comprehensively, and can be constituted by, e.g., a CPU. The remote operation device control section 306 operates while using the temporary storage section 309 as a work area, which temporary storage section 309 is constituted by, e.g., a RAM. The operation performed by the remote operation device control section 306 will be described in detail later.

The display section 307 displays an image according to an instruction given by the remote operation device control section 306. Between the remote operation device control section 306 and the display section 307, there provided a structure (not illustrated) which is necessary for display of an image, as needed. For example, the structure is a VDP (Video Display Processor), a VRAM (video RAM), or the like. The display section 307 can be constituted by, e.g., an LCD panel or an EL display panel.

The operation section 308 allows the user of the remote operation device 300 to input an instruction to the remote operation device 300. The operation section 308 only needs to allow the user to input a desired instruction, and is not limited to any specific type. It is assumed herein that the operation section 308 is operation keys provided on a surface of a main body of the remote operation device 300. Specifically, it is assumed that provided as the operation keys includes, e.g., (i) various menu keys for instructing the display section 307 to display menu screens such as a menu screen related to an e-mail and a menu screen related to connection with the Internet, (ii) direction (up, down, right, left) keys for making a selection from items displayed on the display section 307, (iii) an enter key for determining a selected item, and (iv) character input keys for inputting characters and numeric characters.

As shown in FIG. 2, the remote operation device storage section 310 stores a program and data. In the remote operation device 300, the remote operation device control section 306 loads, to the temporary storage section 309, the program stored in the remote operation device storage section 310, and executes the program. In this manner, the remote operation device 300 performs predetermined operation. Further, the remote operation device storage section 310 stores, e.g., (i) data such as an e-mail received by the telephone/web communication section 303 and/or (ii) data such as a telephone number and/or an e-mail address registered by the user of the remote operation device 300.

[Outline of the Invention]

Figure 3:
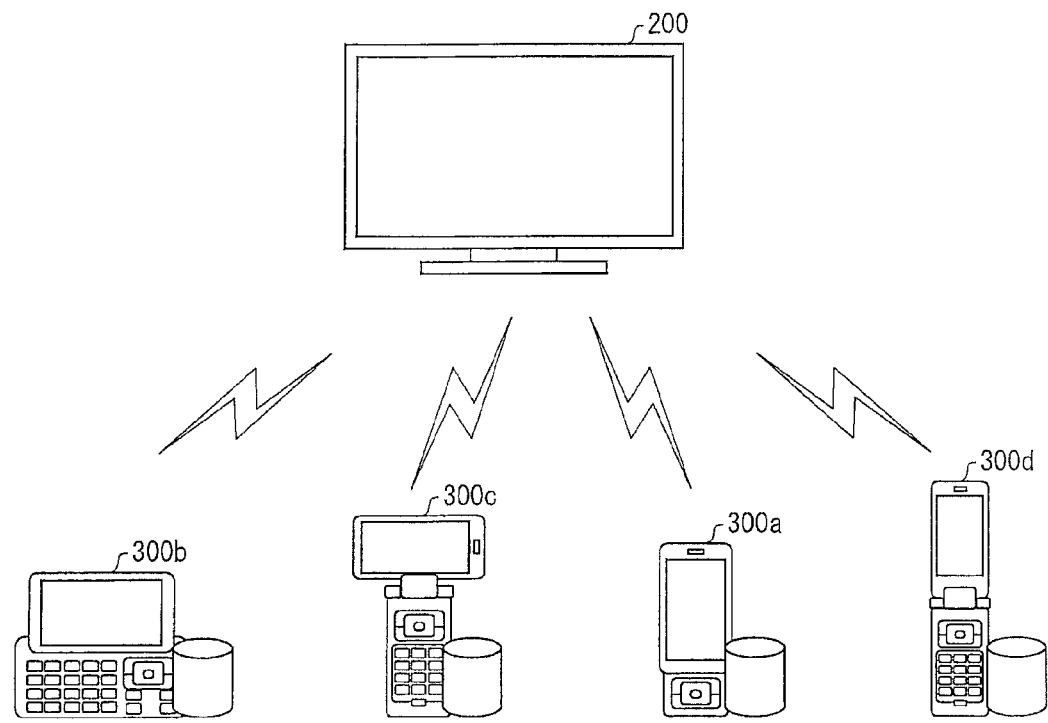
FIG. 3 is a view illustrating one example of a system configuration of the remote operation system.
Figure 4:
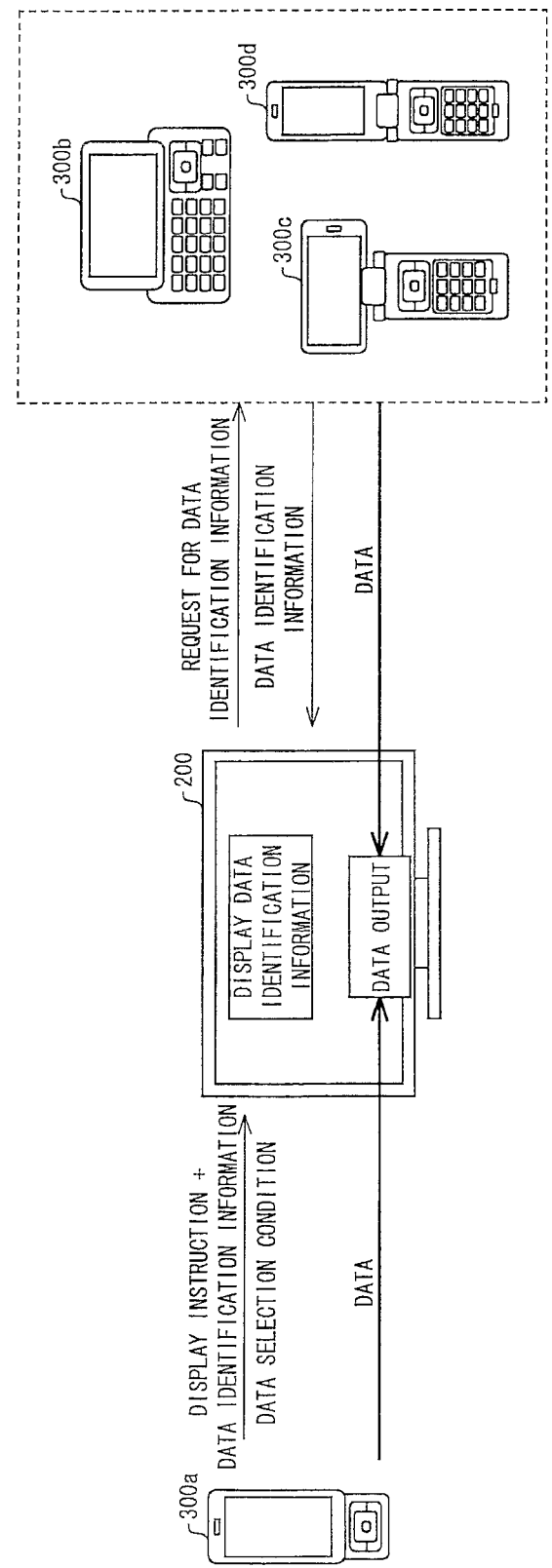
FIG. 4 is a view schematically illustrating a process performed in the remote operation system, which process causes the operation target device to output data stored in the remote operation devices.

Next, the following will describe an outline of the present invention with reference to FIGS. 3 and 4. FIG. 3 is a view illustrating one example of a system configuration of the remote operation system 100. In the example shown in FIG. 3, the remote operation system 100 has such a system configuration in which one (1) operation target device 200 is connected to four remote operation devices (300a through 300d) over wireless communication. However, the number of remote operation devices 300 included in the remote operation system 100 is not particularly limited, and can be any number.

Note that each of the remote operation devices 300a through 300d has the same configuration as that of the remote operation device 300 shown in FIG. 2. Note also that, hereinafter, any of or all of the remote operation devices 300a through 300d may be called "remote operation device 300".

It is assumed that, in the remote operation system 100, the second communication section 209 on the operated side and the second communication section 302 on the operating side communicate with each other over Bluetooth (Registered Trademark) communication, so that the operation target device 200 transmits/receives data to/from the remote operation devices 300a through 300d. However, the present invention is not limited to this example, and the second communication section 209 on the operated side and the second communication section 302 on the operating side only need to allow the operation target device 200 and the remote operation device 300 to bi-directionally communicate with each other.

For example, for the communication between the second communication section 209 on the operated side and the second communication section 302 on the operating side, it is possible to apply ZigBee (Registered Trademark) or UWB (Ultra Wide Band). Alternatively, for the communication between the second communication section 209 on the operated side and the second communication section 302 on the operating side, it is possible to apply IEEE802.11 wireless such as Wi-Fi (Registered Trademark). Further alternatively, the operation target device 200 and the remote operation device 300 may be connected to each other via a wire.

According to the remote operation system 100, it is possible to cause the operation target device 200 to output data stored in the remote operation devices 300a through 300d. This will be described with reference to FIG. 4. FIG. 4 is a view schematically illustrating a process performed in the remote operation system 100, which process causes the operation target device 200 to output data stored in the remote operation devices 300a through 300d.

FIG. 4 illustrates an example where, according to an instruction given by the remote operation device 300a, the operation target device 200 is caused to output data stored in the remote operation devices 300a through 300d. Alternatively, the terminal that gives an instruction to the operation target device 200 may be any of the remote operation devices 300a through 300d.

As shown in FIG. 4, the remote operation device 300a first transmits, to the operation target device 200, (i) data identification information used to identify data that the remote operation device 300a wishes to share in the remote operation system 100 and (ii) a data selection condition for selecting data to be shared in the remote operation system 100. In addition, the remote operation device 300a also transmits, to the operation target device 200, a display instruction to cause the operation target device 200 to display the data identification information.

Note that the data identification information indicates the content of the data which is to be shared, and also includes terminal identification information indicative of an owner of the data (i.e., a terminal storing the data). That is, it is possible to identify, from the data identification information, an owner of the corresponding data.

Next, upon receiving the data identification information, the data selection condition, and the display instruction, the operation target device 200 displays the data identification information according to the received display instruction. This enables the user of the remote operation system 100 to confirm the content of the data that the user of the remote operation device 300a wishes to share in the remote operation system 100.

Further, the operation target device 200 requests the remote operation devices 300b through 300d to transmit, to the operation target device 200, data identification information of data satisfying the received data selection condition. Upon receiving this request, each of the remote operation devices 300b through 300d selects, from among data stored therein, data satisfying the data selection condition, and transmits, to the operation target device 200, data identification information of the selected data.

Thus, in the remote operation system 100, the remote operation devices 300a through 300d first transmit the data identification information to the operation target device 200. This makes it possible to reduce an amount of data to be transmitted from the remote operation devices 300a through 300d to the operation target device 200, as compared with a case where the entity of data is transmitted. Note that the entity of data may be transmitted, in a case where it is not necessary to reduce an amount of data to be transmitted from the remote operation devices 300a through 300d to the operation target device 200 or in a case where a volume of the entity of data is small.

As described above, the data identification information includes the terminal identification information. Thus, according to the data identification information transmitted from the remote operation devices 300a through 300d, the operation target device 200 can identify (i) data shared in the remote operation system 100 and (ii) which of the remote operation devices 300a through 300d stores the data.

Thus, according to the data identification information, the operation target device 200 can transmit, to the remote operation devices 300a through 300d, requests for transmission of the data. Consequently, the operation target device 200 can cause the remote operation devices 300a through 300d to transmit the data to the operation target device 200, and can output the data.

[Concrete Example of Operation]

Figure 5:
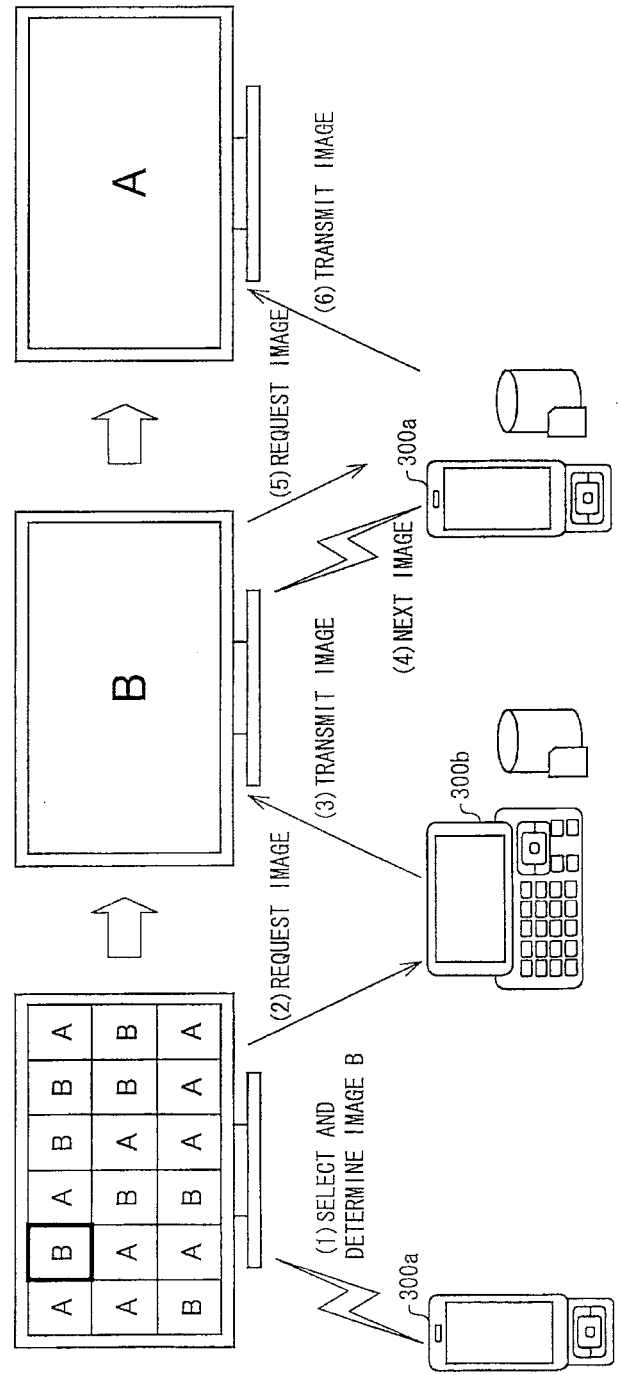
FIG. 5 is a view illustrating a concrete example of data output performed by the remote operation system.

Next, with reference to FIG. 5, the following will describe a concrete example of data output performed by the remote operation system 100. FIG. 5 is a view illustrating a concrete example of data output performed by the remote operation system 100. Illustrated in FIG. 5 is an example where the operation target device 200 outputs images stored in the remote operation devices 300a and 300b.

Note that the data to be shared and outputted in the remote operation system 100 is not limited to an image, and may be any data as long as the data can be outputted by the operation target device 200. Further, shared in the remote operation system 100 is only data that the operation target device 200 can output; therefore, data being in a file format that the operation target device 200 cannot deal with is not transmitted to the operation target device 200. This will be described in detail later.

According to data identification information received from the remote operation devices 300a and 300b, the operation target device 200 displays the content of data stored in each terminal. Here, data to be shared is assumed to be an image. Therefore, the remote operation devices 300a and 300b transmit, to the operation target device 200, thumbnails of images stored in the remote operation devices 300a and 300b, as the data identification information. Then, the operation target device 200 displays the thumbnails.

In the example shown in FIG. 5, the display screen of the operation target device 200 includes (i) areas indicated as "A", in which the thumbnails of images stored in the remote operation device 300a are displayed, and (ii) areas indicated as "B", in which the thumbnails of images stored in the remote operation device 300b are displayed.

Note that the data identification information of an image is not necessarily a thumbnail. Alternatively, for example, the data identification information of an image may be a file name of the image or the like. However, it is preferable to use a thumbnail as the data identification information, since this allows the operation target device 200 to display the thumbnail, thereby allowing the user of the remote operation system to recognize the content of the image at a glance.

Further, the operation target device 200 preferably displays, together with each thumbnail, terminal identification information indicative of a terminal storing an image corresponding to the thumbnail. This allows the user of the remote operation system 100 to identify at a glance a terminal storing actual data (high-resolution image) corresponding to the respective thumbnail which is displayed.

By inputting an instruction to the operation section 308 of each of the remote operation device 300a and 300b, the users of the respective remote operation devices 300a and 300b can make a selection from the thumbnails displayed by the operation target device 200. The example shown in FIG. 5 is a case where the remote operation device 300a has selected, from among the thumbnails displayed by the operation target device 200, an image "B" located in the first row from the top and in the second column from the left, and has determined the selected image "B".

In response to determination of the thumbnail, the operation target device 200 requests the transmission source of the determined thumbnail, i.e., the terminal storing actual data corresponding to the determined thumbnail, to transmit the actual data. Herein, the image "B" is assumed to be selected. Therefore, a request for transmission of the image is transmitted to the remote operation device 300b.

Next, the remote operation device 300b, which has received the request for transmission of the image, transmits the requested image to the operation target device 200. Then, the operation target device 200 displays the received image on its display screen. Thus, in the remote operation system 100, when the operation target device 200 performs data output, the entity of data (actual data) is transmitted from the remote operation devices 300a or 300b to the operation target device 200.

Furthermore, the remote operation system 100 is provided with a shuffle output function (details thereof will be described later). In the shuffle output function, the operation target device 200 (i) determines the order of output of data indicated by the individual data identification information that the operation target device 200 has received, (ii) requests, in the determined order, the remote operation devices 300a through 300d to transmit the data to the operation target device 200, and (iii) sequentially outputs the data thus obtained. Thus, by causing the operation target device 200 to output data stored in the remote operation device 300, it is possible to allow all the people being in the place to enjoy viewing the image.

Moreover, the remote operation system 100 allows, during the shuffle output, a music tune stored in the remote operation device 300 to be distributed to the operation target device 200 through streaming, so as to make it possible to view the images with BGM (Back Ground Music).

[Greater Detail of Configuration of Operation Target Device 200]

Figure 1:
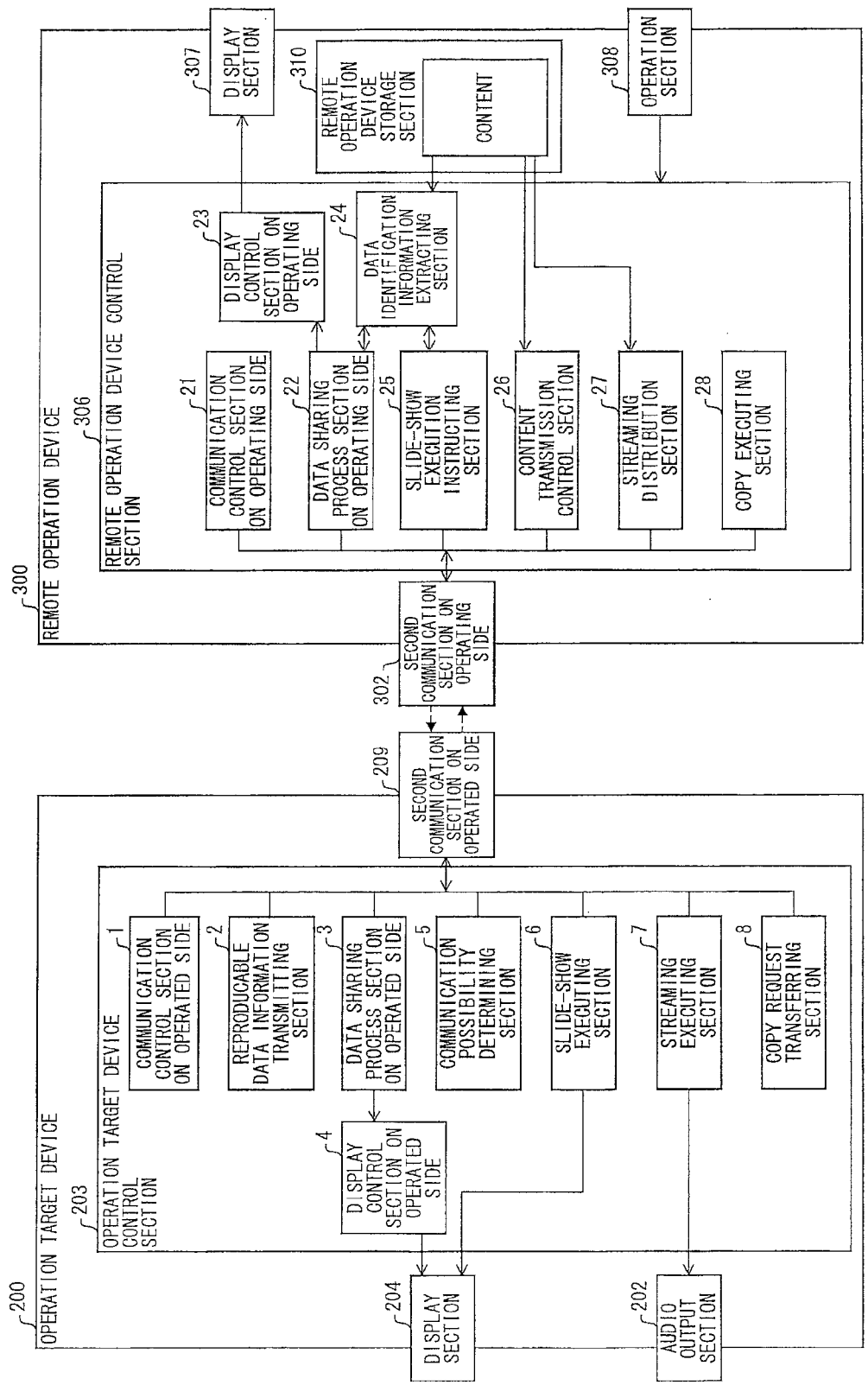
FIG. 1 is a block diagram illustrating a configuration of a main part of each of an operation target device and a remote operation device of an embodiment of the present invention.

Next, the following will describe a greater detail of a configuration of the operation target device 200 with reference to FIG. 1. FIG. 1 is a block diagram illustrating a configuration of a main part of each of the operation target device 200 and the remote operation device 300. As shown in FIG. 1, the operation target device control section 203 includes a communication control section 1 on the operated side, a reproducable data information transmitting section (output possibility information transmitting means) 2, a data sharing process section 3 on the operated side (data sharing means, list receiving means, receivable data list generating means, receivable data list transmitting means, currently-outputted data information transmitting means), a display control section 4 on the operated side, a communication possibility determining section 5, a slide-show executing section (data transmission request means, data output means, data display means, output control means) 6, a streaming executing section (streaming reproduction means) 7, and a copy request transferring section (data request transferring means) 8.

The communication control section 1 on the operated side performs a connecting process, by which communication connection is established between the operation target device 200 and the remote operation device 300. Specifically, upon receipt of a connection request from the remote operation device 300, the communication control section 1 on the operated side transmits a connection permission to the remote operation device 300 via the second communication section 209 on the operated side. Consequently, the communication connection is established between the operation target device 200 and the remote operation device 300 via the second communication section 209 on the operated side.

The reproducable data information transmitting section 2 transmits reproducable data information (output possibility information) indicative of a file format of data that the operation target device 200 can output. This makes it possible to avoid such a case where data that the operation target device 200 cannot output is shared in the remote operation system 100. Note that the reproducable data information transmitting section 2 may be the one which transmits data being in a file format that the operation target device 200 cannot output. Even in this case, it is also possible to prevent such a case where data that the operation target device 200 cannot output is shared in the remote operation system 100.

The data sharing process section 3 on the operated side requests the remote operation device 300 to transmit, to the operation target device 200, data identification information of data that the operation target device 200 can output, the data being selected according to the reproducable data information, from among data that the remote operation device 300 can provide.

Further, upon receipt of a data selection condition which is supplied from the remote operation device 300 and indicates a condition used to select the data identification information, the data sharing process section 3 on the operated side transmits the received data selection condition to any remote operation device 300 other than the transmission source of the data selection condition. Further, the data sharing process section 3 on the operated side requests said any remote operation device 300 to transmit, to the operation target device 200, data identification information of data selected according to the data selection condition.

For example, in a case where a data selection condition is received from the remote operation device 300a, the data sharing process section 3 on the operated side transmits the received data selection condition to the remote operation devices 300b through 300d. Further, the data sharing process section 3 on the operated side requests the remote operation devices 300b through 300d to transmit, to the operation target device 200, data identification information of data selected according to the data selection condition.

The display control section 4 on the operated side causes the display section 204 to display an image according to an instruction given by the data sharing process section 3 on the operated side. The display control section 4 on the operated side can cause the display section 204 to display a still image or a moving image.

The communication possibility determining section 5 determines whether or not it is possible to communicate with a terminal with which communication connection has been established by the communication control section 1 on the operated side. Specifically, the communication possibility determining section 5 transmits a response request to the terminal with which communication connection has been established. If there is a response to the response request, the communication possibility determining section 5 determines that communication with the terminal is possible. On the other hand, if no response is confirmed, the communication possibility determining section 5 determines that communication with the terminal is impossible.

According to this configuration, for example, if the communication connection is interrupted (e.g., when the remote operation device 300 is brought to outside of the communication range with the operation target device 200), the operation target device 200 can recognize that communication with the terminal has become impossible. Thus, the operation target device 200, which includes the communication possibility determining section 5, can avoid such a case where a request for transmission of data is wastefully transmitted to the remote operation device 300 with which communication connection has been interrupted.

The slide-show executing section 6 reproduces a slide show, upon receipt of an instruction to execute the slide show. Specifically, upon receipt of the instruction to execute the slide show, the slide-show executing section 6 generates reproduction management information indicative of the order of output of the data included in the data identification information. Then, according to the reproduction management information thus generated, the slide-show executing section 6 transmits, to the remote operation device 300, a request for transmission of data. Then, the slide-show executing section 6 causes the display section 204 to display the data received from the remote operation device 300, in the order in which the data have been received.

Further, the slide-show executing section 6 reproduces the side show in such a manner that, at a time point which is a predetermined time period before display of data, the slide-show executing section 6 determines whether or not a remote operation device 300 storing the data can transmit the data to the operation target device 200.

Specifically, the slide-show executing section 6 transmits an advance notice to the remote operation device 300 storing the data which is to be displayed. Then, if the slide-show executing section 6 receives a notification indicating that the remote operation device 300 can transmit the data, the slide-show executing section 6 determines that the remote operation device 300 can transmit the data. On the other hand, if the slide-show executing section 6 receives a notification indicating that the remote operation device 300 cannot transmit the data, or if the slide-show executing section 6 cannot confirm both of (i) the notification indicating that the remote operation device 300 can transmit the data and (ii) the notification indicating that the remote operation device 300 cannot transmit the data, the slide-show executing section 6 determines that the remote operation device 300 can transmit the data.

If the slide-show executing section 6 determines that the remote operation device 300 can transmit the data, the slide-show executing section 6 changes a candidate for data requested to be transmitted, from the data to next data, which is to be outputted following the data. That is, the slide-show executing section 6 transmits an advance notice to a remote operation device 300 storing the next data, which is to be outputted following the data. This makes it possible to prevent such a case where the slide show is interrupted due to the absence of the remote operation device 300.

The streaming executing section 7 receives data distributed through streaming, and causes the audio output section 202 and/or the display section 204 to output the data. That is, in a case where the streaming executing section 7 receives streamed data corresponding to a music tune or the like, the streaming executing section 7 causes the audio output section 202 to output the streamed data thus received. On the other hand, in a case where the streaming executing section 7 receives streamed data corresponding a moving image, the streaming executing section 7 causes the audio output section 202 and/or the display section 204 to output the streamed data thus received.

Note that the "streaming" herein refers to a reproduction method for simultaneously performing (i) downloading of data and (ii) reproduction of the data. This reproduction method is configured so as not to leave, in the operation target device 200, the data distributed through streaming. Namely, in a case where a music tune or a moving image is distributed from the remote operation device 300 to the operation target device 200 through streaming, data corresponding to the music tune or the moving image is not left in the operation target device 200 after reproduction of the music tune or the moving image is ended.

Thus, according to the remote operation system 100, even in a case where a music tune or a moving image that is shared is reproduced, a copy of data corresponding to the music tune or the moving image is not generated. Therefore, with the remote operation system 100, it is possible to avoid copyright infringement.

Upon receipt of a copy request for data shared in the remote operation system 100 from the remote operation device 300, the copy request transferring section 8 refers to the data identification information so as to identify a terminal storing the data which is requested to be copied, and transfers the received copy request to the terminal thus identified.

It is a problem to copy a copyrighted music tune, a copyrighted moving image, a copyrighted document, and/or the like. In view of this, the copy request transferring section 8 may determine whether or not the data which is requested to be copied is copyrighted. Then, if the data is determined to be copyrighted, the copy request transferring section 8 may notify the terminal which is the source of the copy request that copying of the data is impossible. This configuration can be realized by incorporating, into the data identification information, information indicative of whether or not the corresponding data is copyrighted.

[Greater Detail of Configuration of Remote Operation Device 300]

Next, the following will describe a greater detail of a configuration of the remote operation device 300, with reference to FIG. 1 as well as the above. As shown in FIG. 1, the remote operation device control section 306 includes a communication control section 21 on the operating side, a data sharing process section 22 on the operating side (list transmitting means, receivable data list receiving means, receivable data list display means, currently-outputted data information receiving means), a display control section 23 on the operating side, a data identification information extracting section 24, a slide-show execution instructing section (selecting means, output instructing means) 25, a content transmission control section (data transmitting means) 26, a streaming distribution section 27, and a copy executing section 28.

Further, as shown in FIG. 1, the remote operation device storage section 310 stores content. Each content item is data which may become a candidate for data to be shared in the remote operation system 100. It is assumed herein that the remote operation device storage section 310 stores, as the content, a still image and audio data. Note that it is possible to share, in the remote operation system 100, any data (e.g., a moving image, text data, etc.) other than the still image or the audio data. Note also that the content may be stored in a storage medium which can be attached to/detached from the remote operation device 300.

The communication control section 21 on the operating side performs a connecting process for establishing communication connection with the operation target device 200. Specifically, the communication control section 21 on the operating side transmits a connection request to the operation target device 200 via the second communication section 302 on the operating side. In response to the connection request thus transmitted, the operation target device 200 returns a connection permission. As a result, communication connection is established between the operation target device 200 and the remote operation device 300 via the second communication section 302 on the operating side.

The data sharing process section 22 on the operating side instructs the data identification information extracting section 24 to extract, from among the data (content items) stored in the remote operation device storage section 310, data identification information of data that the operation target device 200 can output. Then, the data sharing process section 22 on the operating side transmits, to the operation target device 200, the data identification information thus extracted.

The display control section 23 on the operating side causes the display section 307 to display an image for operating the remote operation device 300, according to an instruction given by the data sharing process section 22 on the operating side. Note that the image that the display control section 23 on the operating side causes the display section 307 to display is a still image or a moving image.

According to an instruction given by the data sharing process section 22 on the operating side, the data identification information extracting section 24 extracts, from among the content items stored in the remote operation device storage section 310, the data identification information. Further, the data identification information extracting section 24 instructs the display control section 23 on the operating side to cause the display section 307 to display the data identification information thus extracted, if necessary.

This allows the user of the remote operation device 300 to confirm the content of data which has been selected by the data identification information extracting section 24. Accordingly, the user can change and/or add data to be shared (i.e., data whose data identification information is to be transmitted to the operation target device 200), if necessary.

The slide-show execution instructing section 25 causes the operation target device 200 to execute reproduction of a slide show. Specifically, upon receiving an instruction to execute the slide show, the slide-show execution instructing section 25 transmits to the operation target device 200 an instruction to execute the slide show, so as to cause the operation target device 200 to execute reproduction of the slide show.

Upon receiving from the operation target device 200 a request for transmission of data, the content transmission control section 26 reads out the requested data from the remote operation device storage section 310, and transmits the data to the operation target device 200.

The streaming distribution section 27 distributes moving image data or audio data through streaming. Specifically, upon receiving a request for streaming distribution, the streaming distribution section 27 reads out, from the remote operation device storage section 310, a content item requested to be distributed through streaming, and distributes the content item to the source of the request for streaming distribution.

The copy executing section 28 performs a data copy process in which data stored in another terminal is copied into the remote operation device. The data copy process will be described in detail later.

[Flow of Overall Process]

Figure 6:
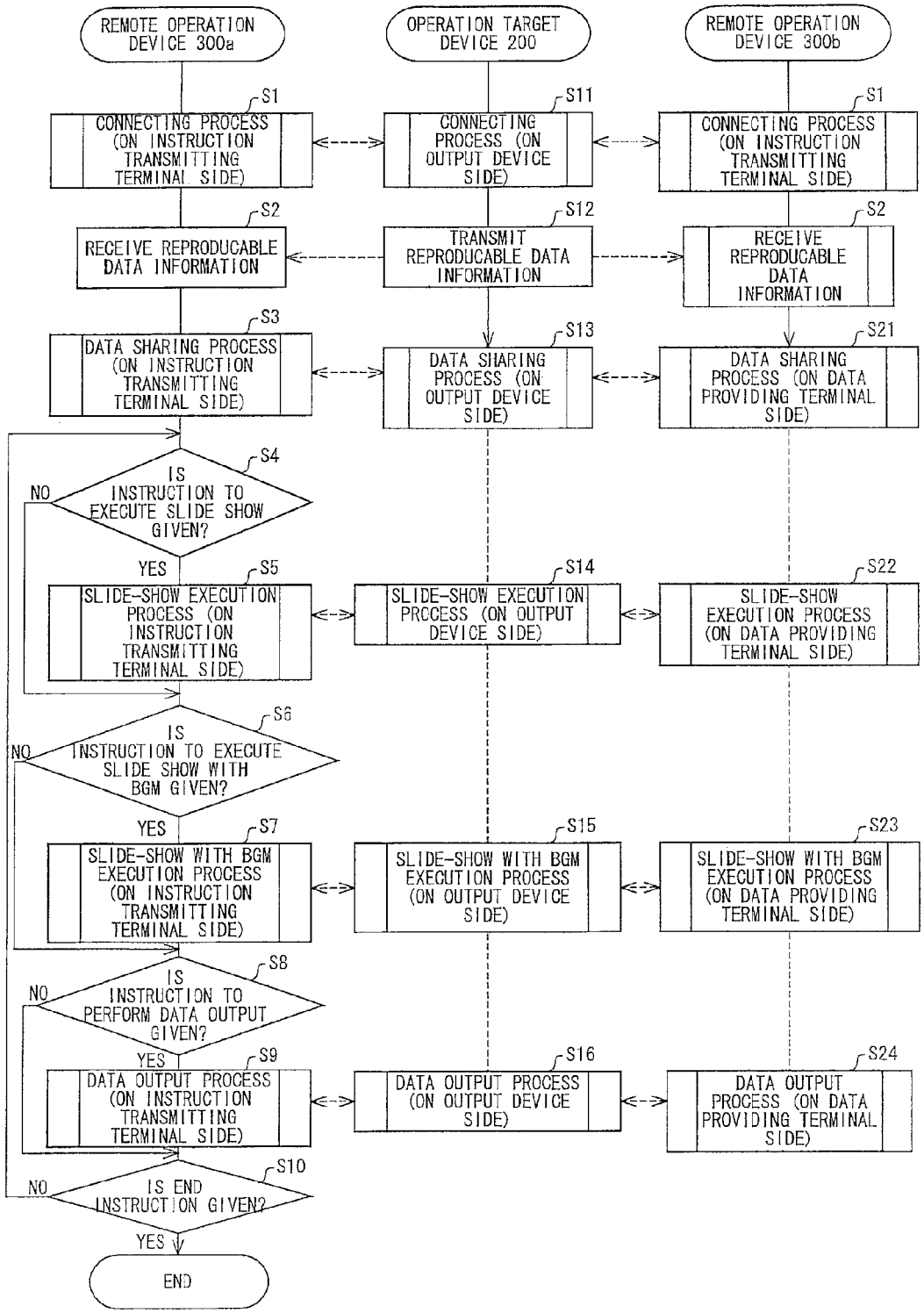
FIG. 6 is a flow chart illustrating one example of a process performed in the remote operation system, which process includes data sharing to data output.

In the remote operation system 100, firstly, data is shared between the remote operation device 300 and the operation target device 200. Thereafter, according to an instruction given by the remote operation device 300, the operation target device 200 outputs the shared data. A flow of this process will be described with reference to FIG. 6. FIG. 6 is a flow chart illustrating one example of a process performed in the remote operation system 100, which process includes data sharing to data output.

Here, an explanation will be made based on the assumption that (i) the remote operation device 300a is an instruction transmitting terminal, which transmits a manipulation instruction to the operation target device 200, (ii) the remote operation device 300b is a data providing terminal, which provides data to the operation target device 200, and (iii) the operation target device 200 is an output device, which outputs the data provided by the data providing terminal.

Note that the instruction transmitting terminal also serves as a data providing terminal. That is, the instruction transmitting terminal transmits a manipulation operation instruction to the operation target device 200 for data output, and also serves as a data providing terminal when receiving, from the operation target device 200, a request for transmission of data.

<<Process Performed by Remote Operation Device 300a (Instruction Transmitting Terminal)>>

First, the remote operation device 300a performs a connecting process (on the instruction transmitting terminal side) so as to establish communication connection with the operation target device 200 (S1). In the connecting process (on the instruction transmitting terminal side), the communication control section 21 on the operating side transmits a connection request to the operation target device 200. Then, the communication control section 21 on the operating side confirms reception of a connection permission supplied in response to the connection request thus transmitted. Consequently, communication connection is established between the operation target device 200 and the remote operation device 300a. Thus, the connecting process (on the instruction transmitting terminal side) is completed.

In response to completion of the connecting process (on the instruction transmitting terminal side), the operation target device 200 transmits reproducable data information indicative of a file format of data that the operation target device 200 can reproduce. The remote operation device 300a receives the reproducable data information (S2). The remote operation device 300a uses the received reproducable data information to select data identification information to be transmitted to the operation target device 200. Therefore, it is possible to avoid such a case where data that the operation target device 200 cannot reproduce is transmitted to the operation target device 200.

Subsequently, the remote operation device 300a performs a data sharing process (on the instruction transmitting terminal side) (S3). In the data sharing process (on the instruction transmitting terminal side), the remote operation device 300a transmits, to the operation target device 200, (i) data identification information of data to be shared in the remote operation system 100 and (ii) a data selection condition.

In response to completion of the data sharing process (on the instruction transmitting terminal side), the remote operation device 300a waits for an instruction to execute a slide show, an instruction to execute a slide show with BGM, an instruction to perform data output, or an end instruction (S4, S6, S8, S10). There are by no means any particular limitations on a method of how the remote operation device 300a receives each of the above instructions. For example, the method may be the one in which the display section 307 displays an image as shown in FIG. 7 so as to allow the user to input any of the above instructions.

Figure 7:
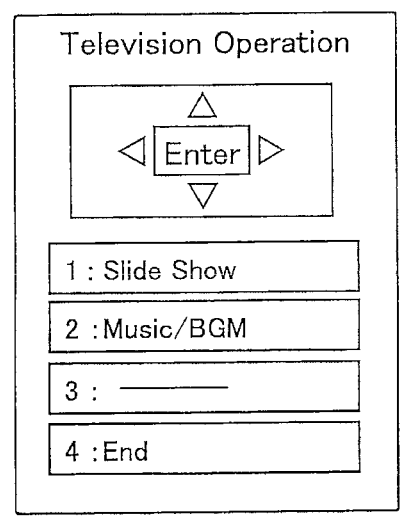
FIG. 7 is a view illustrating one example of a screen displayed by the remote operation device.

FIG. 7 is a view illustrating one example of a screen displayed by the remote operation device 300a. The screen shown in FIG. 7 is a so-called software keyboard display (hereinafter, referred to as "soft key display"). The soft key display shows (i) operation keys of the operation section 308 and (ii) functions allocated to the respective operation keys.

That is, by selecting an operation key in the operation section 308 according to the screen display, it is possible to cause the remote operation device 300a to execute a process corresponding to the function displayed in the operation key. For example, in the example shown in FIG. 7, the screen display shows "1. Slide Show". In this case, by selecting an operation key indicative of "1" in the operation section 308, it is possible to cause the remote operation device 300a to execute a process for reproducing a slide show. Similarly, by selecting an operation key indicative of "2", it is possible to cause the remote operation device 300*a* to execute a process for (i) reproducing a music tune or (ii) reproducing a slide show with BGM.

Further, by operating direction keys (up, down, right, left) in the operation section 308, it is possible to make a selection from data identification information displayed on the operation target device 200. Furthermore, by operating the enter key in the operation section 308, it is possible to cause the operation target device 200 to output data corresponding to the data identification information thus selected (data output process).

Here, if it is determined that the instruction to execute a slide show is given (YES in S4), the remote operation device 300*a* executes a slide-show execution process (on the instruction transmitting terminal side) (S5). Consequently, the operation target device 200 sequentially displays images stored in the remote operation device 300*a* and/or 300*b* (shuffle display).

If it is determined that the instruction to execute a slide show with BGM is given (YES in S6), the remote operation device 300*a* executes a slide-show with BGM execution process (on the instruction transmitting terminal side) (S7). Consequently, the operation target device 200 sequentially displays images stored in the remote operation device 300*a* and/or 300*b*, and, at the same time, reproduces through streaming a music tune stored in the remote operation device 300*a* and/or 300*b*.

If it is determined that the instruction to perform data output is given (YES in S8), the remote operation device 300*a* executes a data output process (on the instruction transmitting terminal side) (S9). Consequently, the operation target device 200 outputs data stored in the remote operation device 300*a* and/or 300*b*.

Specifically, in the data output process (on the instruction transmitting terminal side), upon confirming that a request for transmission of data is received from the operation target device 200, the content transmission control section 26 reads out the requested data from the remote operation device storage section 310. Then, the content transmission control section 26 transmits, to the operation target device 200, the data thus read out. Here, there may be a case where the user of the remote operation device 300 does not want the requested data to be outputted by the operation target device 200. In view of this, the content transmission control section 26 may be configured such that, when confirming the reception of the request for transmission of the data, the content transmission control section 26 allows the user to determine whether to permit transmission of the requested data.

On the other hand, if it is determined that an end instruction is given (YES in S10), the remote operation device 300*a* finishes giving a manipulation instruction to the operation target device 200.

Note that, in a case where the instruction to execute a slide show or a slide show with BGM is determined to be given, the remote operation device 300*a* allows the user to determine whether to perform repeated reproduction (not illustrated). If the user determines to perform the repeated reproduction, a slide show is performed in the following manner: after all images to be shown in the slide show are displayed once, the slide show is performed again from the first one of the images in the slide show. It is possible to allow the user to determine whether to perform the repeated reproduction by, e.g., displaying a selection item therefor in the display section 307 of the remote operation device 300*a*.

<<Process Performed by Operation Target Device 200 (Output Device)>>

The operation target device 200 performs a connecting process (on the output device side) so as to establish communication connection with the remote operation device 300 (S11). Specifically, the communication control section 1 on the operated side waits for a connection request from the remote operation device 300*a* or 300*b*. Upon confirming reception of the connection request, the communication control section 1 on the operated side transmits a connection permission to the transmission source terminal of the connection request thus received, so as to establish communication connection with the transmission source terminal of the connection request.

In response to completion of the connecting process (on the output device side), the reproducable data information transmitting section 2 transmits, to the terminal with which the communication connection has been established in the connecting process (on the output device side), reproducable data information indicative of data that the operation target device 200 can reproduce (S12). It is assumed herein that the operation target device 200 has established communication connection with both of the remote operation devices 300*a* and 300*b*; therefore, the reproducable data information is transmitted to both of the remote operation devices 300*a* and 300*b*.

The reproducable data information indicates a file format that the operation target device 200 can reproduce. It is assumed herein that the operation target device 200 can reproduce a "jpg" file, an "mp3" file, and an "mpg" file; therefore, the reproducable data information indicates that the operation target device 200 can reproduce a "jpg" file, an "mp3" file, and an "mpg" file.

The above reproducable data information only needs to be the one that the operation target device 200 can read out and transmit when necessary. For example, the reproducable data information may be stored in advance in the operation target device storage section 207, etc. Note that the above reproducable data information only needs to be the one from which the remote operation devices 300*a* and 300*b* can identify data that the operation target device 200 cannot reproduce or output. Therefore, the reproducable data information may be information indicative of data that the operation target device 200 cannot reproduce.

Here, if the remote operation device 300*a* executes the data sharing process (on the instruction transmitting terminal side), the operation target device 200 executes a data sharing process (on the output device side) (S13). In the data sharing process (on the output device side), the operation target device 200 collects data identification information of data shared in the remote operation system 100.

After the data sharing process (on the output device side) is ended, the operation target device 200 waits for an instruction to execute a slide show, an instruction to execute a slide show with BGM, or an instruction to perform data output, each of which instructions is to be transmitted from the remote operation device 300*a*.

If the operation target device 200 receives the instruction to execute a slide show, the slide-show executing section 6 performs a slide-show execution process (on the output device side) (S14). Consequently, the operation target device 200 sequentially displays images stored in the remote operation device 300*a* and/or 300*b* (shuffle display).

If the operation target device 200 receives the instruction to execute a slide show with BGM, the slide-show executing section 6 performs a slide-show with BGM execution process (on the output device side) (S15). Consequently, the operation target device 200 sequentially displays images stored in the remote operation device 300a and/or 300b, and, at the same time, reproduces through streaming a music tune stored in the remote operation device 300a and/or 300b.

If the operation target device 200 receives the instruction to execute a data output process, the operation target device 200 performs a data output process (on the output device side) (S16). Consequently, the operation target device 200 outputs data stored in the remote operation device 300a and/or 300b.

Specifically, in the data output process (on the output device side), the slide-show executing section 6 transmits, to a terminal that stores data to be outputted (remote operation device 300a or 300b), a request for transmission of the data. Upon receipt of the requested data, the slide-show executing section 6 causes the display section 204 and/or the audio output section 202 to output the data.

In the data output process, the operation target device 200 receives a copy of the data stored in the remote operation device 300. The received data may be retained by the operation target device 200 even after the operation target device 200 outputs the data. Alternatively, however, the slide-show executing section 6 may delete the received data after the operation target device 200 outputs the data. This makes it possible to prevent secondary copying of the data, and also to prevent the operation target device 200 from being storing a large amount of data.

<<Process Performed by Remote Operation Device 300b (Data Providing Terminal)>>

The remote operation device 300b, which serves as the data providing terminal, also first performs a connecting process (on the instruction transmitting terminal side) so as to establish communication connection with the operation target device 200 (S1). Consequently, communication connection is established between the remote operation device 300b and the operation target device 200. After the establishment of the communication connection, the remote operation device 300b receives reproducable data information from the operation target device 200 (S2).

Then, if the operation target device 200 executes the data sharing process (on the output device side), the remote operation device 300b performs a data sharing process (on the data providing terminal side) (S21). In the data sharing process (on the data providing terminal side), the remote operation device 300b transmits, to the operation target device 200, data identification information of data to be shared in the remote operation system 100, the data being selected from among data stored in the remote operation device 300b.

After the data sharing process (on the data providing terminal side) is ended, the remote operation device 300b transmits the data to the operation target device 200, according to an instruction given by the operation target device 200. That is, in a case where the operation target device 200 executes a slide show, the remote operation device 300b performs a slide-show execution process (on the data providing terminal side) (S22); in a case where the operation target device 200 executes a slide show with BGM, the remote operation device 300b performs a slide-show with BGM execution process (on the data providing terminal side) (S23); in a case where the operation target device 200 executes data output, the remote operation device 300b performs a data output process (on the data providing terminal side) (S24).

[Data Sharing Process]

Figure 8:
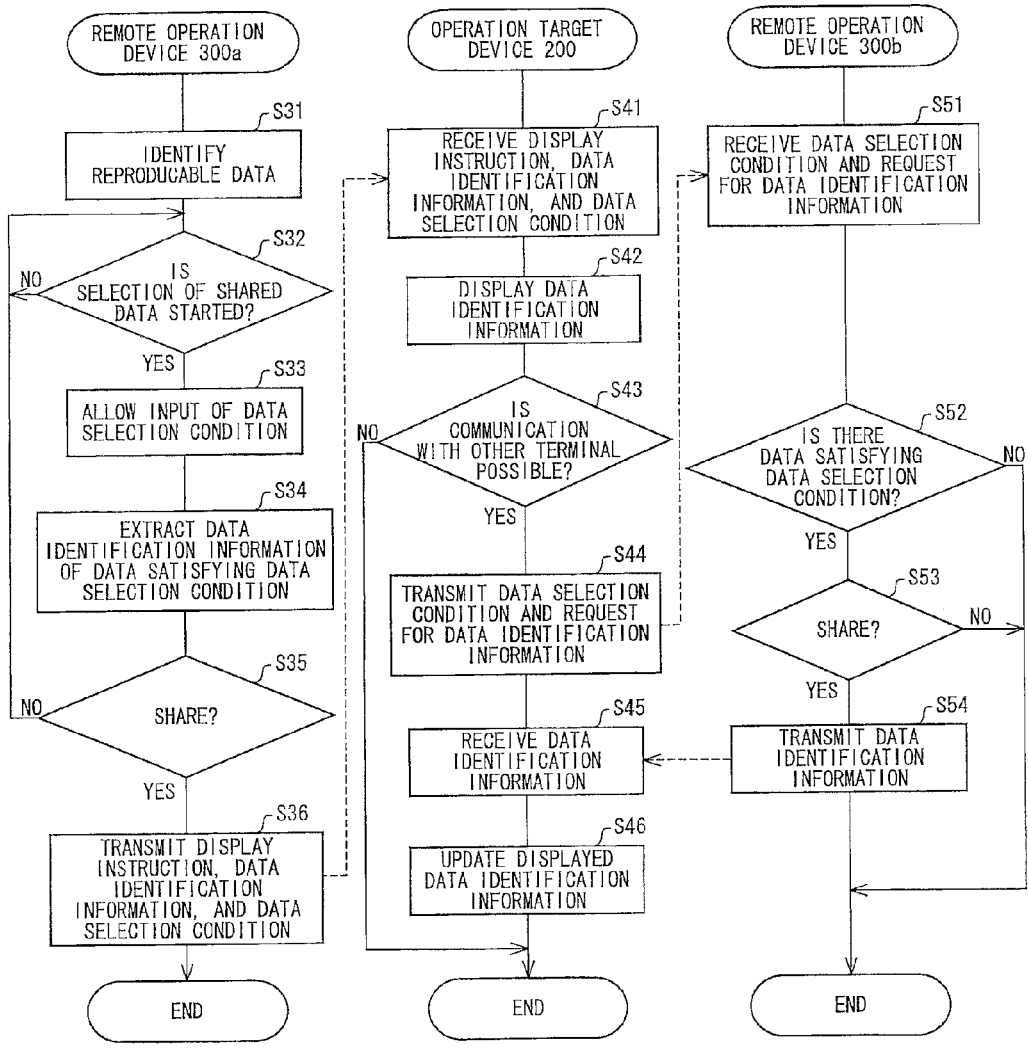
FIG. 8 is a flow chart illustrating one example of a data sharing process, which is executed by the remote operation system.

Next, with reference to FIG. 8, the following will describe a detail of the data sharing process (S3, S13, S21) in the flow chart shown in FIG. 6. FIG. 8 is a flow chart illustrating one example of the data sharing process.

<<Process Performed by Remote Operation Device 300a (Instruction Transmitting Terminal)>>

First, according to the reproducable data information received in S2 in FIG. 6, the data sharing process section 22 on the operating side in the remote operation device 300a identifies the data (file format) that the operation target device 200 can reproduce (output) (S31). Then, the data sharing process section 22 on the operating side performs control so that data being in a file format other than the identified file format is not shared in the following process.

Subsequently, the data sharing process section 22 on the operating side waits for start of selection of data to be shared (S32). Here, if the user of the remote operation device 300a starts selecting data to be shared (YES in S32), the data sharing process section 22 on the operating side allows the user of the remote operation device 300a to input a data selection condition (S33).

Note that there are by no means any particular limitations on a method of inputting the data selection condition, as long as the method allows the user to input a condition that he/she intends. For example, the following method is possible: the data sharing process section 22 on the operating side causes the display section 307 to display candidates for the data selection condition, which candidates are prepared in advance; then, the user is allowed select a selection condition from among the candidates thus displayed. Alternatively, the following method is possible: the user inputs a keyword, and the keyword thus inputted is accepted and used as the data selection condition. The user can enter the data selection condition or the keyword by, e.g., operating the operation section 308. Instead, in a case where the remote operation device 300 has a voice recognition function, the data selection condition or the keyword may be inputted by voice.

In response to input of the data selection condition, the data sharing process section 22 on the operating side instructs the data identification information extracting section 24 to extract data identification information of data satisfying the data selection condition thus inputted. Further, in this process, the data sharing process section 22 on the operating side notifies the data identification information extracting section 24 of the file format identified in S31.

Having been notified of the file format identified in S31 and having received the instruction to extract the data identification information, the data identification information extracting section 24 selects, from among the content items stored in the remote operation device storage section 310, data satisfying the inputted data selection condition and being reproducable by the operation target device 200, and extracts data identification information from the data thus selected (S34).

In response to completion of the extraction of the data identification information, the data identification information extracting section 24 instructs the display control section 23 on the operating side to cause the display section 307 to display the data identification information thus extracted, so as to allow the user to determine whether to permit sharing of the data corresponding to the data identification information thus displayed (S35). If the user determines not to permit sharing of the data (NO in S35), the process returns to S32, and the data sharing process section 22 on the operating side waits for start of selection of data to be shared.

On the other hand, if the user determines to permit sharing of part of or all of the data identification information displayed on the display section 307 (YES in S35), the data sharing process section 22 on the operating side transmits, to the operation target device 200, (i) data identification information which has been determined to be shared, (ii) the data selection condition which has been inputted, and (iii) a display instruction to instruct the operation target device 200 to display the data identification information (S36). Then, the data sharing process (on the instruction transmitting terminal side) is ended.

<<Process Performed by Operation Target Device 200 (Output Device)>>

The data sharing process (on the output device side), which is executed by the operation target device 200, is started in response to reception of the display instruction, the data identification information, and the data selection condition, each of which is transmitted from the remote operation device 300a (instruction transmitting terminal) (S41).

Note that the trigger of start of the data sharing process (on the output device side) is not limited to the above example. Alternatively, for example, the data sharing process (on the output device side) may be started in response to reception of the data identification information only. In this case, data sharing is requested without a selection condition. Further alternatively, start of the data sharing process (on the output device side) may be triggered by reception of the data selection condition only. In this case, both of the remote operation devices 300a and 300b are requested to transmit data identification information of data satisfying the received data selection condition.

Still further alternatively, the data sharing process (on the output device side) may be started in response to reception of an instruction to start the data sharing process (on the output device side). For example, the operation target device 200 may be configured so as to accept an input of (i) a data selection condition and (ii) an instruction to start the data sharing process (on the output device side) and to transmit, to the remote operation devices 300a and 300b, a request for data identification information.

After reception of the display instruction, the data identification information, and the data selection condition is confirmed, the data sharing process section 3 on the operated side instructs the display control section 4 on the operated side to cause the display section 204 to display the received data identification information according to the received display instruction (S42). With this, by seeing the display section 204, the user of the remote operation system 100 can confirm the data that the remote operation device 300a intends to share. If no display instruction is transmitted from the remote operation device 300a, S42 is not performed and the process proceeds to S43.

If the operation target device 200 stores data satisfying the data selection condition, the data sharing process section 3 on the operated side may also display data identification information of the data. That is, the operation target device 200 may also serve as a data providing terminal.

Next, the data sharing process section 3 on the operated side instructs the communication possibility determining section 5 to determine whether or not it is possible to communicate with a terminal other than the remote operation device 300a. Upon receiving the instruction to determine whether or not such the communication is possible, the communication possibility determining section 5 transmits a response request to each terminal (in this case, the remote operation device 300b) communicably connected to the operation target device 200, and determines whether or not it is possible to communicate with a terminal other than the remote operation device 300a, based on the presence or absence of a response to be given in response to the response request (S43).

If no response is received from a terminal other than the remote operation device 300a, the communication possibility determining section 5 determines that it is impossible to communicate with a terminal other than the remote operation device 300a (NO in S43), and notifies the data sharing process section 3 on the operated side of this. In this case, the data sharing process section 3 on the operated side ends the data sharing process (on the output device side). Therefore, in this case, shared is only the data corresponding to the data identification information transmitted from the remote operation device 300a.

On the other hand, if a response is received from a terminal other than the remote operation device 300a, the communication possibility determining section 5 determines that it is possible to communicate with a terminal other than the remote operation device 300a (YES in S43), and the communication possibility determining section 5 transmits, to the data sharing process section 3 on the operated side, a communication address of the terminal from which the response is given. In this case, the data sharing process section 3 on the operated side transmits, to the communication address, (i) the received data selection condition and (ii) a request for data identification information, which request demands transmission of data identification information satisfying the data selection condition (S44).

Subsequently, the data sharing process section 3 on the operated side waits for reception of the data identification information, and receives the data identification information (S45). Upon receipt of the data identification information, the data sharing process section 3 on the operated side instructs the display control section 4 on the operated side to cause the display section 204 to display both of (i) the data identification information received in S45 and (ii) the data identification information received in S41. This updates the data identification information displayed on the display section 204 (S46).

Then, if the data identification information is transmitted from all of the terminals to which the requests for the data identification information have been transmitted, the data sharing process section 3 on the operated side ends the data sharing process (on the output device side). If the data identification information is not transmitted from the destination terminal of the request for the data identification information even after a predetermined time period has elapsed since the request for the data identification information was transmitted to the destination terminal, the data sharing process section 3 on the operated side also ends the data sharing process (on the output device side).

<<Process Performed by Remote Operation Device 300b (Data Providing Terminal)>>

The data sharing process (on the data providing terminal side), which is executed by the remote operation device 300b, is started in response to receipt of (i) the request for data identification information and (ii) the data selection condition, each of which is transmitted from the operation target device 200 (S51).

Upon receipt of the data identification information and the data selection condition, the data sharing process section 22 on the operating side in the remote operation device 300b identifies the data (file format) that the operation target device 200 can reproduce, according to the reproducable data information received in S2 in FIG. 6 (S31). Then, the data sharing process section 22 on the operating side performs control so that data being in a file format other than the identified file format is not shared in the following process.

Subsequently, the data sharing process section 22 on the operating side instructs the data identification information extracting section 24 to extract data identification information of data satisfying the data selection condition received. Further, the data sharing process section 22 on the operating side notifies the data identification information extracting section 24 of the file format identified in S31.

Having received the instruction to extract the data identification information, the data identification information extracting section 24 checks whether or not the content items stored in the remote operation device storage section 310 include data satisfying the data selection condition and being reproducable by the operation target device 200 (S52).

If the data identification information extracting section 24 determines that the content items do not include data satisfying the data selection condition and being reproducable by the operation target device 200 (NO in S52), the data identification information extracting section 24 notifies the data sharing process section 22 on the operating side of this. In this case, the data sharing process section 22 on the operating side ends the data sharing process (on the data providing terminal side).

On the other hand, if the data identification information extracting section 24 determines that the content items include data satisfying the data selection condition and being reproducable by the operation target device 200 (YES in S52), the data identification information extracting section 24 extracts data identification information from the data, and transmits the extracted data identification information to the data sharing process section 22 on the operating side.

Next, the data sharing process section 22 on the operating side allows the user to determine whether to permit sharing of the extracted data identification information (S53). If the user determines not to permit sharing of the data identification information (NO in S53), the data sharing process section 22 on the operating side ends the data sharing process (on the data providing terminal side).

On the other hand, if the user determines to permit sharing of the data identification information (YES in S53), the data sharing process section 22 on the operating side transmits, to the operation target device 200, the data identification information received from the data identification information extracting section 24 (S54). Then, the data sharing process (on the data providing terminal side) is ended.

Note that, in S53, the data sharing process section 22 on the operating side may cause the display section 307 to display the data identification information extracted by the data identification information extracting section 24, so as to allow the user of the remote operation device 300b to confirm the data to be shared and change the data to be shared, if necessary.

[Concrete Example of Data to be Shared]

The following will describe a concrete example of data shared in the remote operation system 100. Since the remote operation system 100 reproduces a slide show, described herein is a data structure of an image. An image has a data structure as shown in Table 1 below.

TABLE 1

| Image Data | | |
| --- | --- | --- |
| Content Information | | Actual Data |
| Thumbnail (s0001.JPEG) | Detailed Content Information | High-Resolution Image (0001.JPEG) |

As shown in Table 1, an image includes a high-resolution image as actual data, and also includes, as content information, a thumbnail and detailed content information. Note that the content information is such data that is generated additionally to the actual data when the image data is generated.

For example, in a case where a photo is taken by a digital camera, a high-resolution image is generated as actual data, and content information is also generated, which content information includes, e.g., (i) a thumbnail of the photo thus taken, (ii) date and time of photographing, (iii) a type of the digital camera with which the photo was taken, and (iv) a production number of the digital camera. Then, one (1) file including these data items is created as image data.

The remote operation system 100 uses at least part of the detailed content information data as the data identification information. The following will describe the detailed content information with reference to Table 2 below. Table 2 shows one example of the detailed content information included in the image data.

TABLE 2

| | |
| --- | --- |
| File Name | 0001.JPEG |
| Name of Thumbnail | S0001.JPEG |
| Date and Time of Photographing | 2007.8.10.12:45:38 |
| Place of Photographing | N35.40.26.100, E139.45.05.050 |
| Type of Device Taking the Photo | 902ix |
| Production Number (Terminal Identification Information) | 357667005259978 |
| Owner's Information | 0904892**** |
| Obtaining Method | 1 |

As shown in Table 2, the detailed content information includes (i) a file name of the actual data (high-resolution image), (ii) a file name of the thumbnail, (iii) date and time of photographing, (iv) place of photographing, (v) a type of the device taking the photo, (vi) a production number of the device storing the data, (vii) owner's information used to identify the owner, and (viii) a method for obtaining the image. That is, it is assumed herein that the remote operation device 300 is provided with a function for taking a photo.

Note that the information of the place of photographing can be obtained through use of, e.g., a GPS (Global Positioning System) provided in the photographing device (which may be the remote operation device 300 or any other photographing device).

Further, it is assumed herein that the obtaining method is any one of the following four methods: photographing by itself (i.e., by the photographing device); obtaining via infrared data communication; receiving via an e-mail; and obtaining via the Internet. Furthermore, it is assumed that these four obtaining methods are represented by the corresponding numerical characters, 1 through 4. For example, in the example shown in Table 2, the obtaining method is indicated as "1". This shows that this image was taken by itself (i.e., by the photographing device). Of course, the obtaining method of data is not limited to the above example.

The remote operation system 100 uses the detailed content information such as above to select data satisfying a data selection condition. For example, in a case where a data selection condition "an image taken in August, 2007" is set, the image corresponding to Table 2 is extracted as a candidate for data to be shared.

Further, the detailed content information includes the terminal identification information used to identify the terminal storing the image (in the example shown in Table 2, the production number of the remote operation device 300 storing the image). According to this, the operation target device 200 can identify which terminal stores each data shared in the remote operation system 100.

Note that the terminal identification information only needs to be the one by which the terminal storing the data (in this case, the image) can be identified, and is not limited to the production number. For example, the terminal identification information may be the phone number of the remote operation device 300 storing the data. That is, the terminal identification information may be the owner's information in Table 2. Alternatively, the terminal identification information may be user ID, SIM (Subscriber Identity Module) card ID, or the like.

In extracting data identification information of an image, the data identification information extracting section 24 extracts a thumbnail of the image, and also picks up necessary data from the detailed content information such as above in order to generate URL (Uniform Resource Locator) for making an access to the image.

For example, from the detailed content information shown in Table 2, it is possible to generate URL such as "http://357667005259978/2007.8.10.12:45:38/2008.2.22.12:45:44/s0001.JPEG". In this example, the part "http://" indicates that this is URL, the part "357667005259978" indicates the production number (terminal identification information), the part "2007.8.10.12:45:38" indicates the date and time of photographing, the part "2008.2.22.12:45:44" indicates the date and time of transmitting the data identification information, and the part "s0001.JPEG" indicates the file name of the thumbnail.

Therefore, when the thumbnail "s0001.JPEG" and the URL "http://357667005259978/2007.8.10.12:45:38/2008.2.22.12:45:44/s0001.JPEG" are transmitted to the operation target device 200 as the data identification information, the operation target device 200 can identify the terminal storing the actual data (high-resolution image) of the thumbnail "s0001.JPEG", and can request the identified terminal to transmit the actual data to the operation target device 200.

Here, the above URL includes the date and time of transmitting the data identification information. The date and time of transmitting are used to distinguish the data from another data having the same name. For example, in a case where a photo is taken by a digital camera, the digital camera automatically determines a file name of the photo. Therefore, if digital cameras or mobile phones of the same type (or of the same manufacturer) are used to take photos, files having the same name are generated. Further, if the files having the same name are shared in the remote operation system 100, it is impossible to distinguish these files one from another by the file name.

In view of this, the above example uses the URL including information indicative of the date and time of transmitting the data identification information. This allows the operation target device 200 to distinguish the files having the same name one from another. Note that, if the communication connection between the operation target device 200 and the remote operation device 300 is interrupted, the above URL is discarded.

The foregoing has explained one example of the data identification information of an image; however, similar data identification information can be used for a moving image. Note that the data identification information is not limited to the above example, and only needs to be the one by which the operation target device 200 can identify data shared in the remote operation system 100 and can identify a terminal storing the shared data.

For example, data identification information of data corresponding to a music tune may be data as shown in Table 3 below. Table 3 shows one example of the data identification information of the music tune. The data identification information shown in the example of Table 3 includes (i) a file name, (ii) a title of the music tune, (iii) an artist name, (iv) a name of an album including the music tune, (v) a reproduction period, (vi) date and time when the music tune was obtained, (vii) date and time when the music tune was listened to, (viii) a place where the music tune was listened to, (ix) a production number of a device storing the music tune (terminal identification information), and (x) date and time when the data identification information was transmitted to the operation target device 200.

TABLE 3

| | |
|---|---|
| File Name | 200000989.mp3 |
| Title | Two in the world |
| Artist Name | SMAAP |
| Album Name | SMAAP BEST |
| Reproduction Period | 3 min., 21 sec. |
| Date and Time of Obtaining | 2007.8.10.12:45:38 |
| Date and Time of Listening | 2008.2.10.17:30:12 |
| Place where Listened | N35.40.26.100, E139.45.05.050 |
| Production Number (Terminal Identification Information) | 357667005259978 |
| Date and Time When Data Identification Information was Transmitted | 2008.3.10.12:39:52 |

There exist (i) music tunes which have the same title but are of different artists and (ii) music tunes which have the same title and of the same artist but have different reproduction periods. In view of this, in the example of Table 3, the data identification information includes the title, the artist name, and the reproduction period. Accordingly, the operation target device 200, which has received the data identification information shown in Table 3, can display the title, the artist name, and the reproduction period, according to the data identification information received. This allows the user to recognize what kind of music tunes are shared in the remote operation system.

As well as the title name, the album name can be used to be displayed by the operation target device 200. Not only this, in selecting a music tune according to a data selection condition, information of an album name can be used. For example, by designating a specific album name as a data selection condition, it is possible to extract music tunes included in the same album as a candidate for data to be shared. Further, it is possible to extract, as a candidate for data to be shared, music tunes whose album names match a keyword indicated by the data selection condition. Note that data identification information of a music tune which is not included in an album (e.g., a music tune released as a single) does not include information of an album name.

The date and time when the music tune was obtained, the date and time when the music tune was listened to, and the place where the music tune was listened to are used to select a music tune according to a data selection condition. For example, assume a case where the data selection condition "recently listened music" is set. In this case, as a candidate for data to be shared, such a music tune is extracted whose "date and time when the music tune was listened to" is close to (e.g., within a week from) the date and time thus set.

The date and time when the music tune was listened to may be recorded when the music tune is reproduced. Further, the place where the music tune was listened to may be recorded in such a manner that, when the music tune is reproduced, information of the place where the music tune is reproduced is obtained by, e.g., GPS, and the obtained information of the place is recorded.

[Example of Display Screen of Remote Operation Device 300a]

Figure 9:
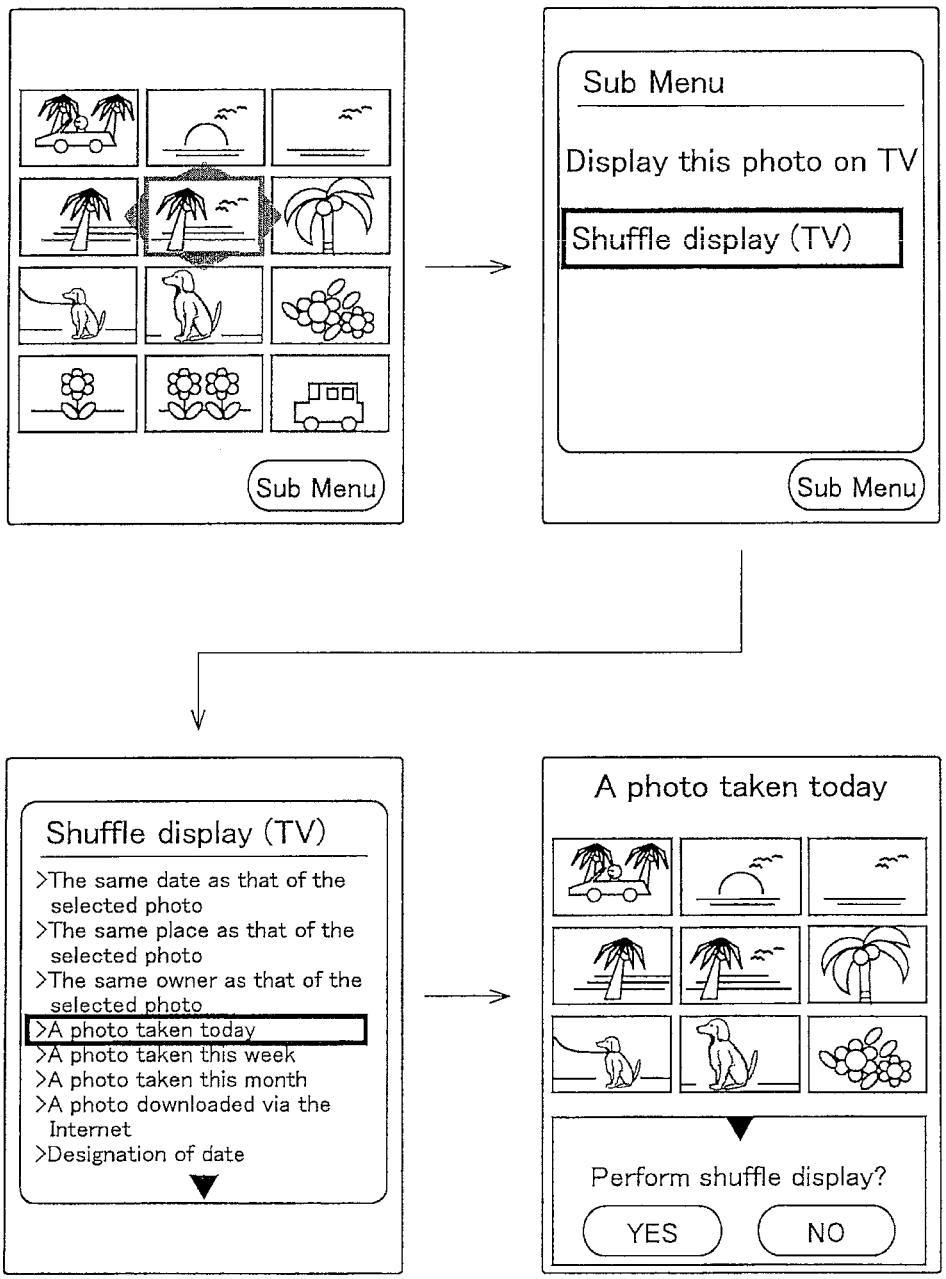
FIG. 9 is a view illustrating one example of display screens displayed while a data sharing process (on the instruction transmitting terminal side) is executed.

With reference to FIG. 9, the following will describe one example of a screen displayed on the display section 307 of the remote operation device 300a during the data sharing process (on the instruction transmitting terminal side). FIG. 9 is a view illustrating one example of display screens displayed while the data sharing process (on the instruction transmitting terminal side) is executed. The example shown in FIG. 9 illustrates a case where the data sharing process (on the instruction transmitting terminal side) is executed as one function of application software (hereinafter, referred to as "photo application") for viewing a photo at the remote operation device 300a.

The upper left figure of FIG. 9 illustrates one example of a display screen displayed when the user of the remote operation device 300a inputs an instruction to the operation section 308 so as to boot a photo application. As shown in the upper left figure of FIG. 9, booting the photo application causes the display section 307 to display thumbnails of respective photos (images) stored in the remote operation device storage section 310.

As shown in the upper left figure of FIG. 9, a cursor is placed on one of the thumbnails of the respective images. The cursor indicates a selected position. By operating the direction (up, down, right, left) keys provided in the operation section 308, it is possible to move the position of the cursor on the display screen.

By operating the enter key in the operation section 308 with the cursor placed on one of the thumbnails displayed, it is possible to determine the one thumbnail on which the cursor is placed. In response to determination of the thumbnail, actual data (high-resolution image) corresponding to the determined thumbnail is displayed on the display screen.

Furthermore, as shown in the upper left figure of FIG. 9, a soft key for selecting a sub menu is displayed on the display screen. If the operation section 308 is operated so as to select the sub menu, the display screen is switched to a screen shown in the upper right figure of FIG. 9. In the sub menu, it is possible to select (i) operation for displaying the selected photo (i.e., the photo on which the cursor is placed) on a television (operation target device 200) or (ii) operation for executing the shuffle display on the television.

Note that the "shuffle" described herein means (i) causing content items stored in a plurality of remote operation devices (e.g., the remote operation devices 300a and 300b) to be shared in the remote operation system and (ii) causing the operation target device 200 to sequentially reproduce the shared content items according to an instruction given by the user (e.g., an instruction inputted to the remote operation device 300a or 300b).

If the operation for displaying the selected photo on the television is selected, the remote operation device 300a transmits data of the selected photo to the operation target device 200.

On the other hand, if the operation for executing the shuffle display is selected, the data sharing process section 22 on the operating side determines that selection of data to be shared has started (see S33 in FIG. 8). Then, the data sharing process section 22 on the operating side instructs the display control section 23 on the operating side to display a screen for input of a data selection condition. Consequently, the display screen is switched to a screen shown in the lower left figure of FIG. 9.

In the example of the display screen shown in the lower left figure of FIG. 9, displayed are the following data selection conditions: the same date as that of the selected photo; the same place as that of the selected photo; the same owner as that of the selected photo; a photo taken today; a photo taken this week; a photo taken this month; a photo downloaded via the Internet; and designation of date. The remote operation system 100 performs data sharing according to the data selection condition selected in this screen.

The data selection conditions shown in the example in the lower left figure of FIG. 9 can be categorized into (i) a data selection condition for sharing a photo related to the photo on which the cursor is placed in the screen shown in the upper right figure of FIG. 9, (ii) a data selection condition which is irrelevant to the photo on which the cursor is placed, and (iii) a data selection condition whose setting can be changed by the user.

Of the data selection conditions shown in the above example, the following data selection conditions are categorized into the "data selection condition for sharing a photo related to the photo on which the cursor is placed": the same date as that of the selected photo; the same place as that of the selected photo; and the same owner as that of the selected photo. In the example shown in the lower left figure of FIG. 9, since the user is allowed to select a data selection condition with the photo selected, there is a high possibility that a photo related to the photo on which the cursor is placed will be shared.

Therefore, the data selection conditions for sharing a photo related to the photo on which the cursor is placed are preferably displayed in a position which is easier to select (in the example in the lower left figure of FIG. 9, an upper position), than those of the other selection conditions. Further, the data selection conditions for sharing a photo related to the photo on which the cursor is placed may be displayed in such a manner as to allow the user to distinguish them from the other data selection conditions. For example, for the data selection conditions for sharing a photo related to the photo on which the cursor is placed, a different display color, a different display field, a different font, a different brightness level, a different color tone, etc. may be used. This makes it easier for the user to select any of the data selection conditions for sharing a photo related to the photo on which the cursor is placed.

Of the data selection conditions shown in the above example, the following data selection conditions are categorized into the "data selection condition which is displayed irrespectively of the photo on which the cursor is placed": a photo taken today; a photo taken this week; a photo taken this month; and a photo downloaded via the Internet. Further, the data selection condition "designation of date" is categorized into the "data selection condition whose setting can be changed by the user".

Note that the data selection conditions are not limited to the ones exemplified above, and can be set as needed and according to the data included in the data identification information. For example, in a case where the data identification information does not include the data regarding the place of photographing, the data selection condition "the same place as that of the selected photo" may not be displayed. For another example, in a case where the data identification information of a photo includes information indicative of an object of the photo, the condition "a photo including a certain object" may be set as a data selection condition.

Here, if the data selection condition "a photo taken today" is selected in the example shown in the lower left figure of FIG. 9, the data identification information extracting section 24 searches for an image whose date of photographing is set to "today", in the remote operation device storage section 310. Then, the data identification information extracting section 24 extracts thumbnails of respective images thus detected, and instructs the display control section 23 on the operating side to cause the display section 307 to display the thumbnails extracted.

As a result, as shown in the lower right figure of FIG. 9, the display section 307 displays the thumbnails of the photos taken by the remote operation device 300a today and stored in the remote operation device storage section 310. In addition, as shown in the lower right figure of FIG. 9, the display section 307 also displays selection items by which the user instructs to perform or not to perform the shuffle display.

While the screen shown in the lower right figure of FIG. 9 is displayed, if the operation section 308 is operated and an instruction to perform the shuffle display is inputted thereto, the data sharing process section 22 on the operating side determines that the photos corresponding to the respective thumbnails displayed are permitted to be shared in the remote operation system 100. Then, the data sharing process section 22 on the operating side transmits, to the operation target device 200, data identification information including the thumbnails displayed.

As a result of transmission of the data identification information, the data are shared in the remote operation system 100. In this state, it is possible to perform reproduction of a slide show, etc. Therefore, after transmitting the data identification information, the data sharing process section 22 on the operating side preferably displays the operation screen as shown in FIG. 7 in order to allow the user of the remote operation device 300 to smoothly input an instruction to perform reproduction of a slide show, etc.

[Example of Display Screens of Operation Target Device 200 and Remote Operation Device 300b]

Figure 10:
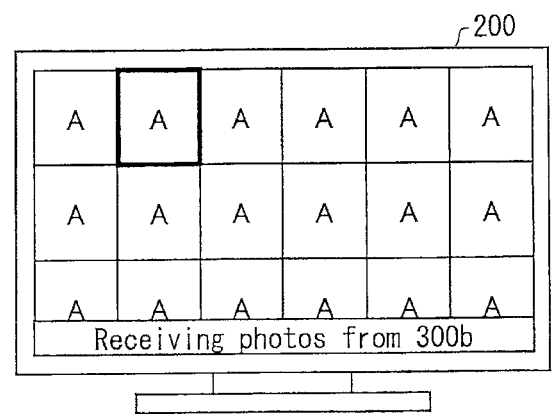
FIG. 10 is a view illustrating one example of respective display screens displayed by the operation target device and the remote operation device in a data sharing process (on the output device side), which is executed by the remote operation system.
Figure 10:
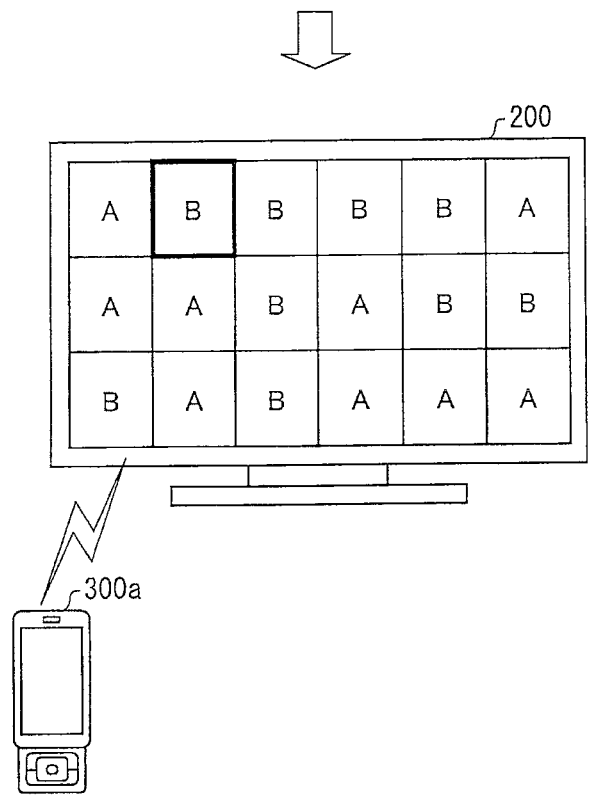

Next, with reference to FIG. 10, the following will describe an example of respective display screens displayed by the operation target device 200 and the remote operation device 300b in the data sharing process (on the output device side) shown in FIG. 8. Note that FIG. 10 illustrates one example of the display screens displayed when images are shared between the remote operation device 300a (instruction transmitting terminal) and the remote operation device 300b (data providing terminal).

Upon confirming reception of data identification information, the data sharing process section 3 on the operated side in the operation target device 200 causes the display section 204 to display thumbnails included in the data identification information thus received. At this point, the operation target device 200 has received only the thumbnails transmitted from the remote operation device 300a, which is the instruction transmitting terminal. Therefore, as shown in the upper figure in FIG. 10, only the thumbnails transmitted from the remote operation device 300a are displayed.

Figure 11:
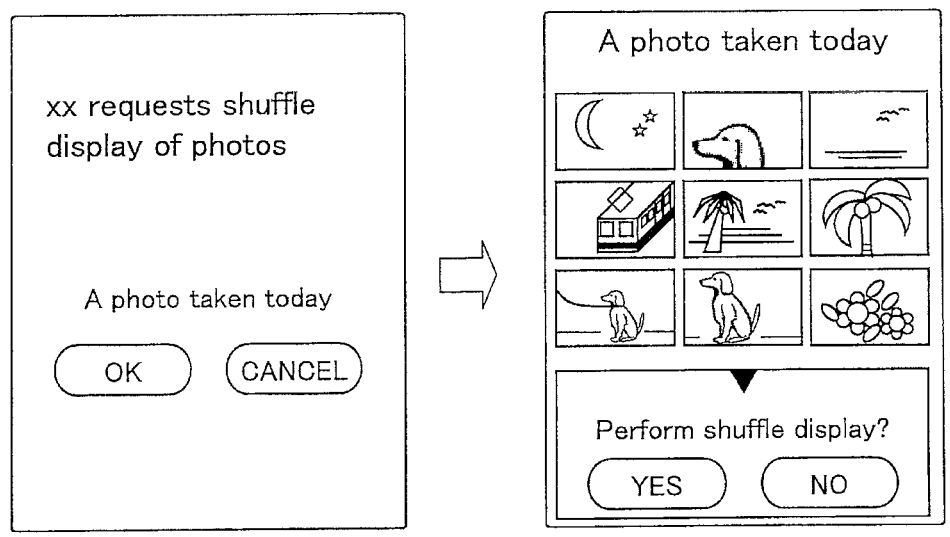
FIG. 11 is a view illustrating one example of a screen displayed by the remote operation device in a data sharing process (on the data providing terminal side), which is executed by the remote operation system.

Subsequently, the data sharing process section 3 on the operated side transmits a request for data identification information to the remote operation device 300b, which is the data providing terminal. Upon receipt of the request for the data identification information, the data sharing process section 22 on the operating side in the remote operation device 300b displays an image such as the one shown in the left figure of FIG. 11, in order to inquire the user whether to permit shuffle display of photos satisfying the condition "a photo taken today". FIG. 11 is a view illustrating one example of a screen displayed by the remote operation device 300b in the data sharing process (on the data providing terminal side).

If an instruction to permit the shuffle display is inputted, the data identification information extracting section 24 extracts data identification information of photos satisfying the condition "a photo taken today". Then, the display control section 23 on the operating side causes thumbnails included in the extracted data identification information to be displayed in a style as shown in the right figure of FIG. 11.

Further, as shown in the right figure of FIG. 11, selection items are also displayed by which the user can instruct to perform or not to perform shuffle display of the photos corresponding to the extracted thumbnails. This allows the user of the remote operation device 300b to determine whether to permit sharing of the photos whose thumbnails are displayed.

If the user determines to perform the shuffle display of the photos, the remote operation device 300b transmits, to the operation target device 200, data identification information of the photos satisfying the condition "a photo taken today". In this operation, as shown in the upper figure of FIG. 10, the operation target device 200 may display information indicative that the operation target device 200 is currently receiving data from the remote operation device 300b.

Upon confirming reception of the data identification information, the data sharing process section 3 on the operated side in the operation target device 200 displays (i) the thumbnails included in the data identification information received from the remote operation device 300b and (ii) the thumbnails which have been received from the remote operation device 300a and have already been displayed. Consequently, the display of the operation target device 200 is updated. As shown in the lower figure of FIG. 10, the thumbnails transmitted from the remote operation device 300a and the thumbnails transmitted from the remote operation device 300b are displayed in a mixed way.

As described above, the thumbnails transmitted from the remote operation device 300a and the thumbnails transmitted from the remote operation device 300b are displayed by the operation target device 200. With this, the user of the remote operation device 300a can confirm at a glance the "photos taken today" stored in the remote operation device 300b; similarly, the user of the remote operation device 300b can confirm at a glance the "photos taken today" stored in the remote operation device 300a.

Further, in response to selecting, at the remote operation device 300a or 300b, one of the thumbnails displayed by the operation target device 200, a photo corresponding to the selected thumbnail is transmitted to the operation target device 200 from the terminal storing the photo, and the photo is displayed by the operation target device 200 (data output process). Furthermore, by inputting, at the remote operation device 300a or 300b, an instruction with respect to the operation target device 200, it is possible to reproduce a slide show in which the photos corresponding to the thumbnails are sequentially displayed (slide-show executing process). Moreover, by inputting, at the remote operation device 300a or 300b, an instruction with respect to the operation target device 200, it is possible to simultaneously perform (i) reproduction of a slide show and (ii) streaming reproduction of a music tune stored in the remote operation device 300a or 300b as BGM of the slide show (slide-show with BGM executing process).

Thus, the remote operation system 100 allows all the people being around the operation target device 200 to enjoy content items stored in the remote operation devices 300 owned by different people. In addition, if a remote operation device 300 is communicably connected to the operation target device 200, the remote operation device 300 can serve as the instruction transmitting terminal or the data providing terminal. Therefore, even in a case where slide shows are reproduced with a certain data selection condition, photos to be displayed in the slide shows are different, depending on the remote operation device 300 communicably connected to the operation target device 200. That is, needless to say, changing the data selection condition changes the content of the slide show. Not only this, the content of the slide show is changed depending on the members being in the place. Thus, with the remote operation system 100, all the people being in the place can enjoy a slide show according to the situation.

[Slide-Show Executing Process]

Figure 12:
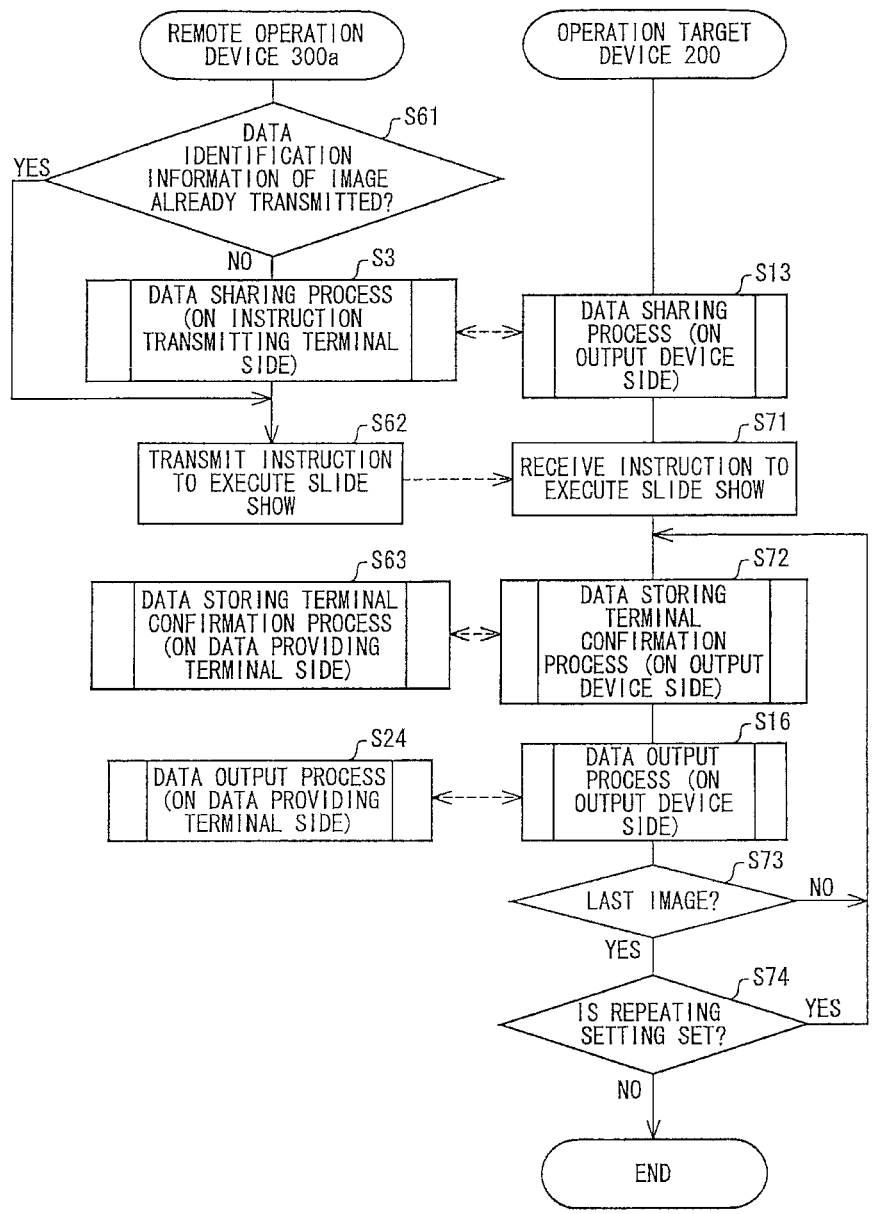
FIG. 12 is a flow chart illustrating one example of a slide-show executing process, which is executed by the remote operation system.

Next, with reference to FIG. 12, the following will describe details of the slide-show executing process executed in S5, S14, and S21 in FIG. 6. FIG. 12 is a flow chart illustrating one example of the slide-show executing process.

Upon confirming that the operation section 308 receives an inputted instruction to execute a slide show, the slide-show execution instructing section 25 in the remote operation device 300a (instruction transmitting terminal) checks whether or not data identification information of images to be reproduced in the slide show has already been transmitted to the operation target device 200 (S61). If the data identification information has not been transmitted (NO in S61), the slide-show execution instructing section 25 instructs the data sharing process section 22 on the operating side to execute the data sharing process (on the instruction transmitting terminal side) so that the data identification information is transmitted to the operation target device 200 (S3).

Alternatively, it is possible to perform the slide show by transmitting only (i) a data selection condition and (ii) an instruction to execute the slide show, without transmitting the data identification information. In this case, the slide show can be performed by causing the operation target device 200 to collect data identification information of data satisfying the data selection condition thus transmitted.

After the data identification information is transmitted to the operation target device 200 in S3, or if the data identification information has already been transmitted (YES in S61), the slide-show execution instructing section 25 transmits, to the operation target device 200, an instruction to execute the slide show (S62).

Note that, after the instruction to execute the slide show is transmitted, the remote operation device 300a serves as a data providing terminal, as well as the remote operation device 300b does. That is, in a case where the operation target device 200 executes a data storing terminal confirmation process (on the output device side), the remote operation devices 300a and 300b execute a data storing terminal confirmation process (on the data providing terminal side) (S63); in a case where the operation target device 200 executes a data output process (on the output device side), the remote operation devices 300a and 300b execute a data output process (on the data providing terminal side) (S24).

Next, a process performed by the operation target device 200 will be described. Upon confirming reception of the instruction to execute the slide show (S71), the slide-show executing section 6 starts a slide-show execution process (on the output device side). Specifically, the slide-show executing section 6 first generates reproduction management information indicative of the order of output of the images which are to be outputted in the slide show. The reproduction management information may be such data in which a number indicating the reproduction order is associated with a respective file name, for example, as the one shown in Table 4.

TABLE 4

| Reproduction Order | File Name |
|---|---|
| 1 | 0001.jpg |
| 2 | IMG0020.jpg |
| 3 | IMG0021.jpg |
| 4 | 080126_132408.jpg |
| ... | ... |

Note that the reproduction order may be changed if necessary. For example, the reproduction order may be set so as to correspond to the order of file names, the order of dates, etc., or may be set so as to be completely random. Alternatively, the reproduction order may be set on the basis of the image transmitted to the operation target device 200 from the remote operation device 300a, which has instructed to reproduce the slide show. For example, the images may be reproduced in order according to how the obtaining date and time are close to the obtaining date and time of the image transmitted by the remote operation device 300a, starting from an image whose date and time of obtaining are the closest to the obtaining date and time of the image transmitted by the remote operation device 300a.

The reproduction management information only needs to be data in which information used to identify data is associated with a number indicative of the reproduction order of the data, and is not limited to the example shown in Table 4. For example, the reproduction management information may be such data in which a number indicative of the reproduction order is associated with a corresponding URL (as the one described previously). In this case, based on the date and time of transmitting the data identification information, which are included in the URL, the slide-show executing section 6 can identify a file whose name includes the date and time of transmitting.

After generating the reproduction management information, the slide-show executing section 6 executes the data storing terminal confirmation process (on the output device side) (S72). The data storing terminal confirmation process (on the output device side) is performed with respect to the remote operation device 300a or 300b. This process determines whether or not a terminal storing an image to be displayed next can supply the image. If the terminal can supply the image, the image is determined to be displayed next. The data storing terminal confirmation process (on the output device side, on the data providing terminal side) will be described in detail later.

Thereafter, the slide-show executing section 6 performs the data output process (on the output device side) with respect to a terminal (the remote operation device 300a or 300b) storing the image which is determined, in the data storing terminal confirmation process, to be displayed next (S16). Specifically, the slide-show executing section 6 refers to the data identification information so as to identify the terminal storing the image; then, the slide-show executing section 6 transmits, to the identified terminal (the remote operation device 300a or 300b), a request for transmission of the image. The content transmission control section 26 in the terminal (the remote operation device 300a or 300b) which has received the request transmits the requested image to the operation target device 200. Then, the slide-show executing section 6 in the operation target device 200 causes the display section 204 to display the image thus received.

Namely, the data output process (on the output device side) is (i) a process for transmitting a request for transmission of data, (ii) receiving the requested data, and (iii) outputting the data. Meanwhile, the data output process (on the data providing terminal side) is a process for (i) receiving the request for transmission of the data and (ii) transmitting the data in response to the request.

Further, the data output process (on the data providing terminal side) may be set as follows: When the request for transmission of the data is received or when the data is to be transmitted to the operation target device 200, the content transmission control section 26 notifies, by means of a sound, a vibration, light, etc., the user that the data is to be outputted (or has been outputted).

This arrangement allows the user of the remote operation device 300*a* or 300*b* to recognize that his/her data is to be outputted (or is currently outputted). Further, with this arrangement, since the remote operation device 300*a* or 300*b* emits a sound, a vibration, light, etc., people around the remote operation device 300*a* or 300*b* can also identify the terminal which is the owner of the data to be outputted (or is currently outputted).

For example, assume a case of reproducing a slide show of photos taken by the remote operation devices 300*a* and 300*b* in a family trip. In this case, one of the remote operation device 300*a* and 300*b*, which stores a photo to be displayed (or is currently outputted), emits a sound, a vibration, light, etc. With this, a person who took the photo to be displayed (or is currently displayed) by the operation target device 200 can be identified by the person and people around the person. Therefore, they can enjoy the slide show more.

Further, according to this arrangement, a person who took photos can confirm an image to be displayed, before the image is displayed by the operation target device 200 in the slide show. Therefore, the person who took photos can cancel displaying, in the slide show, an image such as an image that he/she does not want to show, before the image is displayed by the operation target device 200.

After an image is displayed in the above manner, the slide-show executing section 6 refers to the generated reproduction management information so as to determine whether or not the displayed image is the last image in the slide show (S73). If the displayed image is not the last image (NO in S73), the process returns to S72, and the slide-show executing section 6 checks the presence or absence of a terminal storing an image to be displayed next.

On the other hand, if the displayed image is the last image (YES in S73), the slide-show executing section 6 checks whether or not a repeating setting is set (i.e., whether or not the user has determined to perform repeated reproduction) (S74). If the repeating setting is set (YES in S74), the process returns to S72, and the slide-show executing section 6 checks the presence or absence of a terminal storing an image whose number indicative of the reproduction order is set to "1" in the reproduction management information. If the repeating setting is not set (NO in S74), the slide-show executing section 6 ends the slide-show execution process (on the output device side).

As described above, the slide-show execution process causes images stored in the remote operation devices 300*a* and 300*b* to be sequentially displayed by the operation target device 200. Note that, according to the remote operation system 100, it is possible to perform shuffle reproduction of any data such as audio data (e.g., music tunes) and/or text data in the similar manner to the above.

[Display by Interruption During Reproduction of Slide Show]

According to the remote operation system 100, it is possible to interrupt reproduction of a slide show so as to display an image designated by the remote operation device 300 (this operation is not illustrated in FIG. 12). The following will describe the process for display by interruption. Note that either the remote operation devices 300*a* or 300*b* may issue an instruction to perform display by interruption. Therefore, the following explanation assumes that the remote operation device 300 is a terminal for transmitting an instruction to perform display by interruption.

In a case where, during the slide-show execution process, a command to cause the operation target device 200 to display an image is confirmed to be inputted to the operation section 308, the slide-show execution instructing section 25 causes the display section 307 to display thumbnails of images stored in the remote operation device storage section 310, so as to allow the user to select an image to be displayed on the operation target device 200.

Note that the thumbnails displayed here may be (i) the ones corresponding to data identification information which has been transmitted to the operation target device 200, (ii) the ones corresponding to images whose data identification information has not been transmitted, or (iii) both of them.

Upon confirming that the image to be displayed on the operation target device 200 is selected, the slide-show execution instructing section 25 instructs the data identification information extracting section 24 to extract data identification information of the selected image. Then, the slide-show execution instructing section 25 transmits, to the operation target device 200, the data identification information thus extracted.

When confirming reception of the data identification information during the slide-show execution process, the slide-show executing section 6 in the operation target device 200 checks whether or not the image corresponding to the received data identification information is included in the reproduction management information.

If the image corresponding to the received data identification information is not included in the reproduction management information, the slide-show executing section 6 adds the image to the reproduction management information. In this process, this image is set so as to be displayed following an image which is currently displayed.

On the other hand, if the image corresponding to the received data identification information is included in the reproduction management information, the slide-show executing section 6 updates the reproduction management information so that this image is displayed following the image which is currently displayed.

As described above, performing the process for display by interruption updates the reproduction management information. As a result, the reproduction of the slide show is interrupted so as to display the image corresponding to the data identification information transmitted by the remote operation device 300.

Note that there are by no means any particular limitations on the reproduction order of the image corresponding to the data identification information transmitted by the remote operation device 300, and the image only needs to be displayed after the currently-displayed image. For example, this image may be displayed following two another images after the currently-displayed image, or may be displayed as a last image of the slide show.

Further, in the process for display by interruption, instead of the data identification information, the remote operation device 300 may transmit actual data (high-resolution image) and cause the actual data to be displayed. In this case, the operation target device 200 can display the image without performing the data output process. Therefore, the operation target device 200 can quickly display the image which is to be displayed by interruption.

[Data Storing Terminal Confirmation Process]

Figure 13:
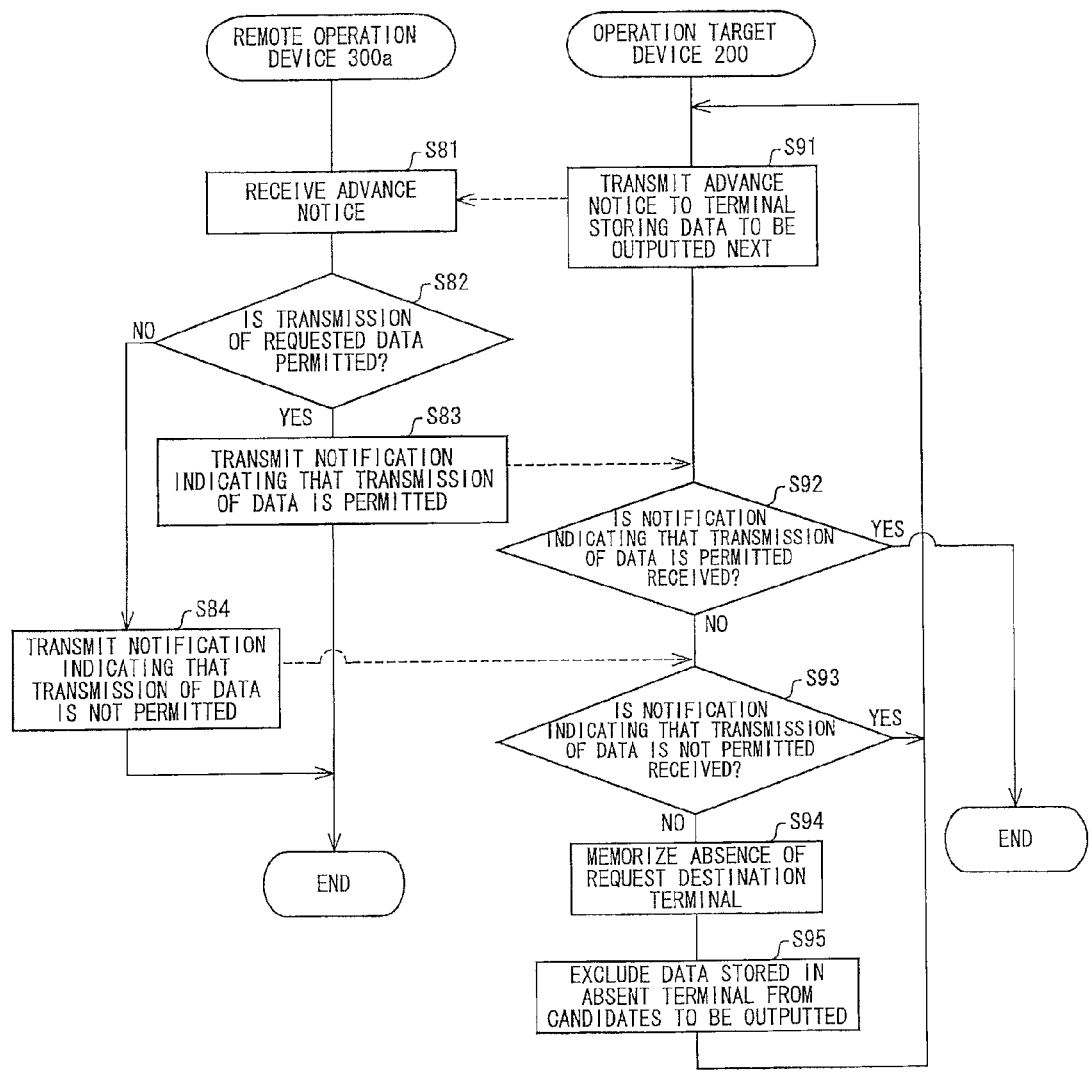
FIG. 13 is a flow chart illustrating one example of a data storing terminal confirmation process (on the data providing terminal side, on the output device side), which is executed by the remote operation system.

Next, with reference to FIG. 13, the following will describe in detail (i) the data storing terminal confirmation process (on the data providing terminal side) in S63 in FIG. 12 and (ii) the data storing terminal confirmation process (on the output device side) in S72 in FIG. 12. FIG. 13 is a flow chart illustrating one example of the data storing terminal confirmation process (on the data providing terminal side, on the output device side).

First, the slide-show executing section 6 in the operation target device 200 refers to the reproduction management information so as to identify (i) data which is to be outputted following data being currently outputted, and (ii) a terminal storing the data which is to be outputted following the data being currently outputted. Then, the slide-show executing section 6 transmits an advance notice to the terminal thus identified (S91). It is assumed herein that the remote operation devices 300a and 300b are communicably connected to the operation target device 200; therefore, the advance notice is transmitted to the remote operation device 300a or 300b. FIG. 13 shows an example where the advance notice is transmitted to the remote operation device 300a.

Upon confirming reception of the advance notice (S81), the content transmission control section 26 in the remote operation device 300a allows the user to determine whether to permit transmission of the requested data (S82). For example, by displaying an image as shown in FIG. 14, it is possible to allow the user to determined whether to permit transmission of the requested data.

Figure 14:
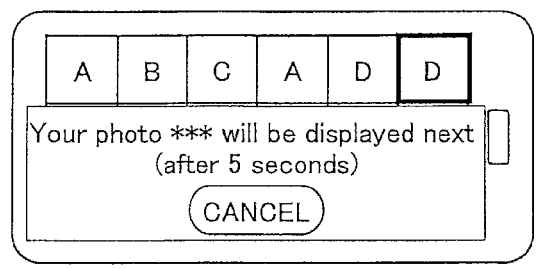
FIG. 14 is a view illustrating one example of a display screen for allowing the user to determine whether to permit transmission of requested data, which display screen is displayed in the data storing terminal confirmation process.

FIG. 14 is a view illustrating one example of a display screen for allowing the user to determine whether to permit transmission of the requested data. As shown in FIG. 14, the display screen displays (i) a name of the requested data, (ii) time left until the data is outputted, and (iii) a selection item for canceling output of the data. In this case, if the selection item for canceling output of the data is selected, the content transmission control section 26 may determine that transmission of the data is not permitted; if a predetermined time period (in the example shown in FIG. 14, five seconds) has elapsed with the selection item for canceling output of the data unselected, the content transmission control section 26 may determine that transmission of the data is permitted.

Further, there may be a case where the user of the remote operation device 300a does not notice reception of the advance notice. In view of this, when confirming reception of the advance notice, the content transmission control section 26 preferably notifies the user of reception of the advance notice by means of, e.g., a sound (including a voice message, melody, etc.), a vibration, light (LED lamp).

Note that, in S82, the content transmission control section 26 may automatically determine whether to permit transmission of the data. For example, the content transmission control section 26 may be configured to determine that transmission of the data is not permitted in a case where (i) the remote operation device 300a has a remaining battery level below a predetermined threshold value or (ii) the remote operation device 300a is executing a process such as a telephone call. This makes it possible to prevent the remaining battery level from being reduced by transmission of the data, or to prevent the process such as a telephone call from being interrupted by transmission of the data.

If the requested data is to be transmitted (YES in S82), the content transmission control section 26 transmits, to the operation target device 200, a notification indicating that transmission of the data is permitted (S83). On the other hand, if the data requested is not to be transmitted (NO in S82), the content transmission control section 26 transmits, to the operation target device 200, a notification indicating that transmission of the data is not permitted (S84).

Meanwhile, the slide-show executing section 6 in the operation target device 200 checks whether or not the operation target device 200 has received the notification indicating that transmission of the data is permitted (S92). If the slide-show executing section 6 confirms that reception of the notification indicating that transmission of the data is permitted (YES in S92), the slide-show executing section 6 determines, as an image to be displayed next, the image for which the notification indicating that transmission of the data is permitted is issued, and ends the data storing terminal confirmation process.

On the other hand, if the slide-show executing section 6 cannot confirm reception of the notification indicating that transmission of the data is permitted (NO in S92), the slide-show executing section 6 checks whether or not the operation target device 200 has received the notification indicating that transmission of the data is not permitted (S93). If the slide-show executing section 6 confirms reception of the notification indicating that transmission of the data is not permitted (YES in S93), the slide-show executing section 6 returns to S91 so as to identify (i) data which is a candidate for data to be displayed next and (ii) a terminal storing the data. Then, the slide-show executing section 6 transmits an advance notice to the terminal thus identified.

On the other hand, if the slide-show executing section 6 cannot confirm reception of (i) the notification indicating that transmission of the data is permitted nor (ii) the notification indicating that transmission of the data is not permitted within a predetermined time period after the transmission of the advance notice (NO in S93), the slide-show executing section 6 determines that it is impossible to communicate with the terminal which is the destination of the advance notice, and memorizes the absence of the terminal (S94). Then, the slide-show executing section 6 deletes, from the reproduction management information, the data stored in the terminal which is absence (S95), and the process returns to S91.

Note that the above-described data storing terminal confirmation process is merely one example, and the present invention is not limited to this example. Alternatively, for example, the slide-show executing section 6 may first cause the communication possibility determining section 5 to determine whether or not each terminal can communicate with the operation target device 200, and may transmit an advance notice only to a terminal which has determined to be able to communicate with the operation target device 200.

In this arrangement, the candidates for data to be outputted may exclude data stored in a terminal which has determined by the communication possibility determining section 5 to be unable to communicate with the operation target device 200. Further, in this arrangement, if a notification indicating that transmission of data is not permitted is transmitted, a candidate for data to be outputted may be changed to a next candidate.

[Slide-Show with BGM Execution Process]

Figure 15:
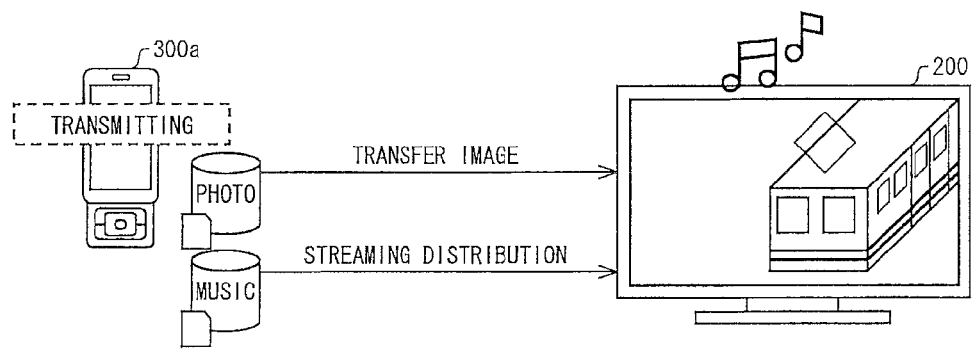
FIG. 15 is a view schematically illustrating a slide show with BGM.

Next, with reference to FIG. 15, the following will schematically describe a slide show with BGM realized by the remote operation system 100. FIG. 15 is a view schematically illustrating the slide show with BGM.

As described above, the remote operation system 100 can reproduce a slide show in such a manner that images stored in the remote operation device 300 are transmitted to the operation target device 200, and the images are sequentially displayed by the operation target device 200.

On the other hand, in the slide-show with BGM, as shown in FIG. 15, while images are transferred from the remote operation device 300a to the operation target device 200 so as to reproduce the slide show, a music tune stored in the remote operation device 300a is distributed through streaming to the operation target device 200, and the operation target device 200 outputs the music tune by audio. This allows the user to enjoy the slide-show reproduction with BGM.

Figure 16:
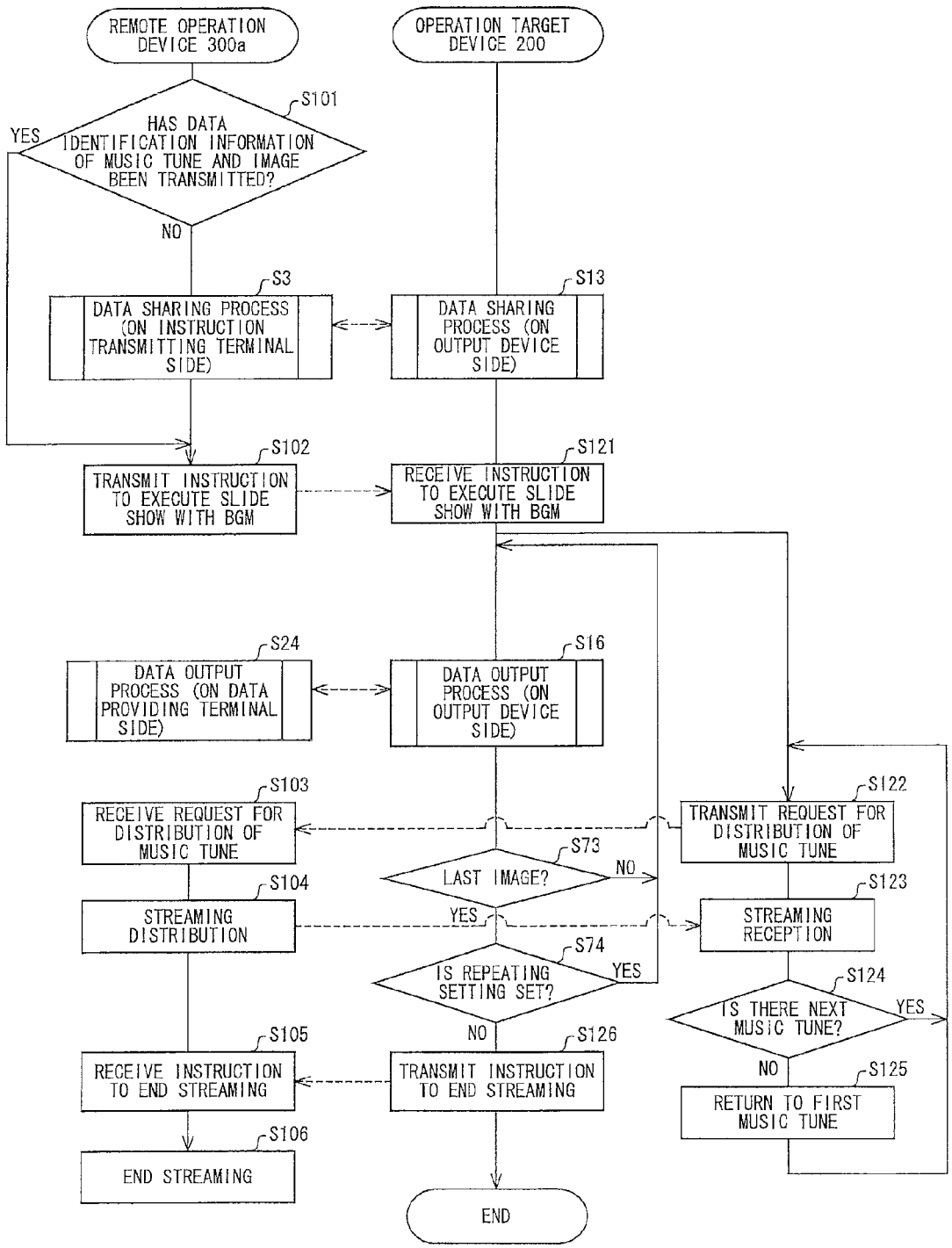
FIG. 16 is a flow chart illustrating one example of a slide-show with BGM execution process (on the instruction transmitting terminal side, on the output device side, on the data providing terminal side).

Next, with reference to FIG. 16, the following will describe details of the slide-show with BGM execution process executed in S7, S15, and S23 in FIG. 6. FIG. 16 is a flow chart illustrating one example of a slide-show with BGM execution process (on the instruction transmitting terminal side, on the output device side, on the data providing terminal side). Firstly described herein is a flow of a process performed by the remote operation device 300a (instruction transmitting terminal) and the remote operation device 300b (data providing terminal). After that, a flow of a process performed by the operation target device 200 (output device) will be described.

<<Slide-Show with BGM Execution Process (on Instruction Transmitting Terminal Side, on Data Providing Terminal Side)>>

Upon confirming reception of an instruction to execute a slide show with BGM, the slide-show execution instructing section 25 in the remote operation device 300a (instruction transmitting terminal) checks whether or not the remote operation device 300a has already transmitted, to the operation target device 200, data identification information of (i) images to be reproduced in the slide show and (ii) music tunes to be outputted together with the slide show (S101).

If the remote operation device 300a has not transmitted the data identification information yet (NO in S101), the slide-show execution instructing section 25 instructs the data sharing process section 22 on the operating side to execute a data sharing process (on the instruction transmitting terminal side), so as to transmit, to the operation target device 200, the data identification information of the images and the music tunes each of which is to be outputted in the slide show with BGM (S3).

After the data identification information is transmitted to the operation target device 200 in S3 or if the remote operation device 300a has already transmitted the data identification information to the operation target device 200 (YES in S101), the slide-show execution instructing section 25 transmits, to the operation target device 200 via the second communication section 302 on the operating side, an instruction to execute the slide show with BGM (S102).

Note that, in a slide-show execution process (on the instruction transmitting terminal side), it is not always necessary to transmit, to the operation target device 200, data identification information of a music tune and an image. For example, in some cases, it is possible to execute a slide show with BGM, even if either one of (i) data identification information of a music tune and (ii) data identification information of an image is transmitted to the operation target device 200, or even if no data identification information is transmitted to the operation target device 200.

Namely, if another terminal (e.g., the remote operation device 300b) in the remote operation system 100 has transmitted, to the operation target device 200, data identification information of a music tune and/or an image, the remote operation device 300a can cause the operation target device 200 to execute a slide show with BGM, merely by transmitting, to the operation target device 200, an instruction to execute the slide show with BGM. Alternatively, the remote operation device 300a may transmit, to the operation target device 200, (i) an instruction to execute a slide show with BGM and (ii) a data selection condition, so that the operation target device 200 requests each terminal (e.g., each of the remote operation devices 300a and 300b) in the remote operation system 100 to supply data identification information.

After transmitting the instruction to execute the slide show with BGM, the remote operation device 300a also serves as a data providing terminal, as well as the remote operation device 300b does. That is, in a case where the operation target device 200 executes a data output process (on the output device side, S16), the remote operation devices 300a and 300b each execute a data output process (on the data providing terminal side) (S24). Note that, in the example shown in FIG. 16 as well as in the example shown in FIG. 12, the data output process (on the output device side, on the data providing terminal side) is preferably performed after a data storing terminal confirmation process (on the output device side, on the data providing terminal side).

Further, after transmitting the instruction to execute the slide show with BGM, each of the remote operation devices 300a and 300b serves also as a streaming distribution terminal. That is, upon confirming reception of a request for distribution of a music tune (S103), the slide-show execution instructing section 25 in the remote operation device 300a or 300b instructs the streaming distribution section 27 to distribute the requested music tune to the operation target device 200 through streaming (S104).

Then, when an instruction to end the streaming is received from the operation target device 200 (S105), the slide-show execution instructing section 25 in the remote operation device 300a or 300b instructs the streaming distribution section 27 to end the streaming destitution to the operation target device 200 (S106).

<<Slide-Show with BGM Execution Process (on Output Device Side)>>

In the slide-show with BGM execution process (on the output device side) executed by the operation target device 200, a data sharing process (on the output device side) is executed by the slide-show executing section 6 if necessary (S13). Consequently, data identification information of images and music tunes is gathered into the operation target device 200, the images and the music tunes having been permitted by each terminal (herein, each of the remote operation devices 300a and 300b) included in the remote operation system 100 to be shared.

Upon confirming reception of the instruction to execute the slide show with BGM (S121), the slide-show executing section 6 generates (i) reproduction management information for an image (e.g., the one shown in Table 4) and (ii) reproduction management information for a music tune (e.g., the one shown in Table 5 below). Table 5 shows one example of the reproduction management information for a music tune.

TABLE 5

| Reproduction Order | Reproduction Period | Artist | Title | File Name |
|---|---|---|---|---|
| 1 | 3 min. 21 sec. | SMAAP | Two in the world | 200000989.mp3 |
| 2 | 5 min. 19 sec. | Seiko Nakagawa | Snow tears | 2001111119.mp3 |
| 3 | 2 min. 58 sec. | Masa Akikawa | Linear winds | 2000000444.mp3 |
| 4 | 3 min. 07 sec. | Kurokobu | Flower bud | 2000012343.mp3 |
| ... | ... | ... | ... | ... |

As shown in Table 5, also in the reproduction management information for a music tune, a number indicative of the reproduction number is associated with a respective file name, as well as in the reproduction management information for an image. Accordingly, by referring to the reproduction management information for a music tune, the slide-show executing section 6 can identify a file of a music tune which is to be reproduced next. It is assumed herein that the data identification information includes, for a music tune, information such as a reproduction period, an artist name, and a title (see Table 3).

Note that the reproduction management information for a music tune only needs to be data in which information used to identify data is associated with a number indicative of the reproduction order of the data, and is not limited to the example shown in Table 5. Alternatively, for example, the reproduction management information for a music tune can be (i) data in which a number indicative of the reproduction order is associated with a corresponding file name or (ii) data in which a number indicative of the reproduction order is associated with a corresponding URL (as the one described previously).

Subsequently, after generating (i) the reproduction management information for an image and (ii) the reproduction management information for a music tune, the slide-show executing section 6 reproduces the slide show by using the generated reproduction management information for an image (S16, S73, S74). This causes the operation target device 200 to sequentially display the images stored in the remote operation device 300a or 300b.

Also, at the same as the reproduction of the slide show, the slide-show executing section 6 performs a process for outputting BGM. That is, after generating the reproduction management information for a music tune, the slide-show executing section 6 refers to the generated reproduction management information for a music tune, and transmits, to a terminal storing a music tune which is to be outputted next, a request to distribute the music tune (S122).

In response to the request to distribute the music tune, as described previously, the terminal (the remote operation device 300a or 300b) that has received the request distributes the music tune to the operation target device 200 through streaming (S103). Thus, the operation target device 200 receives the music tune distributed through streaming (S123). In response to this, the streaming executing section 7 reproduces the received music tune through streaming. Consequently, the audio output section 202 outputs the music tune which is distributed.

Upon confirming reception of the music tune distributed through streaming, the slide-show executing section 6 refers to the generated reproduction management information for a music so as to confirm the presence or absence of a music tune which is to be reproduced next (S124). If there is the music tune which is to be reproduced next (YES in S124), the slide-show executing section 6 returns to S122 so as to transmit, to a terminal storing the next music tune, a request to distribute the next music tune.

On the other hand, if there is no music tune which is to be reproduced next, i.e., if the music tune which is currently receiving is the last music tune in the reproduction management information for a music tune (NO in S124), the slide-show executing section 6 transmits, to a terminal storing the first music tune, a request to distribute the first music tune (S125, S122).

In this manner, in the slide-show with BGM execution process (on the output device side) shown in FIG. 16, even after all of the music tunes included in the reproduction management information for a music tune are reproduced once, the music tunes are repeatedly reproduced through streaming while the slide show is executed. Consequently, BGM is continuously played while the slide show is reproduced. Thus, the user can enjoy the slide show with BGM until the slide show ends.

The slide-show with BGM execution process (on the output device side) shown in FIG. 16 is ended when the reproduction of the slide show ends. That is, in a case where the repeating setting is not set, when the last image in the reproduction management information is outputted, the streaming executing section 7 transmits, to a terminal (the remote operation device 300a or 300b) that is performing the streaming distribution at that point, an instruction to end the streaming (S126). In response to the transmission of the instruction to end the streaming, the slide-show with BGM execution process (on the output device side) is ended.

[Method for Selecting BGM]

In the case where the data sharing process causes the remote operation device 300 to transmit, to the operation target device 200, data identification information of a music tune as described above, the user of the remote operation device 300 selects, from among music tunes stored in the remote operation device 300, a music tune to be supplied as BGM.

Alternatively, however, in the remote operation system 100, a music tune to be played as BGM may be automatically determined according to the images to be reproduced in the slide show. The following will describe an example where a music tune to be played as BGM is determined automatically. It is assumed herein that the remote operation device 300a has transmitted, to the operation target device 200, (i) a data selection condition for selecting a photo to be reproduced in a slide show, (ii) data identification information indicating a photo that the remote operation device 300a can provide, and (iii) an instruction to execute a slide show with BGM.

Upon confirming reception of the data selection condition, the data identification information, and the instruction to execute the slide show with BGM, the slide-show executing section 6 in the operation target device 200 generates a data selection condition for selecting BGM, according to the received data selection condition. It is possible to determine the data selection condition for selecting BGM by using correspondence information, e.g., the one shown in Table 6 below.

Table 6 shows one example of correspondence information in which (i) a data selection condition for selecting a photo is associated with (ii) a corresponding data selection condition for selecting BGM. Note that the data selection conditions for a photo are the same as those shown in FIG. 9. As shown in Table 6, the data selection conditions for a photo are associated with their corresponding data selection conditions for BGM.

TABLE 6

| Data Selection Condition for Photo | Data Selection Condition for BGM |
|---|---|
| Photo of the same date as that of the selected photo | Music tune purchased on a date close to that date |
| Photo of the same place as that of the selected photo | Music tune listened to in that place |
| Photo of the same owner as that of the selected photo | Music tune owned by the same owner |
| Photo taken today | Recently purchased music tune, recently listened music tune |
| Photo taken this week | Music tune purchased this week, music tune often listened to this week |
| . . . | . . . |

For example, if the data selection condition for a photo "photo of the same date as that of the selected photo" is received, the slide-show executing section 6 can determine the BGM data selection condition "music tune purchased on a date close to that date" by using the corresponding information shown in Table 6. Then, by transmitting the data selection condition "music tune purchased on a date close to that date" to the remote operation device 300, the slide-show executing section 6 can cause the remote operation device 300 to transmit data identification information of a "music tune purchased on a date close to that date".

Consequently, the slide-show executing section 6 can generate reproduction management information for a music tune. Further, according to the generated reproduction management information, the slide-show executing section 6 can transmit, to each of the remote operation devices 300a and 300b, a request to distribute a music tune. As a result, the operation target device 200 can receive the requested music tunes which are distributed through streaming.

Further, by using the above correspondence information, it is possible to determine a data selection condition for a photo based on a data selection condition for BGM. Namely, it is also possible to reproduce a slide show with BGM by (i) transmitting a data selection condition for BGM to the operation target device 200, (ii) causing the operation target device 200 to determine a data selection condition for a photo corresponding to the data selection condition for BGM, and (iii) causing the operation target device 200 to transmit, to the remote operation device 300, the data selection condition for a photo.

[Viewing of Image]

Incidentally, conventional methods for viewing an image at a device having a relatively small display screen (e.g., a mobile phone or a digital camera) include, in addition to a method for viewing stored images one by one, a method for causing the device to display thumbnails of photos and allowing the user to select, from among the thumbnails, an image to view. A thumbnail has a smaller image size and a smaller data volume than those of actual data (high-resolution image) of a photo. Therefore, a plurality of thumbnails can be quickly displayed on a small display screen.

However, the number of thumbnails that a generally-used mobile phone can display at once is merely 10 or so. In addition, in a case where a plurality of thumbnails are displayed on a small display screen, each of the displayed thumbnails becomes quite small. This makes it difficult to confirm the content of each image. For this reason, it has been conventionally difficult to find a desired image from among a number of images at a device having a small display screen.

Figure 17:
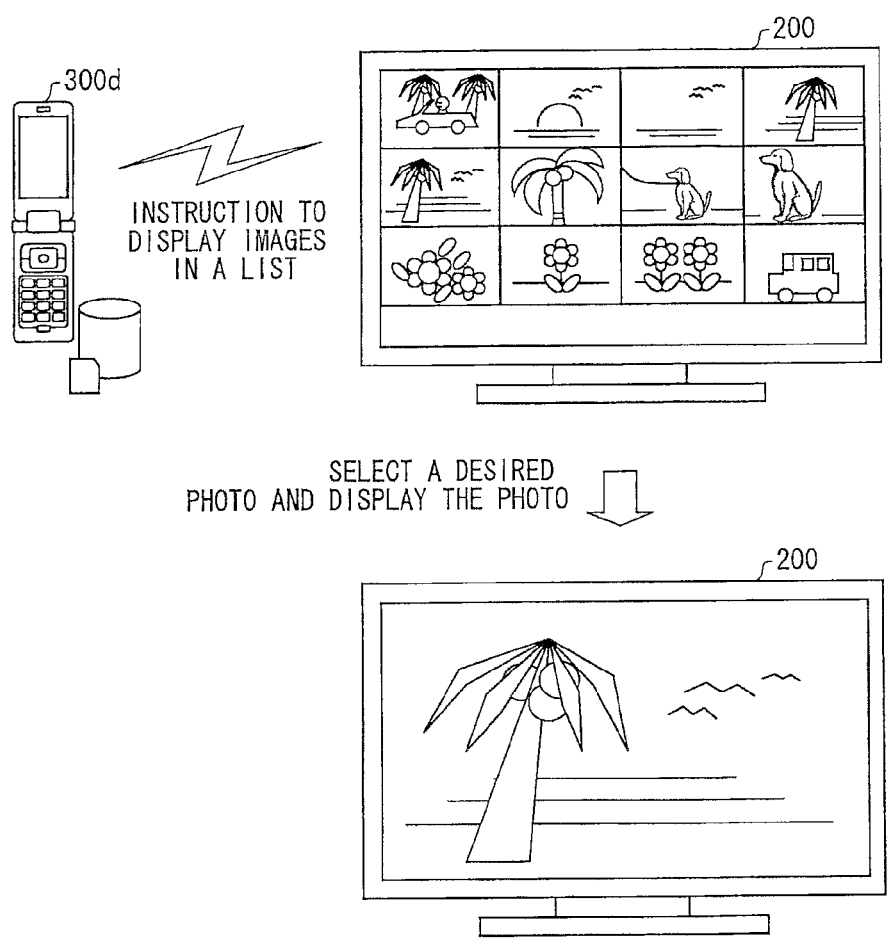
FIG. 17 is a view illustrating an example where the operation target device is caused to display images stored in the remote operation device.

However, even in a case where the remote operation device 300 stores a number of images, use of the remote operation system 100 allows the user to easily select a desired image from among the images and view the desired image. This will be described with reference to FIG. 17. FIG. 17 is a view illustrating an example where the operation target device 200 is caused to display images stored in the remote operation device 300d.

As described above, in a case where the remote operation device storage section 310 stores images, the remote operation device 300 transmits thumbnails of the images to the operation target device 200 as data identification information. Further, the remote operation device 300 transmits, to the operation target device 200, an instruction to display the data identification information.

In S36 in the flow chart shown in FIG. 8, the remote operation device 300 transmits the data selection condition to the operation target device 200, in addition to the display instruction and the data identification information. However, in the process described here, the transmission of the data selection condition is not indispensable, since a purpose of this process is to view, at the operation target device 200, an image stored in the remote operation device 300d.

Further, in response to the operation target device 200 receiving the data identification information (including the thumbnails) transmitted from the remote operation device 300d, the thumbnails are displayed by the operation target device 200 in a list, as shown in FIG. 17.

By inputting an instruction to the remote operation device 300d, it is possible to make a selection from the thumbnails displayed by the operation target device 200. In response to selection of a thumbnail, actual data (high-resolution image) of the selected thumbnail is transmitted from the remote operation device 300d to the operation target device 200, and then is displayed by the operation target device 200 (data output process).

In this manner, the remote operation system 100 makes it possible to display, on a large screen of the operation target device 200, the thumbnails of the images stored in the remote operation device 300d. This allows the user of the remote operation device 300d to easily confirm the content of images stored in the remote operation device storage section 310. In addition, since the thumbnails and high-resolution images are displayed on the large screen, all the people being in the place can enjoy viewing the images.

[Example Where Data Identification Information is Transmitted to Remote Operation Device 300]

In the above example, the data identification information transmitted from the remote operation device 300 is gathered into the operation target device 200, and is used only by the operation target device 200. Alternatively, however, the operation target device 200 may transmit the gathered data identification information to the remote operation device 300. This makes it possible to confirm, at the remote operation device 300, the data identification information of the data shared in the remote operation system 100.

Figure 18:
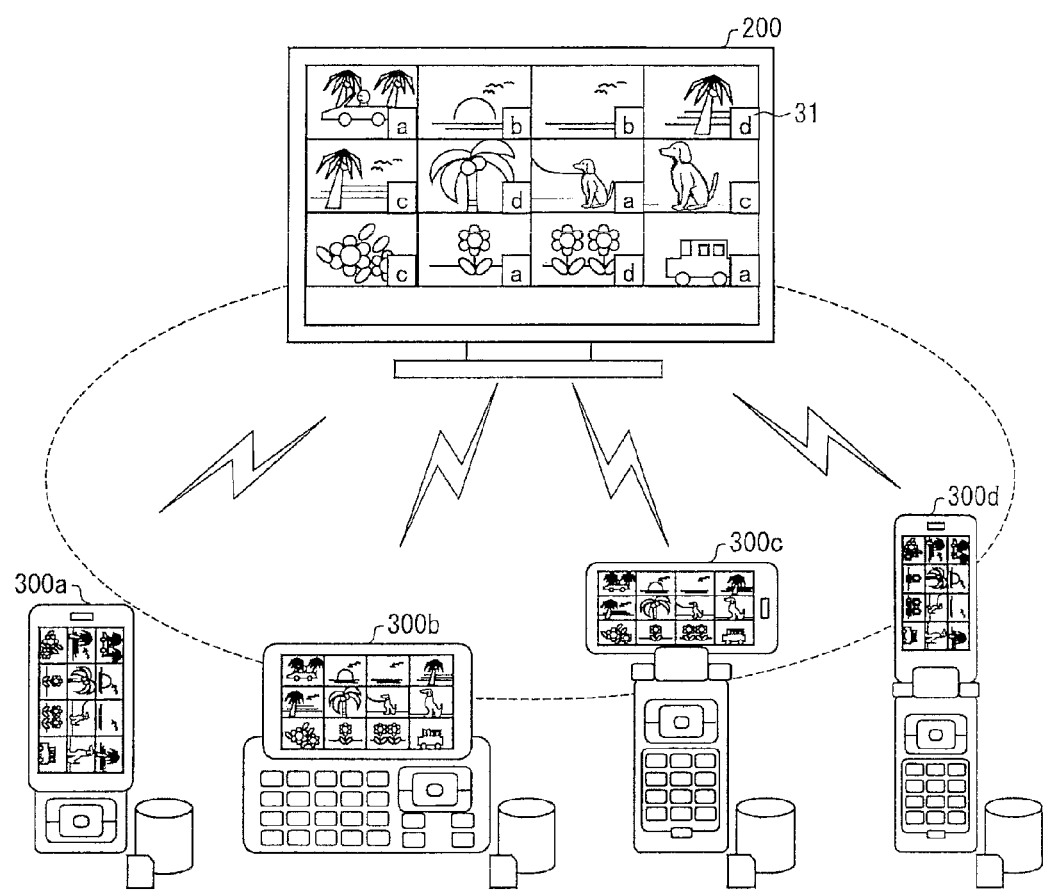
FIG. 18 is a view illustrating one example of respective display screens of the operation target device and the remote operation devices, which display screens are displayed when the operation target device transmits data identification information to the remote operation devices.

This will be described with reference to FIG. 18. FIG. 18 is a view illustrating one example of respective display screens of the operation target device 200 and the remote operation devices 300a through 300d, which display screens are displayed when the operation target device 200 transmits the data identification information to the remote operation devices 300a through 300d. Note that the example shown in FIG. 18 is a case where images are shared.

As shown in FIG. 18, the operation target device 200 displays thumbnails of images shared in the remote operation system 100. Further, each of the remote operation devices 300a through 300d also displays the thumbnails of the images shared in the remote operation system 100.

Accordingly, the users of the remote operation devices 300a through 300d can confirm the images shared in the remote operation system 100 not only by seeing the display screen of the operation target device 200, but also by seeing the display screens of the respective remote operation devices 300a through 300d.

Further, even while the operation target device 200 is displaying a high-resolution image, the user can confirm the images shared in the remote operation system 100 by seeing any of the display screens of the respective remote operation devices 300a through 300d. That is, in a case where the data identification information is transmitted to the remote operation device 300, the user can confirm the data shared in the remote operation system 100 and make a selection from the data, regardless of the display condition of the operation target device 200. This is convenient, for example, for copying the shared data.

Further, as shown in FIG. 18, for each of the thumbnails displayed by the operation target device 200, corresponding terminal identification information 31 is displayed. The terminal identification information 31 is information used to identify a terminal (in this case, any of the remote operation devices 300a through 300d) storing actual data (high-resolution image) corresponding to a respective thumbnail.

Displaying the terminal identification information 31 allows the user of the remote operation system 100 to identify a terminal storing actual data (high-resolution image) corresponding to the respective displayed thumbnail. Note that the terminal identification information 31 may be displayed also by the remote operation devices 300a through 300d.

[Process Performed When Data Identification Information is Transmitted to Remote Operation Device 300]

Figure 19:
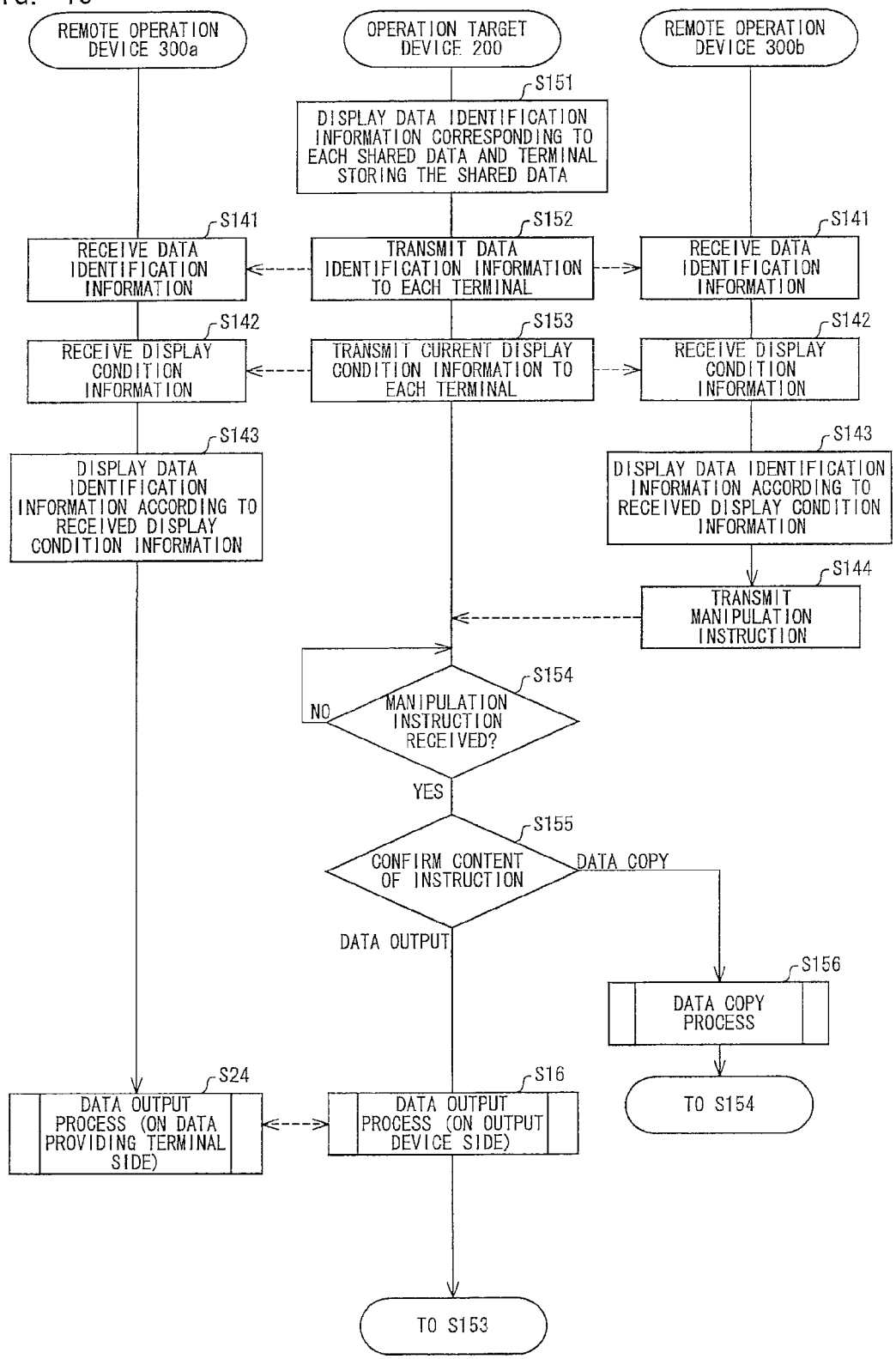
FIG. 19 is a flow chart illustrating one example of a process performed in the remote operation system when data identification information is transmitted to the remote operation device.

With reference to FIG. 19, the following will describe a flow of a process performed when data identification information is transmitted to the remote operation device 300. FIG. 19 is a flow chart illustrating one example of a process performed in the remote operation system 100 when data identification information is transmitted to the remote operation device 300. It is assumed herein that the data identification information is transmitted from each terminal (each of the remote operation devices 300a and 300b) to the operation target device 200, e.g., by performing the data sharing process as shown in FIG. 8.

After the remote operation devices 300a and 300b finish the data sharing process (on the instruction transmitting terminal side) and the data sharing process (on the data providing terminal side), the operation target device 200 transmits data identification information and display condition information to the remote operation devices 300a and 300b. The remote operation devices 300a and 300b receive the data identification information and the display condition information (S141, S142).

Here, the data sharing process sections 22 on the operating side in the remote operation devices 300a and 300b identify, from among the received data identification information, data stored in the remote operation devices 300a and 300b, respectively. Further, each data sharing process section 22 on the operating side instructs the display control section 23 on the operating side to cause the display section 307 to display the received data identification information according to the received display condition information (S143).

In this operation, the data sharing process section 22 on the operating side causes (i) data identification information corresponding to the identified data (i.e., the data stored in the remote operation devices 300a or 300b including the data sharing process section 22 on the operating side) and (ii) the other data identification information to be displayed in a distinguishable manner. This allows the users of the remote operation device 300a and 300b to easily identify, from among the data shared in the remote operation system 100, data stored in their own terminals.

Note that there are by no means any particular limitations as to how to display (i) the data identification information corresponding the identified data and (ii) the other data identification information in a distinguishable manner. Examples of the method for displaying (i) the data identification information corresponding the identified data and (ii) the other data identification information in a distinguishable manner encompass use of different display colors, different display fields, different fonts, different brightness levels, different color tones, etc., and displaying a mark by which the above two kinds of data identification information are distinguished from each other.

Note that the display condition information refers to information indicative of data that is currently outputted by the operation target device 200. That is, the data sharing process section 22 on the operating side causes the data identification information to be displayed in such a manner that (i) data identification information corresponding to the data that is currently outputted by the operation target device 200 is distinguishable from (ii) the other data identification information.

It is assumed herein that the data sharing process section 22 on the operating side causes a cursor to be displayed on the data identification information that is currently outputted by the operation target device 200, the cursor being used to select data identification information. With this, by seeing the display of the respective display section 307, each of the users of the remote operation devices 300a and 300b can identify the data that is currently outputted by the operation target device 200.

Note that the present invention is not limited to the above example, where the cursor is displayed. Namely, in displaying (i) the data identification information that is currently displayed by the operation target device 200 and (ii) the other data identification information, the data sharing process section 22 on the operating side only needs to cause (i) the data identification information that is currently displayed by the operation target device 200 and (ii) the other data identification information to be displayed in a distinguishable manner. Alternatively, for example, by using different display colors, different display fields, different fonts, different brightness levels, different color tones, etc., (i) the data identification information that is currently displayed by the operation target device 200 and (ii) the other data identification information may be made distinguishable from each other. Further alternatively, by using characters, a symbol, and/or the like, (i) the data identification information that is currently displayed by the operation target device 200 and (ii) the other data identification information may be displayed in a distinguishable manner.

As described above, in the process in FIG. 19, the data identification information is gathered into the operation target device 200 from the remote operation devices 300a and 300b, and then the gathered data identification information is transmitted to the remote operation devices 300a and 300b. Further, the data identification information is also displayed on the display sections 307 of the respective remote operation devices 300a and 300b. With this, by seeing the display sections 307 of the respective remote operation devices 300a and 300b, the users of the remote operation devices 300a and 300b can confirm the content of data shared in the remote operation system 100.

Furthermore, according to the above process, the display condition information is transmitted from the operation target device 200. This allows the remote operation devices 300a and 300b to display the data identification information corresponding to the data outputted by the operation target device 200. Note that the display condition information may include information indicative how pieces of data identification information displayed by the operation target device 200 are arranged. In this case, the remote operation devices 300a and 300b can display pieces of data identification information in the same arrangement as that of the operation target device 200.

In addition, according to the above process, (i) data identification information corresponding to data stored in each terminal and (ii) the other data identification information are displayed in a distinguishable manner. Therefore, the users of the remote operation devices 300*a* and 300*b* can easily identify, from among the data shared in the remote operation system 100, the data stored in their own terminals.

By transmitting a manipulation instruction to the operation target device 200 (S144), the remote operation devices 300*a* and 300*b* can (i) designate data from among the data shared in the remote operation system 100 and cause the operation target device 200 to output the designated data (data output process) or (ii) designate data from among the data shared in the remote operation system 100 and load the designated data onto the remote operation devices 300*a* and 300*b*, respectively (data copy process).

Specifically, in a case where the operation section 308 is given an instruction to make a selection from the data identification information displayed on the display section 307 and to determine the selection, the slide-show execution instructing section 25 transmits a data output instruction to cause the operation target device 200 to output the determined data identification information. Meanwhile, in a case where the operation section 308 is given an instruction to make a selection from the data identification information displayed on the display section 307 and to perform copying thereof, the copy executing section 28 transmits, to the operation target device 200, an instruction to request to copy data corresponding to the determined data identification information.

The example shown in FIG. 19 is a case where a manipulation instruction is transmitted by the remote operation device 300*b*. However, any terminal can be a transmission source terminal of a manipulation instruction, as long as the terminal is communicably connected to the operation target device 200. Further, the example shown in FIG. 19 is a case where the data output process (on the data providing terminal side) is executed by the remote operation device 300*a*. However, any terminal can be a terminal for executing the data output process (on the data providing terminal side), as long as the terminal is communicably connected to the operation target device 200.

Next, the following with describe a process performed by the operation target device 200. Upon receiving the data identification information, the data sharing process section 3 on the operated side instructs the display control section 4 on the operated side to cause the display section 204 to display the data identification information and terminal identification information (S151). With this, it is possible to identify, at a glance, who is the owner of the shared data.

Subsequently, the data sharing process section 3 on the operated side transmits the data identification information to each terminal (S152). Further, the data sharing process section 3 on the operated side also transmits current display condition information to each terminal (S153). Then, the data sharing process section 3 on the operated side waits for a manipulation instruction transmitted from each terminal (S154). Note that, in a case where the operation target device 200 is not outputting any data, the data sharing process section 3 on the operated side waits for a manipulation instruction transmitted from each terminal, without transmitting the display condition information.

Here, upon confirming reception of the manipulation instruction (YES in S154), the data sharing process section 3 on the operated side confirms the content of the received instruction (S155). If the received instruction is a data output instruction, the data sharing process section 3 on the operated side instructs the slide-show execution instructing section 25 to execute a data output process (on the output device side) (S16). Consequently, the requested data is outputted by the operation target device 200.

When the data output process (on the output device side) is executed, the data outputted by the operation target device 200 is changed one from another. Accordingly, the display condition information is also changed. Therefore, after giving the instruction to execute the data output process (on the output device side), the data sharing process section 3 on the operated side returns to S153 so as to transmit current display condition information to each terminal.

As a result, the position of the cursor which is displayed on the display screen of each terminal is changed to a position of data identification information corresponding to the data that is currently outputted by the operation target device 200. Consequently, the user of each terminal can confirm, at a glance, which of data is currently outputted by the operation target device 200.

On the other hand, if it is determined, in S155, that the content of the received instruction is for data copy, the data sharing process section 3 on the operated side instructs the copy request transferring section 8 to execute a data copy process (S156). Then, after the data copy process is ended, the process returns to S154 so as to wait for reception of a manipulation instruction. Note that the data copy process will be described in detail later.

[Concrete Example]

With reference to FIGS. 20 through 23, the following will describe a concrete example where an image is displayed according to the process shown in the flow chart of FIG. 19. FIGS. 20 through 23 assume that the operation target device 200 is communicably connected to the remote operation devices 300*a* through 300*d*. However, the operation target device 200 may be communicably connected to any number of terminals.

Figure 20:
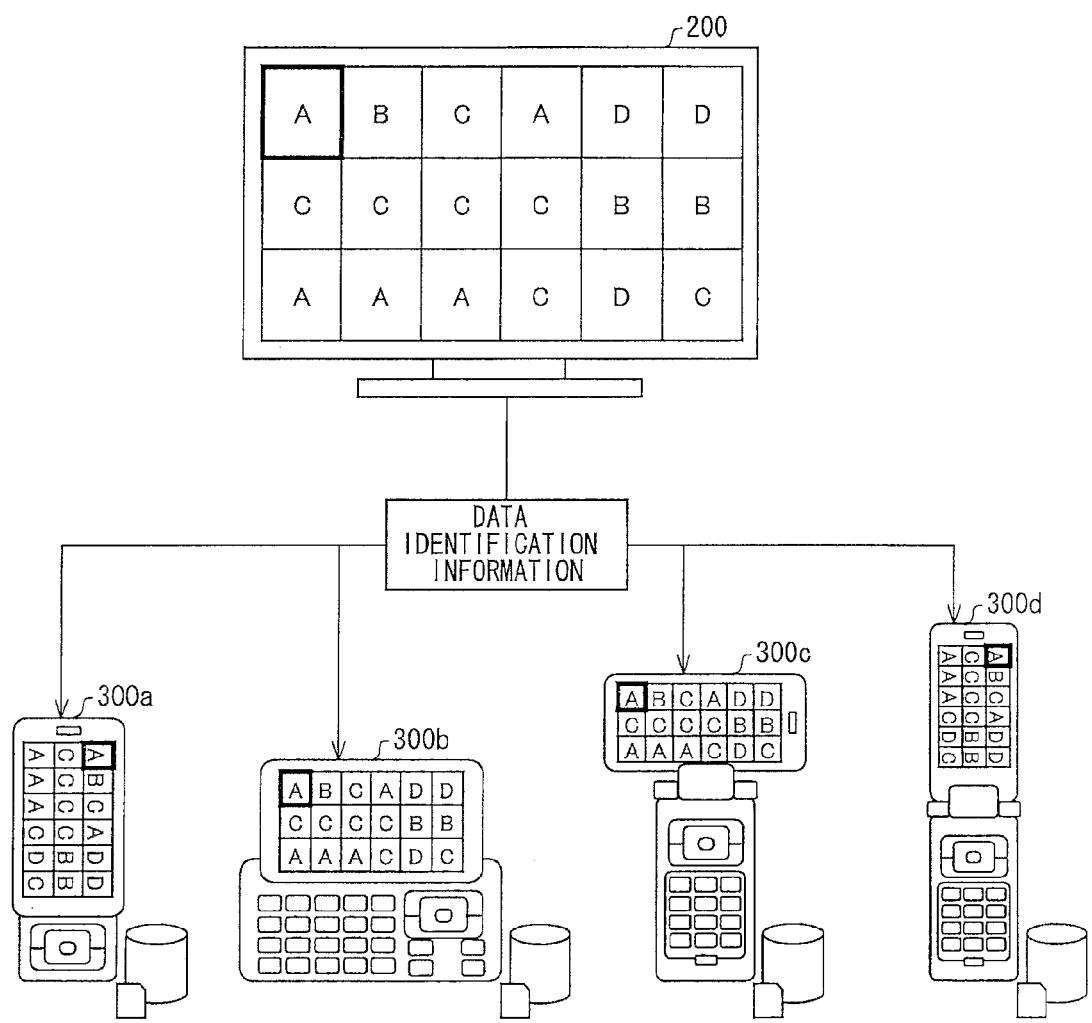
FIG. 20 is a view illustrating one example of respective display conditions of the operation target device and the remote operation devices, which are observed when the operation target device transmits data identification information to the remote operation devices in the remote operation system.

First, with reference to FIG. 20, the following will describe display conditions observed when S151 through S153 and S141 through S143 in FIG. 19 are performed. FIG. 20 is a view illustrating one example of respective display conditions of the operation target device 200 and the remote operation devices 300*a* through 300*d*, which are observed when the operation target device 200 transmits data identification information to the remote operation devices 300*a* through 300*d*.

As described previously, the operation target device 200 displays, on its display screen, (i) data identification information of data to be shared, among data stored in the remote operation devices 300*a* through 300*d*, and (ii) the owner of each of the images indicated by the individual data identification information (i.e., the terminal storing each of the images).

Herein, images are assumed to be shared. Therefore, the operation target device 200 displays, on its display screen, thumbnails of respective shared images. Further, together with each of the thumbnails, terminal identification information (terminal identification information 31), e.g., the one shown in FIG. 17, is displayed.

Further, the operation target device 200 transmits the data identification information and the display condition information to the remote operation devices 300*a* through 300*d*. Consequently, as shown in FIG. 20, each of the remote operation devices 300*a* through 300*d* displays the data identification information (thumbnails). Note that, in this operation, each of the remote operation devices 300*a* through 300*d* may also display the terminal identification information together with each of the thumbnails.

Figure 21:
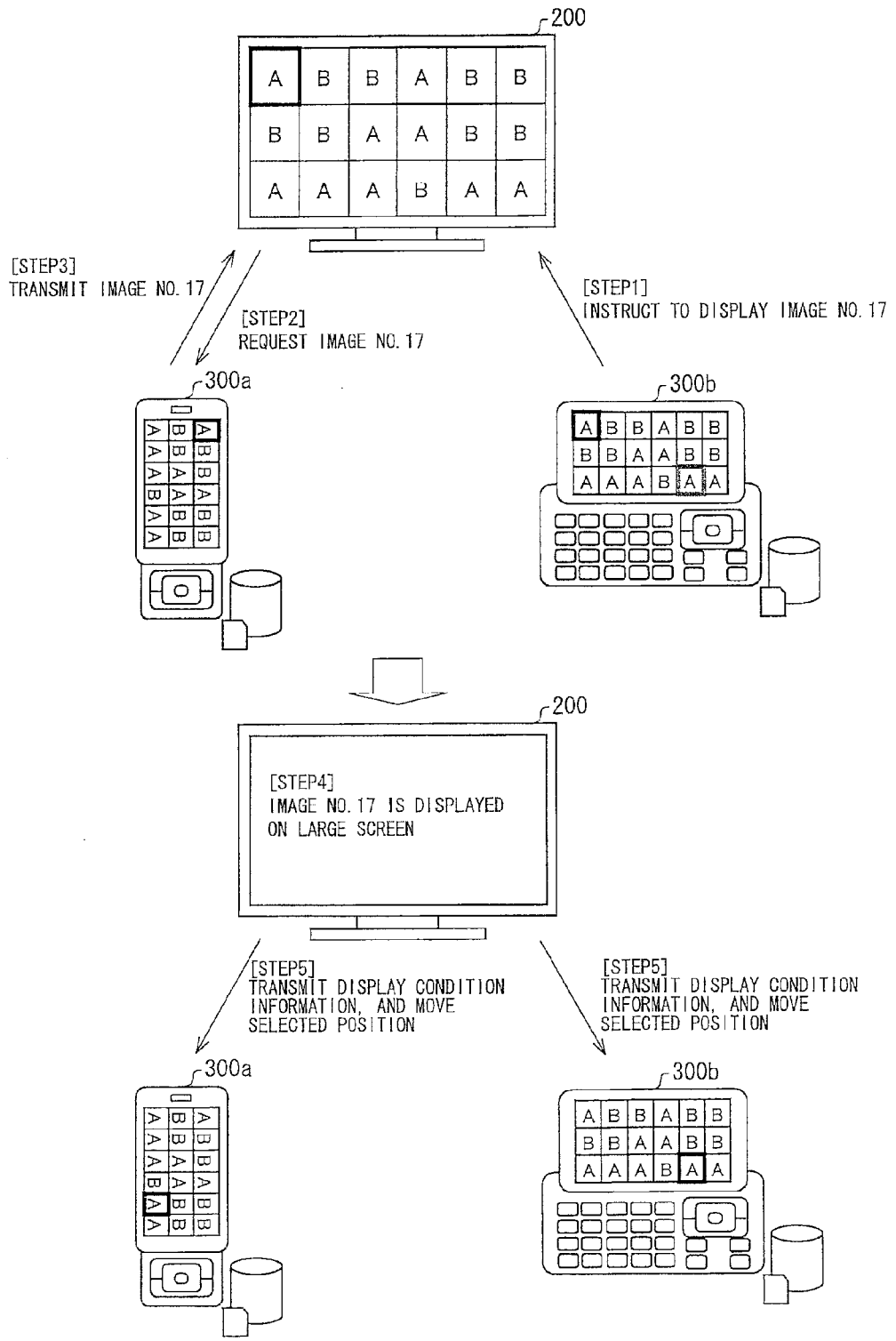
FIG. 21 is a view illustrating one example of respective display conditions of the operation target device and the remote operation devices, which are observed when one of the remote operation devices transmits an instruction to display an image and the operation target device displays the image which is instructed to be displayed.

Next, with reference to FIG. 21, the following will describe display conditions observed when S154 and steps following S154 (i.e., data output) in FIG. 19 are performed. FIG. 21 is a view illustrating one example of respective display conditions of the operation target device 200 and the remote operation devices 300a through 300d, which are observed when the remote operation device 300b transmits an instruction to display an image and the operation target device 200 displays the image which is instructed to be displayed.

As shown in FIG. 21, it is assumed herein that the remote operation device 300b transmits, to the operation target device 200, an instruction to display an image No. 17 (i.e., the 17th image displayed in the display screen) (STEP1). As shown in FIG. 21, a terminal storing the image No. 17 is "A", i.e., the remote operation device 300a.

Upon receiving the instruction to display the image No. 17, the operation target device 200 transmits, to the remote operation device 300a storing the image No. 17, a request for transmission of the image (STEP2). In response to this request, the remote operation device 300a transmits the image No. 17 to the operation target device 200 (STEP3).

Consequently, as shown in FIG. 21, the image No. 17 is displayed on the large screen of the operation target device 200 (STEP4). Further, after executing the data output process (on the output device side), the operation target device 200 transmits display condition information to each terminal. Upon receiving the display condition information, each of the remote operation devices 300a and 300b moves a selected position (cursor position) according to the display condition information thus received (STEP5).

Figure 22:
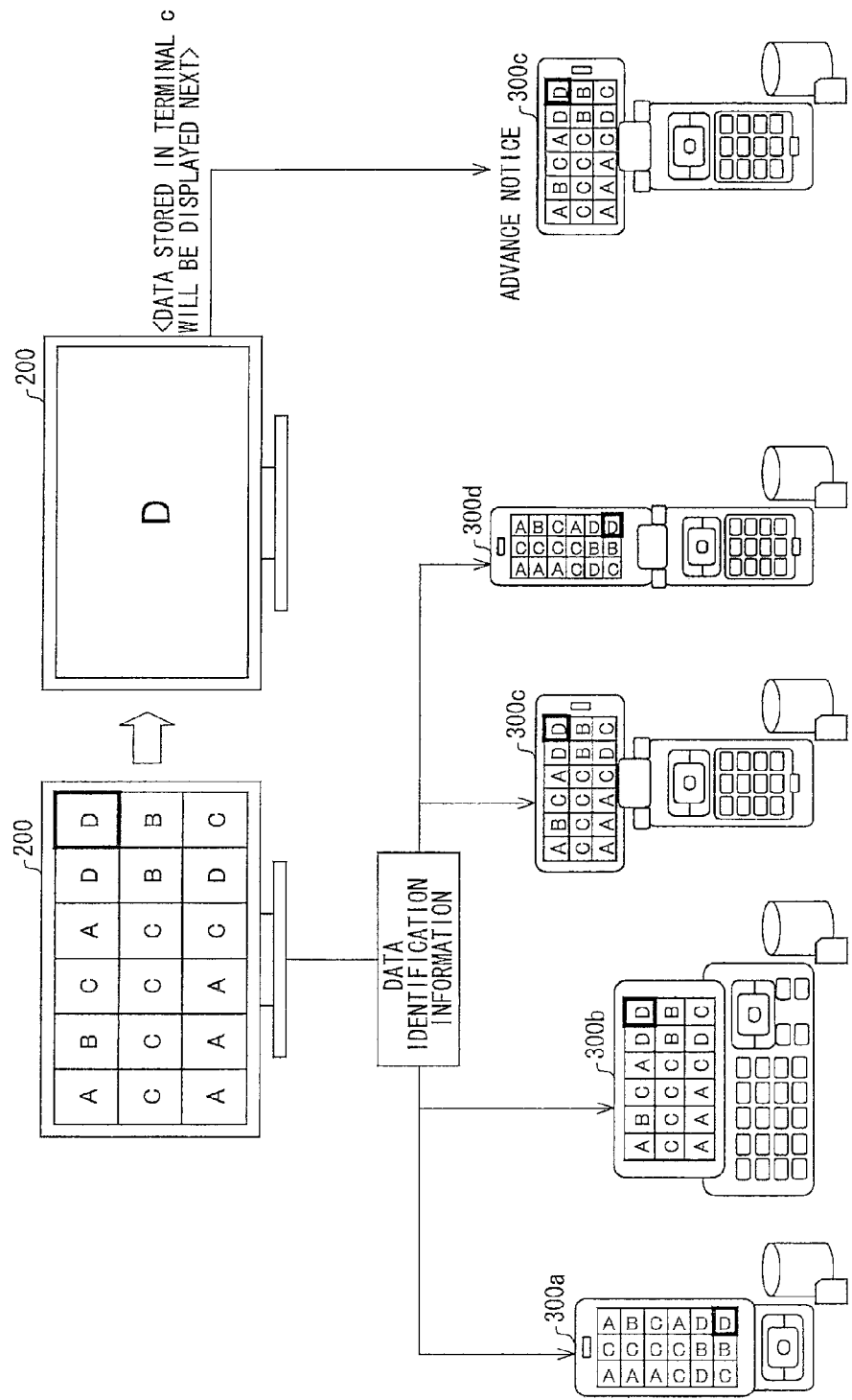
FIG. 22 is a view illustrating one example of display screens displayed when a slide show is executed, in a case where the operation target device transmits data identification information to each terminal.

Further, also in a case where the operation target device 200 transmits data identification information to each terminal, it is possible to execute a slide show (this is not illustrated in the example shown in FIG. 19). This will be described with reference to FIG. 22. FIG. 22 is a view illustrating one example of display screens displayed when a slide show is executed, in a case where the operation target device 200 transmits data identification information to each terminal.

As shown in FIG. 22, since the operation target device 200 transmits the data identification information and the display condition information to each terminal, each of the remote operation devices 300a through 300d displays the same screen as that of the operation target device 200.

Further, in a case where any of the remote operation devices 300a through 300d transmits, to the operation target device 200, an instruction to execute a slide show, the operation target device 200 generates reproduction management information. Then, according to the reproduction management information thus generated, the operation target device 200 transmits, to the remote operation devices 300a through 300d, a request for transmission of an image.

In the example shown in FIG. 22, an image stored in the remote operation device 300d is displayed by the operation target device 200. When the operation target device 200 displays the image stored in the remote operation device 300d, the operation target device 200 transmits the display condition information to the remote operation devices 300a through 300d.

Consequently, as shown in FIG. 22, each of the remote operation devices 300a through 300d displays a cursor on the image which is currently displayed by the operation target device 200. In a slide show, an image displayed by the operation target device 200 is changed one from another in order; therefore, the position of the cursor in each of the remote operation devices 300a through 300d also moves accordingly.

This allows the users of the respective remote operation devices 300a through 300d to easily identify (i) the image currently displayed by the operation target device 200, among the images whose thumbnails are displayed by the remote operation devices 300a through 300d, (ii) an image which is to be displayed next, and (iii) a terminal storing the image which is to be displayed next.

The example shown in FIG. 22 assumes that the remote operation device 300c is the terminal storing the image which is to be displayed next. Therefore, the operation target device 200 transmits an advance notice to the remote operation device 300c (see FIG. 13). Upon receiving the advance notice, the remote operation device 300c displays a screen (e.g., the one shown in FIG. 14) so as to allow the user to determine whether to permit supply of the image.

[Data Copy Process]

Figure 23:
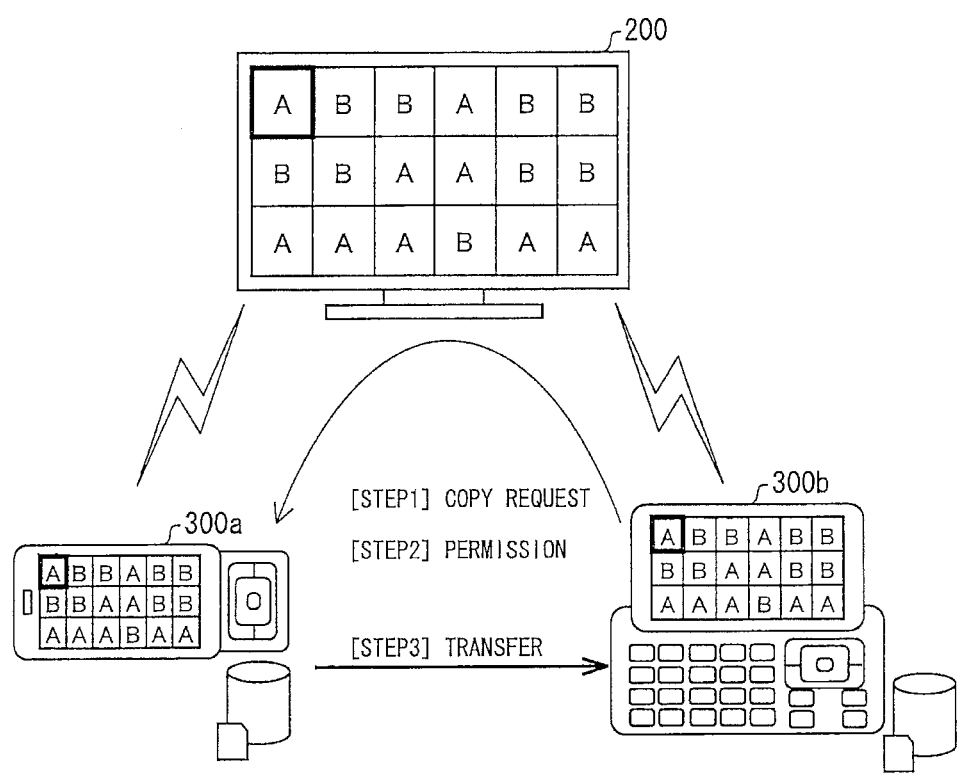
FIG. 23 is a view schematically illustrating a data copy process executed by the remote operation system.

Next, the following will schematically describe the data copy process with reference to FIG. 23. FIG. 23 is a view schematically illustrating the data copy process. The example shown in FIG. 23 is a case where the remote operation device 300b copies data stored in the remote operation device 300a. Here, a process executed by the remote operation device 300b will be described first. Thereafter, a process executed by the operation target device 200 and the remote operation device 300a will be described.

When data to be copied is selected from among data whose data identification information is displayed, the remote operation device 300b (copy request source terminal) transmits a copy request to the operation target device 200. Then, upon receiving the copy request, the operation target device 200 transfers the copy request to the remote operation device 300a, which stores the data to be copied.

Upon receiving the copy request, the remote operation device 300a (copy request destination terminal) inquires the user whether to permit copying of the data. If the copying is permitted, the remote operation device 300a transmits, to the remote operation device 300b, the data which is requested to be copied. Note that, in this operation, the data may be transmitted by P2P (peer-to-peer) or via the operation target device 200.

Thus, since the data identification information of the data shared in the remote operation system 100 has been transmitted to the remote operation device 300, it is possible to designate data identification information and to copy data corresponding to the designated data identification information.

Figure 24:
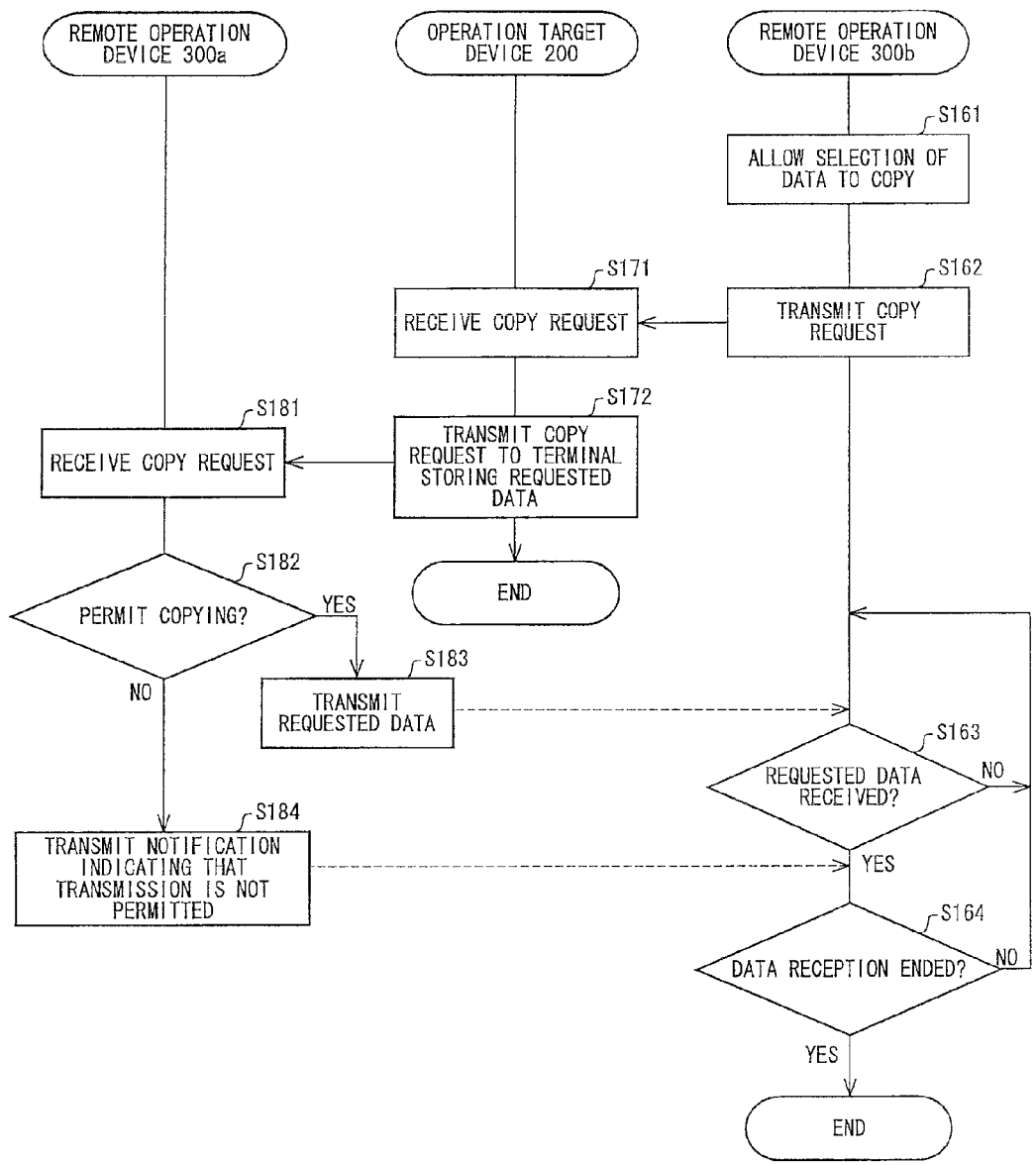
FIG. 24 is a flow chart illustrating one example of the data copy process.

Next, a flow of the data copy process will be described with reference to FIG. 24. FIG. 24 is a flow chart illustrating one example of the data copy process. The description herein deals with an example where the remote operation device 300b copies data stored in the remote operation device 300a, as with the example shown in FIG. 23.

<<Process Performed by Remote Operation Device 300b (Copy Request Source Terminal)>>

When the operation section 308 in the remote operation device 300b is given an instruction to start data copy, the copy executing section 28 allows the user to select data to copy, from among data identification information received from the operation target device 200 (S161). Then, in response to selection of the data to copy, the copy executing section 28 transmits, to the operation target device 200, a copy request for the selected data (S162).

After transmitting the copy request, the copy executing section 28 waits for reception of the requested data (S163). If the copy executing section 28 confirms reception of the requested data (YES in S163), the copy executing section 28 checks whether or not all of the requested data have been received (S164). If all of the requested data have been received (YES in S164), the data copy process is ended.

If the remote operation device 300a rejects the copy request, the remote operation device 300a transmits, to the remote operation device 300b, a notification indicating that the copying is not permitted. If the copy executing section 28 confirms reception of such the notification, the copy executing section 28 determines that reception of data from the remote operation device 300a is ended, and ends the data copy process. However, if the copy executing section 28 has also transmitted a copy request to another terminal, the copy executing section 28 continues to wait for reception of the requested data.

On the other hand, if some of the requested data have not been confirmed to be received (NO in S164), the copy executing section 28 returns to S163 so as to wait for reception of the requested data. If the copy executing section 28 cannot confirm end of the data reception even after a predetermined time period has elapsed, the copy executing section 28 determines that the copy request destination terminal is absent, and ends the data copy process.

Figure 25:
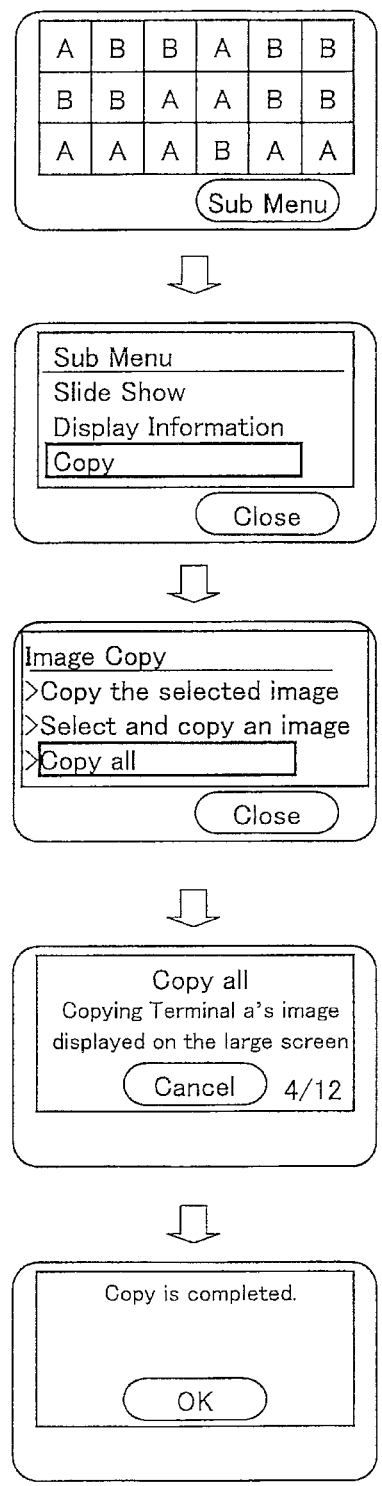
FIG. 25 is a view illustrating one example of operation screens displayed by the remote operation device in the data copy process.

In the data copy process executed by the remote operation device 300b, it is possible to allow the user to input an instruction, by displaying, e.g., a screen shown in FIG. 25. FIG. 25 is a view illustrating one example of operation screens displayed in the data copy process. The example shown in FIG. 25 indicates an example of a display screen displayed when an image is to be copied. However, data to be copied can be any data, as long as the data is shared in the remote operation system 100. Thus, the data to be copied is not limited to an image.

It is assumed herein that the operation target device 200 transmits data identification information to each terminal included in the remote operation system 100. Therefore, as shown in the first figure from the top in FIG. 25, the remote operation device 300b displays the data identification information. It is assumed herein that an image is to be copied. Therefore, the displayed data identification information is thumbnails. Further, in the example shown in the first figure from the top in FIG. 25, the remote operation device 300b displays not only the thumbnails but also a selection item for selecting a sub menu, which selection item is displayed as a soft key.

Here, if an instruction to select the sub menu is inputted to the operation section 308, a screen shown in the second figure from the top in FIG. 25 is displayed. As shown in the second figure from the top in FIG. 25, this screen displays, as sub menus, (i) a selection item to perform a slide show, (ii) a selection item to display information, and (iii) a selection item to perform copying. If the selection item to perform a slide show is selected, a slide-show executing process is performed. If the selection item to display information is selected, detailed information of the data is displayed on the display section 307. For example, in a case where the object data is a photo, the date and time of photographing and/or the like is displayed. Note that the information such as the date and time of photographing is included in the data identification information.

On the other hand, if the selection item to perform copying is selected, the operation screen is switched to a screen shown in the third figure from the top in FIG. 25. As shown in the third figure from the top in FIG. 25, this screen displays (i) a selection item to copy the currently-selected image, (ii) a selection item to select an image and copy the image, and (iii) a selection item to all data, each of which selection item is displayed as a soft key.

If the selection item to copy all data is selected, a copy request for all data corresponding to the data identification information supplied from the operation target device 200 is transmitted. In response to this, the requested data are sequentially supplied to the remote operation device 300b. Accordingly, the operation screen is switched to a screen shown in the fourth figure from the top in FIG. 25.

As shown in the fourth figure from the top in FIG. 25, the operation screen displays information indicative of the progress of the copying. This is favorable, since this allows the user to grasp approximate time remaining until the copying is ended. Further, in the example shown in the fourth figure from the top in FIG. 25, the operation screen displays a selection item to cancel the copying. If this selection item is selected, the copy executing section 28 instructs the transmission source terminal of the data to stop transmitting the data, and ends the data copy process.

Then, when the remote operation device 300b receives all of the requested images, the operation screen is switched to a screen shown in the fifth figure from the top in FIG. 25. With this, the user can confirm that the copying is ended without any problem. In case where the remote operation device 300b cannot receive one or some of the requested images, the screen may display (i) a message indicating that the remote operation device 300b could not receive one or some of the requested images and (ii) the thumbnail(s) of the image(s) that the remote operation device 300b could not receive. With this, the user can easily identify the image(s) that the remote operation device 300b has failed to copy.

<<Process Performed by Operation Target Device 200 and Remote Operation Device 300a (Copy Request Destination Terminal)>>

Next, the following will describe a process performed by the operation target device 200 and the remote operation device 300a. Upon confirming reception of the copy request (S171), the copy request transferring section 8 in the operation target device 200 identifies (i) data which is requested to be copied and (ii) a terminal storing the data. Then, the copy request transferring section 8 transfers the received copy request to the terminal storing the requested data (S172). The transfer of the copy request ends the data copy process performed by the operation target device 200.

Upon confirming reception of the copy request (S181), the content transmission control section 26 in the remote operation device 300a allows the user of the remote operation device 300 to determine whether to permit the copying (S182). For example, in a case where a copy request for an image is transmitted to the remote operation device 300a, the content transmission control section 26 may instruct the display control section 23 on the operating side to cause the display section 307 to display an image as shown in FIG. 26, so as to allow the user to determine whether to permit the copying.

Figure 26:
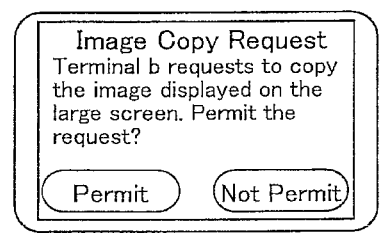
FIG. 26 is a view illustrating one example of a screen for allowing the user to determine whether to permit copying, which screen is displayed by the remote operation device in the data copy process.
Figure 26:
Figure 26:
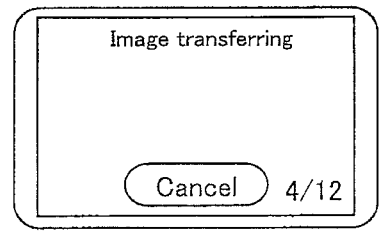

FIG. 26 is a view illustrating one example of a screen for allowing the user to determine whether to permit the copying. A screen exemplified in the upper part of FIG. 26 displays a message indicative that the remote operation device 300b has transmitted a copy request for images displayed on the large screen (operation target device 200). With this, the user of the remote operation device 300a can recognize that (i) the data requested to be copied are all the images displayed on the operation target device 200 and (ii) the source of the copy request is the remote operation device 300b. Accordingly, based on the information, the user can determine whether to permit the copying.

Further, as shown in FIG. 26, the screen displays (i) an item for permitting the copying and (ii) an item for rejecting the copying, in such a manner that the user can select any of these items. Accordingly, the user of the remote operation device 300a can permit or reject the copying by selecting one of these items.

If the user permits the copying, the content transmission control section 26 may cause the display section 307 to display a screen, e.g., the one as shown in the lower part of FIG. 26. As shown in the lower part of FIG. 26, since the screen displays a message indicative that the image transfer is currently being executed, the user can recognize that the images are currently being transferred Further, there may be a case where the image transfer should be canceled, for example, when the user of the remote operation device 300a must leave the place. In view of this, as shown in the lower part of FIG. 26, the content transmission control section 26 preferably displays an item for canceling the image transfer in such a manner that the user can select the item, in order to allow the user of the remote operation device 300a to cancel the data transfer.

Returning to the flow chart, if the copying is permitted (YES in S182), the content transmission control section 26 transmits the requested data to the remote operation device 300b, which is the source of the request of the data (S183). On the other hand, if the copying is not permitted (NO in S182), the content transmission control section 26 transmits, to the remote operation device 300b (i.e., the source of the request for the data), a notification indicating that transmission of a copy of the requested data is not permitted (S184).

As with the example shown in FIG. 14, if it is determined that performing transmission of the data is not preferable, based on the battery remaining level of the remote operation device 300a, other task(s) that the remote operation device 300a is currently executing, etc., the content transmission control section 26 may automatically transmit a notification indicating that transmission of the data is not permitted, rather than allowing the user to determine whether to permit the copying.

[Variation]

As described above, in the remote operation system 100, the data that the operation target device 200 cannot output is not shared. This makes it possible to prevent such a case where unavailable data is wastefully transmitted from the remote operation device 300 to the operation target device 200.

However, according to the above configuration, it is impossible to output, among data stored in the remote operation device 300, data that cannot be outputted by (i) the remote operation device 300 storing the data nor (ii) the operation target device 200.

For example, assume a case where the remote operation device 300 downloads data via the Internet. In this case, if the downloaded data cannot be outputted by the remote operation device 300 nor the operation target device 200, the user of the remote operation device 300 cannot output the data, which has been all the way downloaded.

It is possible to solve this problem by, for example, the following arrangement: Each remote operation device 300 transmits, to the operation target device 200, reproducable data information indicative of a file format that the respective remote operation device 300 can output.

Next, if the reproducable data information includes a file format that the operation target device 200 cannot output, the operation target device 200 memorize (i) a communication address of a remote operation device 300 capable of outputting the file format that the operation target device 200 cannot output and (ii) the file format that the remote operation device 300 can output but the operation target device 200 cannot output, in such a manner that the communication address and the file format are associated with each other.

Subsequently, the operation target device 200 transmits, to each of the remote operation devices 300, a file format that the operation target device 200 or any of the remote operation devices 300 included in the remote operation system 100 can output, the file format being transmitted as reproducable data information. Namely, in this case, in addition to data that the operation target device 200 can output, data that any of the remote operation devices 300 can output is shared.

If the operation target device 200 receives an instruction to output data that the operation target device 200 cannot output, the operation target device 200 causes the data to be transmitted to a remote operation device 300 that can output the data, and causes the remote operation device 300 to output the data.

Consequently, the remote operation device 300 outputs the data that the operation target device 200 cannot output. Thus, it is possible to output data that cannot be outputted by (i) the remote operation device 300 storing the data nor (ii) the operation target device 200.

Exemplified herein is the remote operation system 100 including: (i) the remote operation device 300 for performing both of (a) data supply and (b) display control with respect to the operation target device 200; and (ii) the operation target device 200 for performing data output. However, the present invention is not limited to this example. Any system can be configured to provide the same effects as those given by the remote operation system 100, as long as the system includes (i) a terminal for performing data supply, (ii) a terminal for performing data output, and (iii) a terminal for instructing to perform data output.

The present invention is not limited to the description of the embodiments above, but may be altered by a skilled person within the scope of the claims. An embodiment based on a proper combination of technical means disclosed in different embodiments is encompassed in the technical scope of the present invention.

Finally, the blocks of the operation target device 200 and the remote operation device 300, particularly the operation target device control section 203 and the remote operation device control section 306, may be realized by way of hardware or software as executed by a CPU as follows:

The operation target device 200 or the remote operation device 300 includes a CPU (central processing unit) and memory devices (memory media). The CPU (central processing unit) executes instructions in control programs realizing the functions. The memory devices include a ROM (read only memory) which contains programs, a RAM (random access memory) to which the programs are loaded, and a memory containing the programs and various data. The objective of the present invention can also be achieved by mounting to the operation target device 200 or the remote operation device 300 a computer-readable storage medium containing control program code (executable program, intermediate code program, or source program) for the operation target device 200 and the remote operation device 300, which is software realizing the aforementioned functions, in order for the computer (or CPU, MPU) to retrieve and execute the program code contained in the storage medium.

The storage medium may be, for example, a tape, such as a magnetic tape or a cassette tape; a magnetic disk, such as a floppy (Registered Trademark) disk or a hard disk, or an optical disk, such as CD-ROM/MO/MD/DVD/CD-R; a card, such as an IC card (memory card) or an optical card; or a semiconductor memory, such as a mask ROM/EPROM/EEPROM/flash ROM.

The operation target device 200 or the remote operation device 300 may be arranged to be connectable to a communications network so that the program code may be delivered over the communications network. The communications network is not limited in any particular manner, and may be, for example, the Internet, an intranet, extranet, LAN, ISDN, VAN, CATV communications network, virtual dedicated network (virtual private network), telephone line network, mobile communications network, or satellite communications network. The transfer medium which makes up the communications network is not limited in any particular manner, and may be, for example, wired line, such as IEEE 1394, USB, electric power line, cable TV line, telephone line, or ADSL line; or wireless, such as infrared radiation (IrDA, remote control), Bluetooth (Registered Trademark), 802.11 wireless, HDR, mobile telephone network, satellite line, or terrestrial digital network. The present invention encompasses a carrier wave or data signal transmission in which the program code is embodied electronically.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

INDUSTRIAL APPLICABILITY

According to a remote operation system of the present invention, it is possible (i) to cause a plurality of remote operation devices to share only data that an operation target device can output and (ii) to cause the operation target device to output the shared data. Accordingly, the present invention can be applied to any system, as long as the system includes (i) a data output device capable of outputting data and (ii) a data providing device storing data which is to be supplied to the data output device, the data output device and the data providing device being communicably connected to each other.

Particularly in recent years, mobile phones have been developed to be capable of obtaining various content data, and television screens are getting larger. In view of this, by applying the present invention to such a system including a mobile phone and a television which are communicably connected to each other, it is possible to provide a system with which the user can enjoy various content items with a large screen of the television.

REFERENCE SIGNS LIST

2 Reproducable data information transmitting section (output possibility information transmitting means)
3 Data sharing process section on the operated side (data sharing means, list receiving means, receivable data list generating means, receivable data list transmitting means, currently-outputted data information transmitting means)
6 Slide-show executing section (data transmission request means, data output means, data display means, output control means)
7 Streaming executing section (streaming reproduction means)
8 Copy request transferring section (data request transferring means)
22 Data sharing process section on the operating side (list transmitting means, receivable data list receiving means, receivable data list display means, currently-outputted data information receiving means)
25 Slide-show execution instructing section (selecting means, output instructing means)
26 Content transmission control section (data transmitting means)
100 Remote operation system (data output system)
200 Operation target device (data output device)
300 Remote operation device (data providing device)

The invention claimed is:

1. A data output device for receiving and outputting data transmitted from at least one of a plurality of data providing devices, comprising:
an output possibility information transmitting section for transmitting, to said at least one of the plurality of data providing devices, output possibility information indicative of (i) a file format of data that the data output device is able to output or (ii) a file format of data that the data output device is unable to output;
a data sharing section for requesting said at least one of the plurality of data providing devices to transmit, to the data output device, a list of data that the data output device is able to output, the data being selected according to the output possibility information, from among data that said at least one of the plurality of data providing devices is able to provide;
a data transmission request section for requesting said at least one of the plurality of data providing devices to transmit, to the data output device, the data included in the list received in response to the data sharing section requesting the list; and
a data output section for outputting the data received from said at least one of the plurality of data providing devices,
in a case where the data output device receives, from one of the plurality of data providing devices, a data selection condition, which is a condition used to select data to be included in the list, the data sharing section (i) transmitting the received data selection condition to, among the plurality of data providing devices, any data providing device other than the one data providing device, and (ii) requesting said any data providing device other than the one data providing device to transmit to the data output device a list of data selected according to the data selection condition.

2. The data output device as set forth in claim 1, wherein:
the data transmission request section determines an order in which the data included in the received list(s) are to be outputted, and requests the data to be transmitted to the data output device in the determined order; and
the data output section outputs the data in an order in which the data have been received.

3. The data output device as set forth in claim 2, wherein:
in a case where the data transmission request section determines, at a time point which is a predetermined time period before output of data from the data output section, that a data providing device storing the data is unable to provide the data, the data transmission request section changes a candidate for data which is requested to be transmitted, from the data to next data, which is to be outputted following the data.

4. A data output system comprising:
a data output device as set forth in claim 1; and
a plurality of data providing devices,
the plurality of data providing devices each including:
a list transmitting section for transmitting, in a case where the data providing device receives from the data output device (i) the output possibility information and (ii) a request for transmission of the list, the list to the data output device; and a data transmitting section for transmitting, in a case where the data providing device receives from the data output device a request for transmission of data, the requested data to the data output device.

5. A method for controlling a data output device, the data output device receiving and outputting data transmitted from at least one of a plurality of data providing devices, said method comprising:

an output possibility information transmitting step for transmitting, to said at least one of the plurality of data providing devices, output possibility information indicative of (i) a file format of data that the data output device is able to output or (ii) a file format of data that the data output device is unable to output;

a data sharing step for requesting said at least one of the plurality of data providing devices to transmit, to the data output device, a list of data that the data output device is able to output, the data being selected according to the output possibility information, from among data that said at least one of the plurality of data providing devices is able to provide;

a data transmission request step for requesting said at least one of the plurality of data providing devices to transmit, to the data output device, the data included in the list received in response to the data sharing step requesting the list; and a data outputting step for outputting the data received from said at least one of the plurality of data providing devices, in a case where the data output device receives, from one of the plurality of data providing devices, a data selection condition, which is a condition used to select data to be included in the list, the data sharing step (i) transmitting the received data selection condition to, among the plurality of data providing devices, any data providing device other than the one data providing device, and (ii) requesting said an data providing device other than the one data providing device to transmit, to the data output device, a list of data selected according to the data selection condition.

6. The data output device as set forth in claim 1, further comprising:

a streaming reproduction section for reproducing data through streaming, the data being distributed through streaming from at least one of the plurality of data providing devices;

a data display section for (i) receiving, from said at least one of or another at least one of the plurality of data providing devices, another data which is not the data to be reproduced by the streaming reproduction section, and (ii) displaying said another data; and an output control section for controlling the streaming reproduction section and the data display section so as to simultaneously perform (i) the streaming reproduction of the data and (ii) the display of said another data.

7. The data output device as set forth in claim 6, wherein: the streaming reproduction section reproduces audio data through streaming; and
the data display section displays image data.

8. The data output device as set forth in claim 7, wherein: the data sharing section requests at least one of the plurality of data providing devices to transmit, to the data output device, a list of image data or audio data that said at least one of the plurality of data providing devices is able to provide; and the data transmission request section requests said at least one of the plurality of data providing devices to (i) transmit, to the data output device, the image data included in the received list or (ii) distribute through streaming, to the data output device, the audio data included in the received list.

9. The data output device as set forth in claim 1, further comprising:

a list receiving section for receiving, from each data providing device, a list of data that the data providing device is able to transmit to the data output device;

a receivable data list generating section for generating, based on the lists that the list receiving section receives, a receivable data list indicative of data that the data output device is able to receive;

a receivable data list transmitting section for transmitting, to the plurality of data providing devices, the receivable data list generated by the receivable data list generating section; and a currently-outputted data information transmitting section for transmitting, to the plurality of data providing devices, currently-outputted data information indicative of data which is currently outputted by the data output device.

10. A data providing device for transmitting data to a data output device as set forth in claim 1, said data providing device comprising:

a receivable data list receiving section for receiving a receivable data list indicative of (i) data that the data output device is able to receive from another data providing device which is not the data providing device and (ii) data that the data output device is able to receive from the data providing device;

a receivable data list display section for displaying the receivable data list that the receivable data list receiving section receives;

a selecting section for selecting data from the receivable data list displayed by the receivable data list display section; and an output instructing section for requesting the data output device to output the data selected by the selecting section.

11. The data providing device as set forth in claim 10, further comprising:

a currently-outputted data information receiving section for receiving currently-outputted data information indicative of data which is currently outputted by the data output device, wherein:

according to the currently-outputted data information that the currently-outputted data information receiving section receives, the receivable data list display section displays the receivable data list in such a manner that (i) the data which is currently outputted by the data output device is distinguishable from (ii) data which is not currently outputted by the data output device.

12. The data providing device as set forth in claim 10, wherein:

the receivable data list display section (i) identifies, from among the data included in the receivable data list, data stored in the data providing device, and (ii) displays the receivable data list in such a manner that the identified data is distinguishable from data other than the identified data.

* * * * *